US011980899B2

(12) United States Patent
Rexach et al.

(10) Patent No.: US 11,980,899 B2
(45) **Date of Patent: *May 14, 2024**

(54) SHOWER

(71) Applicant: Kohler Co., Kohler, WI (US)

(72) Inventors: Rafael Alfredo Rexach, Sheboygan, WI (US); Stephanie Szemetylo, Sheboygan, WI (US); David J. Richter-O'Connell, Sheboygan, WI (US); Jeffrey James Elsesser, Kohler, WI (US); James S. Giefer, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,754

(22) Filed: Aug. 26, 2022

(65) Prior Publication Data

US 2022/0410186 A1 Dec. 29, 2022

Related U.S. Application Data

(63) Continuation of application No. 16/367,361, filed on Mar. 28, 2019, which is a continuation of application (Continued)

(51) Int. Cl.

*B05B 1/18* (2006.01)
*B05B 15/60* (2018.01)

(Continued)

(52) U.S. Cl.

CPC ................ *B05B 1/185* (2013.01); *B05B 1/18* (2013.01); *B05B 15/60* (2018.02); *E03C 1/0408* (2013.01);

(Continued)

(58) Field of Classification Search

CPC . B05B 1/18; B05B 1/185; E03C 1/042; E03C 1/0408

See application file for complete search history.

(56) References Cited

U.S. PATENT DOCUMENTS

| | | | |
|---|---|---|---|
| 4,930 | A | 1/1847 | Blodgett |
| 6,047 | A | 1/1849 | Cortlan |

(Continued)

FOREIGN PATENT DOCUMENTS

| | | | |
|---|---|---|---|
| CN | 201543533 | U | 8/2010 |
| CN | 102160765 | A | 8/2011 |

(Continued)

OTHER PUBLICATIONS

First Chinese Office Action issued in connection with CN Appl. Ser. No. 202110965681.5 dated Jul. 6, 2022 (17 pages).

(Continued)

*Primary Examiner* — Joseph A Greenlund

(74) *Attorney, Agent, or Firm* — FOLEY & LARDNER LLP

(57) ABSTRACT

A shower assembly includes an inlet port, a reservoir, and a plurality of drop outlet ports. The inlet port receives water from a water source at an inlet flow rate. The reservoir receives water from the inlet port, and is not pressurized by a line pressure of the water source even when the reservoir receives the water at a maximum inlet flow rate of up to 2.5 gallons per minute. Each of the plurality of drop outlet ports is configured such that water passes from the reservoir through the plurality of drop outlet ports, forms a drop at each drop outlet port, and falls from each drop outlet port by gravity only as discrete drops of water. A total flow capacity of the plurality of drop outlet ports is greater than or equal to the maximum inlet flow rate.

20 Claims, 33 Drawing Sheets

Related U.S. Application Data

No. 15/637,919, filed on Jun. 29, 2017, now Pat. No. 10,456,794, which is a continuation of application No. 14/843,692, filed on Sep. 2, 2015, now Pat. No. 9,718,068.

(60) Provisional application No. 62/045,390, filed on Sep. 3, 2014.

(51) Int. Cl.
*E03C 1/04* (2006.01)
*E03C 1/042* (2006.01)

(52) U.S. Cl.
CPC ...... *E03C 1/042* (2013.01); *A61H 2201/0126* (2013.01); *Y10T 137/698* (2015.04)

(56) References Cited

U.S. PATENT DOCUMENTS

| | | | | |
|---|---|---|---|---|
| 64,112 | A | 4/1867 | Lacey | |
| 588,262 | A | 8/1897 | Boekel | |
| 685,582 | A | 10/1901 | Dikema | |
| 1,236,617 | A | 8/1917 | Speakman | |
| 1,368,237 | A | 2/1921 | Brockman | |
| 1,493,359 | A | 5/1924 | Mallery | |
| 1,556,765 | A | 10/1925 | Dechmann | |
| 1,577,038 | A | 3/1926 | Kvitle | |
| 1,589,252 | A | 6/1926 | Sherman | |
| 1,593,134 | A | 7/1926 | Niedecken | |
| 1,844,038 | A | 2/1932 | Hooker | |
| 1,877,046 | A | 9/1932 | Phillips | |
| 1,893,435 | A | 1/1933 | Neal | |
| 2,376,279 | A | 5/1945 | Erwin | |
| 2,402,741 | A * | 6/1946 | Draviner | B05B 15/528 239/602 |
| 2,558,450 | A | 6/1951 | Martin | |
| 2,762,598 | A | 9/1956 | Runge | |
| 2,779,625 | A | 1/1957 | Filliung | |
| 2,874,001 | A * | 2/1959 | Webb | B05B 1/18 239/533.14 |
| 2,949,109 | A * | 8/1960 | Koolnis | A61H 9/00 4/615 |
| 3,189,284 | A | 6/1965 | Downey | |
| 3,533,555 | A | 10/1970 | Billeter | |
| 3,815,821 | A | 6/1974 | Metcalfe | |
| 3,906,983 | A | 9/1975 | Parkison | |
| 4,079,762 | A | 3/1978 | Hanson, Jr. | |
| 4,122,558 | A | 10/1978 | Di Liberto et al. | |
| 4,135,670 | A | 1/1979 | Sugimoto | |
| 4,151,616 | A | 5/1979 | Larsen | |
| 4,294,409 | A | 10/1981 | Larsen | |
| 4,545,083 | A | 10/1985 | Searson | |
| D298,048 | S | 10/1988 | Nelson | |
| 4,785,887 | A | 11/1988 | Miller | |
| 4,807,310 | A | 2/1989 | Sedala | |
| 4,866,794 | A | 9/1989 | Davies | |
| 5,060,322 | A | 10/1991 | Delepine | |
| 5,199,639 | A | 4/1993 | Kobayashi et al. | |
| 5,228,625 | A * | 7/1993 | Grassberger | B05B 15/528 239/602 |
| 5,476,225 | A | 12/1995 | Chan | |
| 5,718,380 | A | 2/1998 | Schorn et al. | |
| 5,758,824 | A | 6/1998 | Kuykendal et al. | |
| 5,918,811 | A | 7/1999 | Denham et al. | |
| 5,944,113 | A | 8/1999 | Sundholm | |
| 6,082,463 | A | 7/2000 | Ponte | |
| 6,123,272 | A * | 9/2000 | Havican | B05B 1/1654 239/394 |
| 6,126,091 | A * | 10/2000 | Heitzman | B05B 1/1636 239/443 |
| 6,182,767 | B1 | 2/2001 | Jackson | |
| 6,250,572 | B1 * | 6/2001 | Chen | B05B 1/185 239/533.13 |
| 6,267,305 | B1 | 7/2001 | Kondo | |
| 6,270,022 | B1 * | 8/2001 | Knapp | B05B 7/0425 4/615 |
| 6,343,389 | B1 | 2/2002 | Jones | |
| 6,354,518 | B1 | 3/2002 | Gil et al. | |
| 6,360,970 | B1 | 3/2002 | Fitzgerald | |
| 6,454,186 | B2 | 9/2002 | Haverstraw et al. | |
| 6,513,735 | B1 * | 2/2003 | Clark | B05B 1/185 239/326 |
| 6,622,945 | B1 | 9/2003 | Wu et al. | |
| 6,659,368 | B2 | 12/2003 | Capps | |
| 6,736,336 | B2 | 5/2004 | Wong | |
| 6,739,527 | B1 * | 5/2004 | Chung | B05B 15/528 239/533.13 |
| 6,983,898 | B2 | 1/2006 | Clark | |
| 7,043,776 | B1 | 5/2006 | Wu | |
| 7,048,210 | B2 * | 5/2006 | Clark | B05B 1/185 239/548 |
| 7,077,342 | B2 * | 7/2006 | Lee | B05B 1/18 239/596 |
| 7,093,775 | B1 | 8/2006 | Bingham | |
| 7,174,580 | B1 | 2/2007 | Papierniak | |
| 7,347,388 | B2 * | 3/2008 | Chung | B05B 1/185 239/596 |
| 7,384,007 | B2 * | 6/2008 | Ho | B05B 1/1663 239/587.5 |
| 7,387,401 | B2 | 6/2008 | Clark | |
| 7,427,037 | B2 | 9/2008 | Frazee | |
| 7,455,247 | B2 | 11/2008 | Kajuch | |
| 7,464,885 | B1 | 12/2008 | Chang | |
| 7,617,996 | B2 | 11/2009 | Lee | |
| 7,694,359 | B1 | 4/2010 | Hall | |
| 7,721,979 | B2 * | 5/2010 | Mazzola | B05B 1/18 239/602 |
| 7,726,832 | B2 | 6/2010 | Clark | |
| 7,740,186 | B2 * | 6/2010 | Macan | B05B 3/04 239/602 |
| 7,871,020 | B2 | 1/2011 | Nelson et al. | |
| 8,109,451 | B2 * | 2/2012 | Mazzola | B05B 1/185 239/548 |
| 8,113,442 | B2 | 2/2012 | Li et al. | |
| 8,240,583 | B2 * | 8/2012 | Cristina | B05B 1/18 239/533.13 |
| 8,695,897 | B2 | 4/2014 | Engel | |
| 8,714,463 | B2 | 5/2014 | Bischoff et al. | |
| 8,794,340 | B2 | 8/2014 | Rekeny | |
| 8,985,483 | B2 * | 3/2015 | Petrovic | B05B 1/262 239/394 |
| 9,056,325 | B2 * | 6/2015 | Torontow | B05B 1/18 |
| 9,163,783 | B1 | 10/2015 | McLaughlin | |
| 9,199,252 | B2 * | 12/2015 | Schorn | B05B 1/18 |
| 9,782,614 | B2 | 10/2017 | Chen | |
| 10,272,451 | B2 * | 4/2019 | Ukigai | E03C 1/0404 |
| 10,413,917 | B2 * | 9/2019 | Rexach | B05B 1/3046 |
| 10,478,837 | B2 * | 11/2019 | Cacka | E03C 1/0409 |
| 2003/0042331 | A1 | 3/2003 | Lu | |
| 2003/0043214 | A1 | 3/2003 | Thompson | |
| 2003/0062426 | A1 * | 4/2003 | Gregory | B05B 15/528 239/533.13 |
| 2003/0127142 | A1 * | 7/2003 | Stouffer | B05B 1/08 137/803 |
| 2003/0213199 | A1 | 11/2003 | Bongio et al. | |
| 2004/0065757 | A1 | 4/2004 | Damasse et al. | |
| 2004/0251800 | A1 | 12/2004 | O'Neil et al. | |
| 2005/0284967 | A1 | 12/2005 | Korb et al. | |
| 2006/0016908 | A1 * | 1/2006 | Chung | B05B 1/18 239/282 |
| 2006/0043214 | A1 * | 3/2006 | Macan | B05B 3/04 239/222.11 |
| 2006/0060678 | A1 * | 3/2006 | Mazzola | B05B 1/185 239/DIG. 4 |
| 2006/0151640 | A1 * | 7/2006 | Miura | B05B 1/185 239/590.5 |
| 2006/0196971 | A1 * | 9/2006 | Lau | B05B 3/0495 239/436 |
| 2006/0196972 | A1 * | 9/2006 | Kajuch | B05B 1/18 239/452 |
| 2006/0214025 | A1 | 9/2006 | Kim | |

(56) References Cited

U.S. PATENT DOCUMENTS

2006/0219821 A1* 10/2006 Okuma ..................... B05B 1/18 239/553
2006/0226255 A1 10/2006 Deboer et al.
2006/0254190 A1 11/2006 Hunt
2007/0194148 A1 8/2007 Rosko et al.
2007/0246577 A1 10/2007 Leber
2007/0295866 A1 12/2007 Yang
2008/0000424 A1 1/2008 Bailey et al.
2008/0073449 A1 3/2008 Haynes et al.
2008/0289097 A1 11/2008 Jeong
2009/0114739 A1 5/2009 Furseth
2009/0218411 A1 9/2009 Hansen
2010/0089599 A1 4/2010 Sundholm et al.
2011/0000983 A1* 1/2011 Chang ....................... B05B 1/18 239/567
2011/0083863 A1 4/2011 Mason
2011/0114752 A1* 5/2011 Li ......................... B05B 1/1609 239/222.11
2011/0167556 A1 7/2011 Irwin
2011/0233301 A1* 9/2011 Gopalan ................... B05B 1/08 239/548
2011/0284662 A1* 11/2011 Ohashi .................. B05B 7/0425 239/428.5
2011/0297759 A1 12/2011 Morbio
2012/0175438 A1* 7/2012 Ji .......................... B05B 7/0425 239/601
2012/0181240 A1 7/2012 Crowley
2012/0228407 A1* 9/2012 Torontow .................. B05B 1/18 239/583
2012/0280068 A1 11/2012 Huang
2013/0000928 A1 1/2013 Mason et al.
2013/0186972 A1 7/2013 Petrovic
2013/0299608 A1* 11/2013 Spangler .................. A47K 3/28 239/525
2014/0008467 A1* 1/2014 Allard ..................... B05B 1/207 239/548
2014/0069520 A1 3/2014 Esche et al.
2015/0014447 A1* 1/2015 Akahira .................... B05B 1/16 239/556
2015/0089734 A1 4/2015 Berngard
2015/0211462 A1* 7/2015 Schnobrich ........ F02M 61/1853 239/561
2016/0059240 A1* 3/2016 Rexach ................... B05B 15/60 239/562
2016/0059245 A1 3/2016 Rexach et al.
2016/0060852 A1* 3/2016 Rexach ..................... B05B 1/18 137/359
2016/0332173 A1* 11/2016 Butzke .................. B05B 1/1627
2017/0189918 A1* 7/2017 Winter .................... B05B 1/169
2018/0280995 A1* 10/2018 Huang .................... B05B 12/10
2019/0150675 A1* 5/2019 Beckman .................. A61L 2/24
2020/0061641 A1* 2/2020 Soetaert .................... B05B 1/02

FOREIGN PATENT DOCUMENTS

| | | | |
|---|---|---|---|
| DE | 19 81 336 | U | 3/1968 |
| DE | 39 07 379 | A1 | 5/1990 |
| DE | 19813366 | | 10/1998 |
| EP | 1 359 260 | B1 | 11/2003 |
| EP | 1 537 918 | A1 | 6/2005 |
| EP | 1 637 231 | A2 | 3/2006 |
| EP | 2 085 143 | A1 | 8/2009 |
| EP | 2 570 557 | A1 | 3/2013 |
| JP | 2012-005566 | A | 1/2012 |
| WO | WO-2012/129719 | A1 | 10/2012 |
| WO | WO-2014/019046 | A1 | 2/2014 |
| WO | WO-2014/106529 | A1 | 7/2014 |

OTHER PUBLICATIONS

Extended European Search Report dated Feb. 9, 2016, from related European Patent Office application No. 15183589.9.
Foreign Action other than Search report on 046150-2639 dated Aug. 10, 2018 (11 pages).
Foreign Action other than Search Report on 046150-2639 dated Feb. 12, 2018 (13 pages).
Foreign Action other than Search Report on 046150-2639 dated Jan. 21, 2019 (11 pages).
Foreign Action other than Search Report on 046150-2639 dated May 25, 2017 (6 pages).
Foreign Action other than Search Report on 046150-2640 dated Mar. 1, 2019 (6 pages).
Foreign Action other than Search Report on 046150-2641 dated May 9, 2019 (6 pages).
Foreign Action other than Search Report on 046150-2642 dated Oct. 30, 2018 (1 page).
Foreign Action other than Search Report on BR 102015021594-0 dated May 26, 2020.
Foreign Action other than Search Report on CN 201510558184.8 dated Jun. 27, 2019 (5 pages).
Foreign Action other than Search Report on non-Foley case related to U.S. Appl. No. 14/843,680 dated Jul. 1, 2020.
Foreign Search Report on non-Foley case related to U.S. Appl. No. 16/877,137 dated May 21, 2020.
MAAX I-E-S Rainmax Technical File.
MAAX IES with Rainmax Tropical Rain for MAAX IES 3/4, Mar. 9, 2012, 1 page.

* cited by examiner

SHOWER

CROSS-REFERENCE TO RELATED PATENT APPLICATIONS

This application is a Continuation of U.S. patent application Ser. No. 16/367,361, filed Mar. 28, 2019, which is a Continuation of U.S. patent application Ser. No. 15/637,919, filed Jun. 29, 2017 (now U.S. Pat. No. 10,456,794), which is a Continuation of U.S. patent application Ser. No. 14/843,692, filed Sep. 2, 2015 (now U.S. Pat. No. 9,718,068), which claims the benefit of and priority to U.S. Provisional Application No. 62/045,390, filed Sep. 3, 2014. The entire disclosures of the foregoing applications are hereby incorporated by reference herein.

BACKGROUND

The present application relates generally to the field of showers, baths, and faucets. The present application relates more specifically to the field of showers.

Conventional shower systems receive a pressurized supply of water and provide substantially continuous streams of water from a showerhead by forcing the water through nozzle holes to create streams. Some streams may break into drops via aerodynamics after the stream has left the showerhead. These systems may use a relatively high volume of water to produce the streams of water. Thus, there is need for a shower that produces a satisfying shower experience at a lower flow rate.

Some shower systems provide streams of water from ceiling panels, but do not simulate the sound and feel of rain. Some users may prefer the feel of rain to that of a shower. That is, some users may prefer the experience of showering in the rain. Thus, there is a need for a shower that produces a more realistic feel of rain.

SUMMARY

One embodiment relates to a shower assembly having a panel including a wall and a first plurality of holes passing through the wall from the inner surface to the outer surface, each hole of the first plurality of holes comprising an inlet and an outlet. The wall at least partially defines a reservoir and has an outer surface on a side of the wall toward a showering area and an inner surface on a side of the wall away from the showering area. When water is provided to the reservoir, water passes through the first plurality of holes, forms a drop at the outlet of each of the first plurality of holes, and falls from the panel as a plurality of drops.

Another embodiment relates to a shower assembly having a panel and a stopper movable between a first position and a second position. The panel includes a first region having a plurality of first openings passing through the panel and a second region having a plurality of second openings passing through the panel. When the stopper is in the first position, water provided to the shower assembly is permitted to pass through the plurality of first openings but is prevented from passing through the plurality of second openings. When the stopper is in the second position, water provided to the shower assembly is permitted to pass through the plurality of second openings.

Another embodiment relates to a shower assembly including a top wall; a bottom wall; at least one sidewall extending between the top wall and the bottom wall; a chamber defined by the top wall, the bottom wall and the at least one sidewall; an inlet port configure to receive water from a water source and to provide water into the chamber; and a first plurality of holes passing through the bottom wall, each hole of the first plurality of holes comprising an inlet and an outlet. The shower assembly is configured such that, when water is provided to the chamber at a first operating flow rate, water partially fills the chamber to a first height, passes through the first plurality of holes by gravitational force, forms a drop at the outlet of each of the first plurality of holes, and falls from the bottom wall as a plurality of drops.

Another embodiment relates to a shower assembly having an inlet, a reservoir, a plurality of first outlets, and a plurality of second outlets. The inlet is for receiving water from a water source, and is configured to restrict water flow from the water source to a maximum inlet flow rate. The reservoir receives from the inlet. The plurality of first outlets are configured to pass water from the reservoir. The plurality of second outlets are configured to selectively pass water from the reservoir. The shower assembly is configured for a user to selectively control whether water passes through the plurality of second outlets. A sum of a first collective flow rate of the plurality of first outlets and a second collective flow rate of the plurality of second outlets is greater than the maximum inlet flow rate.

Another embodiment relates to a shower assembly comprising an inlet port, a reservoir, a plurality of first outlets, and a plurality of second outlets. The inlet port is for receiving water from a water source at a source flow rate. The reservoir receives water from the water source through the inlet port. The plurality of first outlets are configured to continuously pass water from the reservoir, and have a first collective flow rate that is approximately equal to the source flow rate. The plurality of second outlets configured to selectively pass water from the reservoir simultaneous with water being passed from the plurality of first outlets.

Another embodiment relates to a shower assembly having a reservoir comprising a first plurality of outlet holes and a second plurality of outlet holes. The reservoir is configured to receive water from a water source at a source flow rate. The reservoir is configured such that during a first operational state, water exits the reservoir only through the first plurality of outlet holes at a first flow rate that does not exceed the source flow rate. The reservoir is configured such that during a second operational state, water exits the reservoir through the first plurality of outlet holes at the first flow rate and the second plurality of outlet holes at a second flow rate, and a total of the first flow rate and the second flow rate of water exiting the reservoir through the first and second pluralities of outlet holes exceeds the source flow rate.

Another embodiment relates to a control system for a shower assembly, comprising processing electronics configured to control, in relation to a shower assembly of any of the above embodiments, at least one of a flow rate of the water, a temperature of the water, a position of the stopper, an audio device, a lighting system, a scent emitter, a disinfecting system, and a trajectory of the drops.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings. Any or all of the features, limitations, configurations, components, subcomponents, systems, and/or subsystems described above or herein may be used in combination.

DETAILED DESCRIPTION

Figure 1:
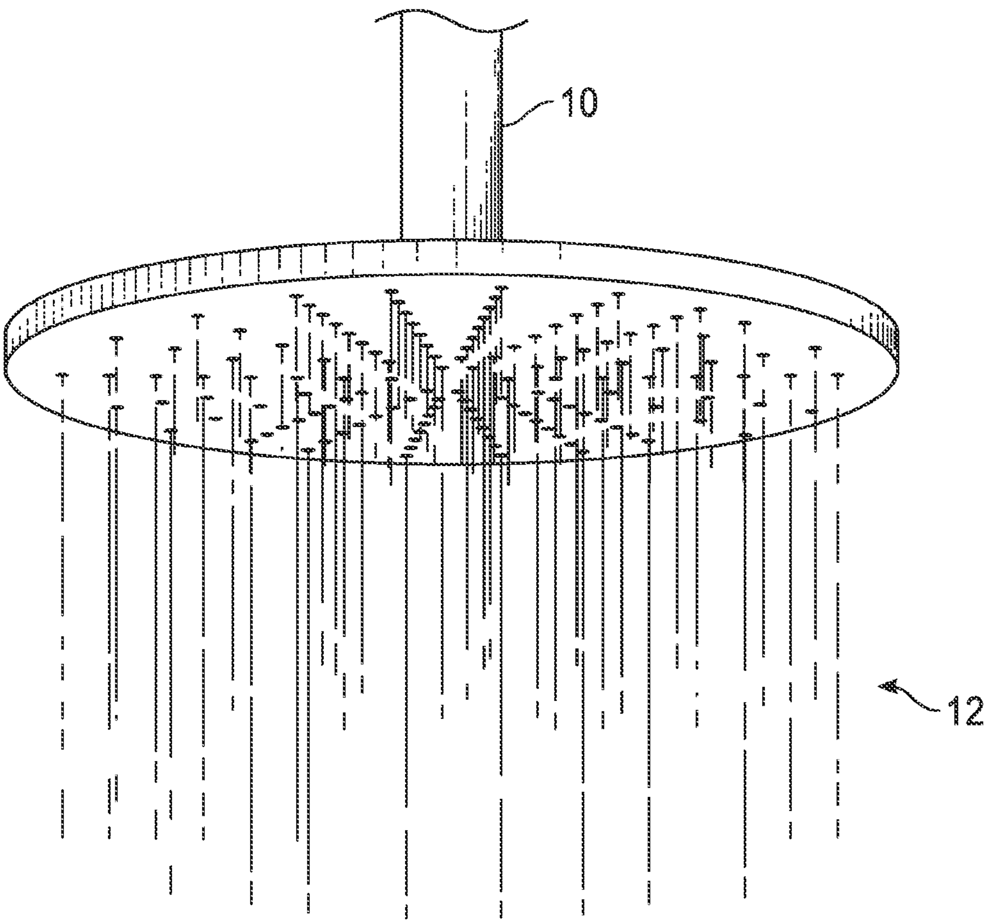
FIG. 1 (Prior Art)
FIG. 1 is a perspective view of a prior art showerhead.

Referring generally to FIGS. 4A-23, a shower assembly 100 and components thereof are shown according to an exemplary embodiment. The shower assembly 100 is shown to include a panel 102 having an inlet port 106 for receiving water from a source, a reservoir 120, and pluralities of holes 108*a*, 108*b*, 108*c* (e.g., outlets) for providing the water from the panel 102 to the user. According to the exemplary embodiment shown, the reservoir 120 feeds the holes 108*a*, 108*b*, 108*c* by the force of gravity, and the holes 108 are configured to form drops 20 on the bottom wall 110 of the panel 102 such that discrete drops 20 of water fall on the user like rain. A streaming apparatus 150 (e.g., deluge, douse, drench, flood, etc.) allows the water in reservoir 120 to selectively access another plurality of holes 108*d*, which are configured to allow the water to stream from the panel 102. The shower assembly 100 may include a control system 200, which may include a controller 230 and/or processing electronics 262, and may be configured to control the flow and/or temperature of the water, lights, an audio device, etc.

Before discussing further details of the shower assembly and/or the components thereof, it should be noted that references to "front," "back," "rear," "upward," "downward," "inner," "outer," "right," and "left" in this description are merely used to identify the various elements as they are oriented in the Figures. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1, a prior art showerhead 10 is shown according to an exemplary embodiment. In a conventional showerhead 10, water is received from a pressurized source, routed (e.g., through a manifold) to a plurality of openings that are dimensioned to create substantially continuous streams 12 of water as water is forced through the openings. In some cases, the streams 12 may break into drops via aerodynamics after the stream 12 has left the showerhead 10.

Figure 2:
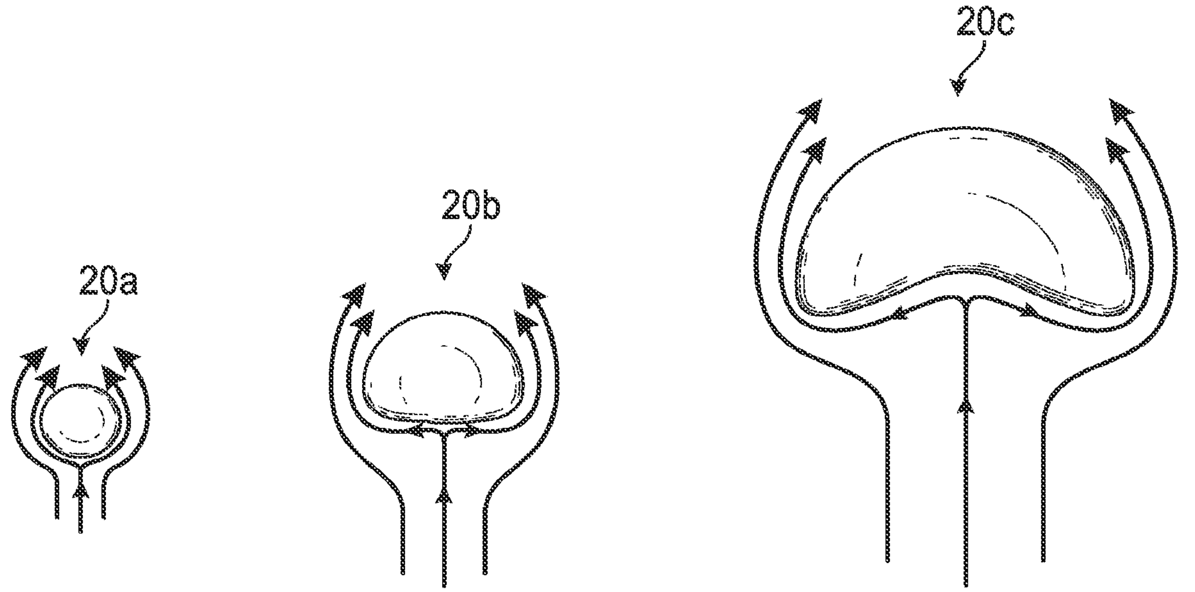
FIG. 2 is a schematic view of rain drops of various sizes being affected by airflow.
Figure 3:
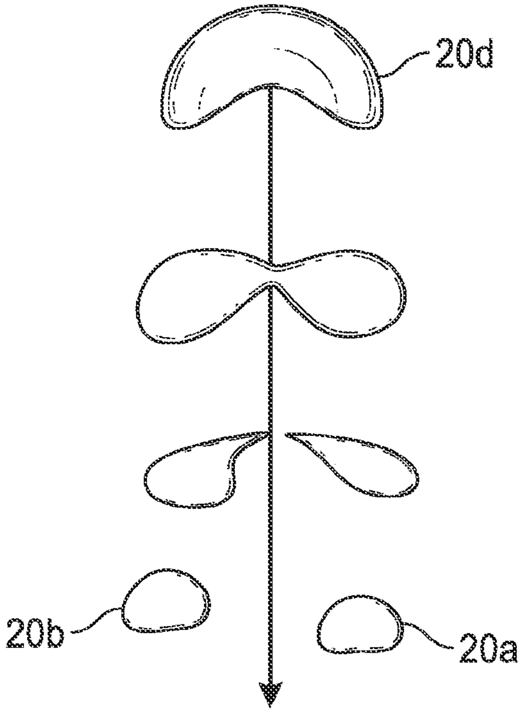
FIG. 3 is a schematic view of large rain drop being split by aerodynamic forces.

Rain, however, is different than the streams 12 provided by a conventional showerhead 10. Rain looks different, rain sounds different, and rain feels different. This is because rain is made of discrete drops 20 of water instead of continuous streams 12 of water. Referring to FIGS. 2 and 3, various sizes of drops 20 (e.g., small drops 20*a*, medium drops 20*b*, large drops 20*c*, very large drops 20*d*, etc.) of water are shown according to exemplary embodiments. Light rain or drizzle typically has drops 20*a* having a diameter of less than 0.5 mm (0.02 inches). Moderate rain includes drops 20*b* having a diameter of 1 mm to 2.6 mm (0.04 inches to 0.10 inches). Heavy rain (e.g. thunderstorm) includes drops 20*c* of up to approximately 5 mm (approximately 0.19 inches) in diameter. The arrows of FIG. 2 represent air flowing around the drops 20 as they fall. As shown, the falling drops 20 are deformed by aerodynamic effects. Referring to FIG. 3, drops 20*d* larger than 5 mm (0.2 inches) tend to deform and split into smaller drops 20*a*, 20*b* as they fall through the atmosphere.

Figure 4A:
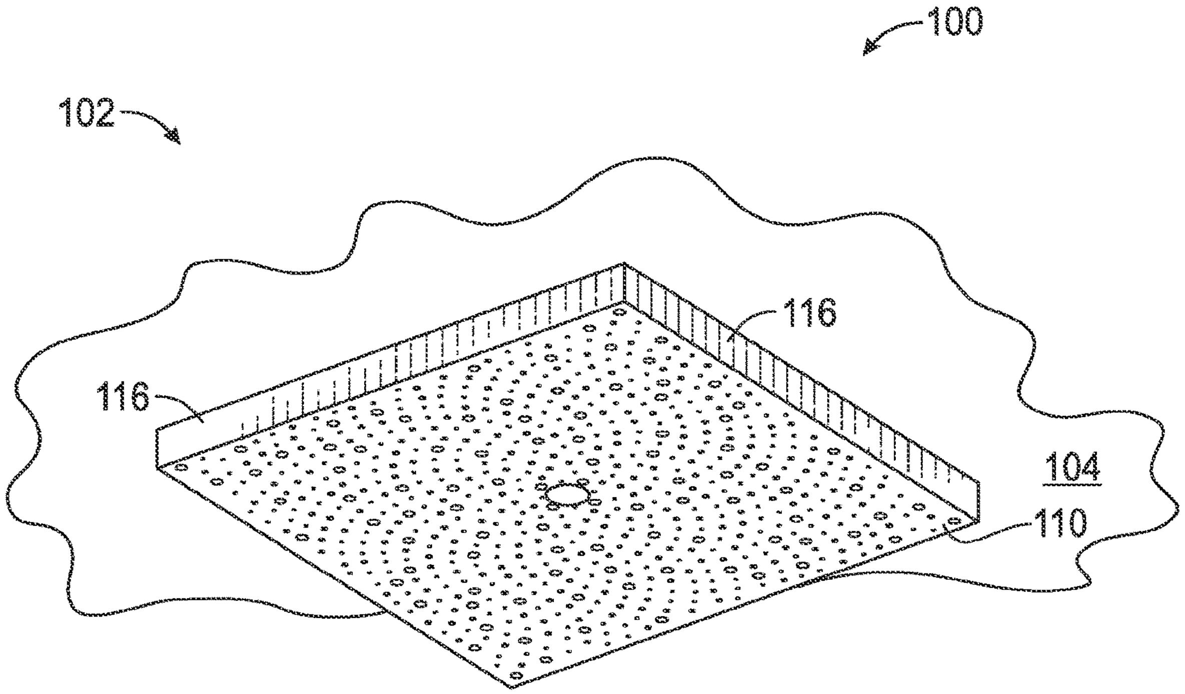
FIG. 4A is a bottom perspective view of a shower assembly in an off state, shown according to an exemplary embodiment.
Figure 4B:
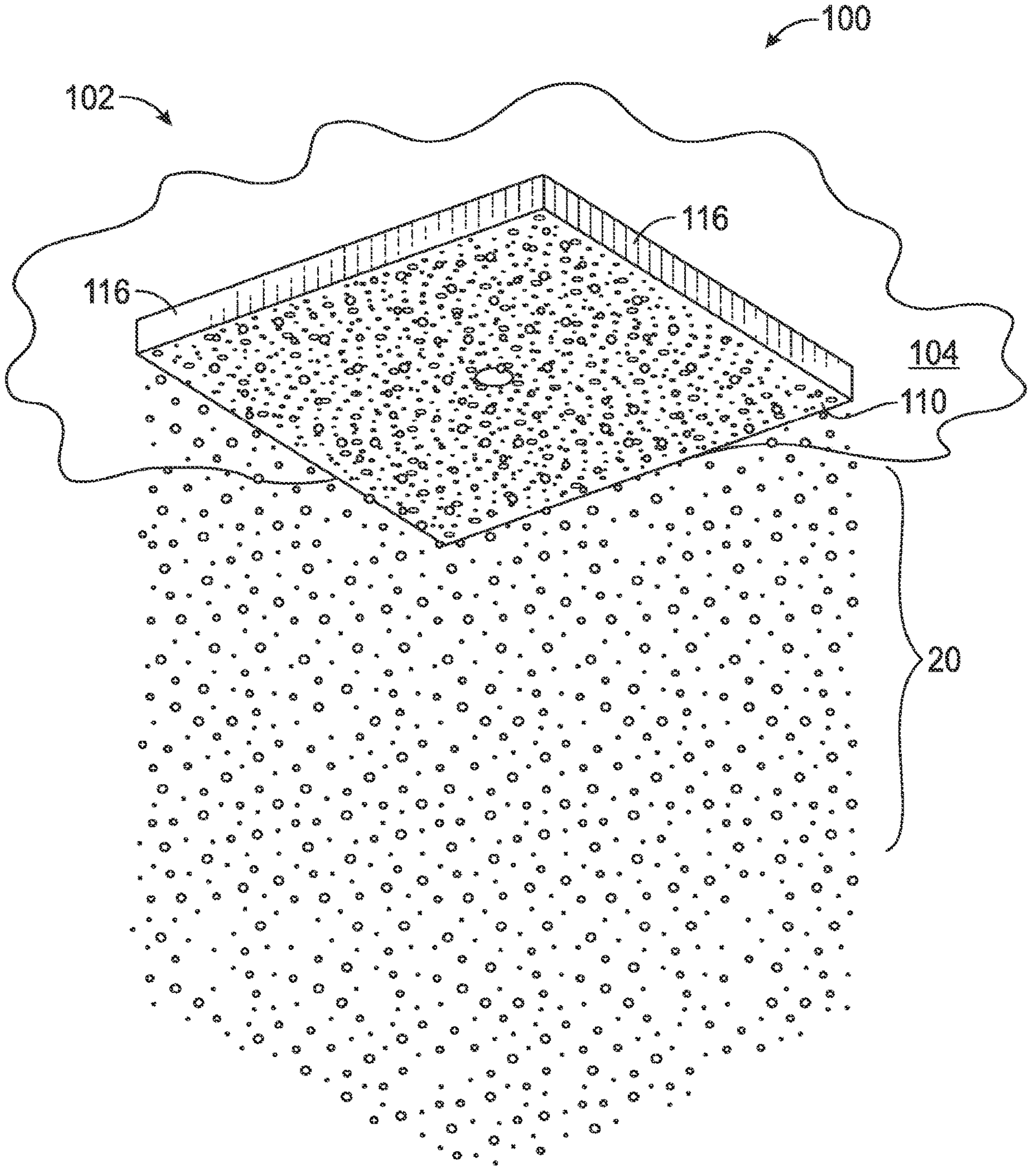
FIG. 4B is a bottom perspective view of the shower assembly of FIG. 4A in an on state, shown according to an exemplary embodiment.
Figure 5:
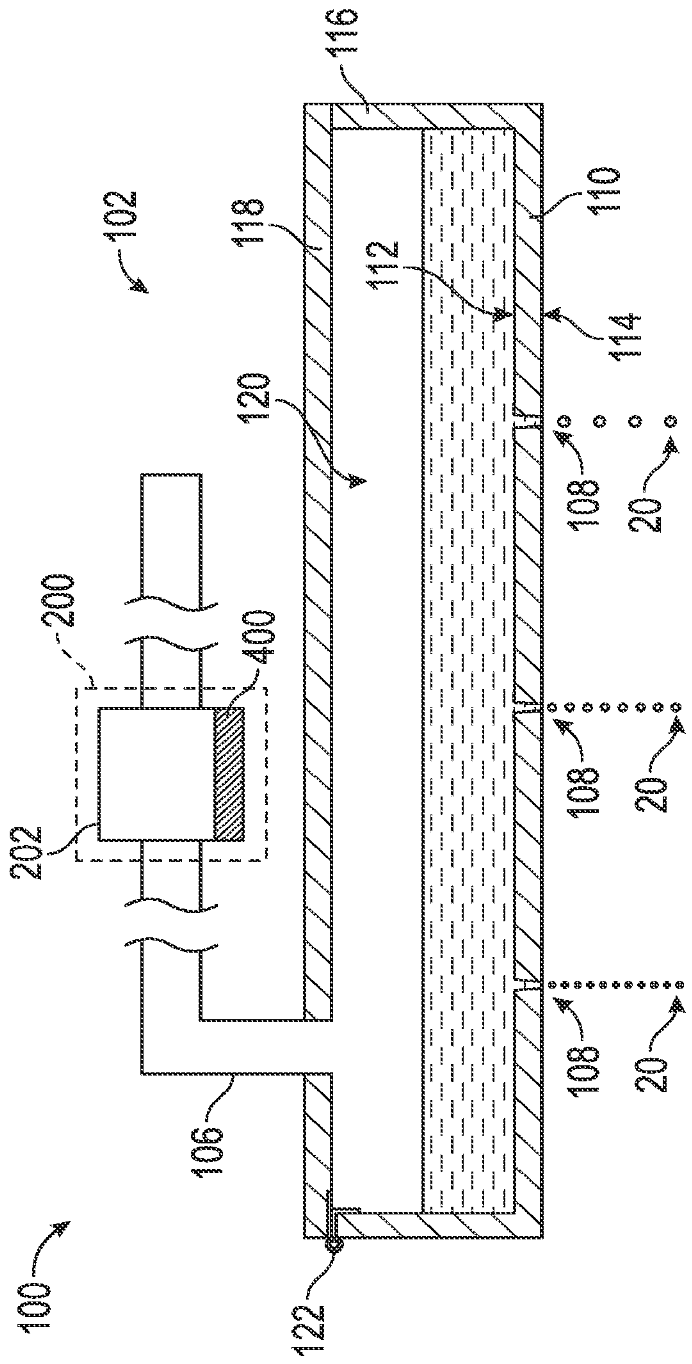
FIG. 5 is a schematic front sectional view of the shower assembly of FIGS. 4A-B, shown according to an exemplary embodiment.

Referring to FIGS. 4A, 4B, and 5, bottom perspective views and a schematic front sectional view of a shower assembly 100 are shown, according to exemplary embodiments. The shower assembly 100 includes a panel 102 (e.g., spray head, etc.) installed in, or proximate to, a ceiling 104. The shower assembly 100 includes an inlet port 106 for receiving water from a source and one or more pluralities of outlet ports 108 (e.g., holes, passages, openings, etc.) for providing the water from the panel 102 to the user. For the sake of clarity, FIG. 5 is shown with only a few holes 108, although it should be understood that there may be many holes 108. The shower assembly of FIG. 4A is shown in an off state, for example, in which the fluid control valve 202 is in an off state, no water is supplied to the panel 102, and water has drained from the panel 102. The shower assembly of FIG. 4B is shown in an on state, for example, in which water is supplied to the panel 102 and/or water is falling from the panel 102. As shown, the panel 102 is shown to be proud of the ceiling 104; however, is it contemplated that the panel 102 may be recessed in the ceiling 104 and the panel 102 (e.g., a bottom wall 110) may appear to be substantially flush with the ceiling 104 (see, e.g., FIG. 20).

Figure 12:
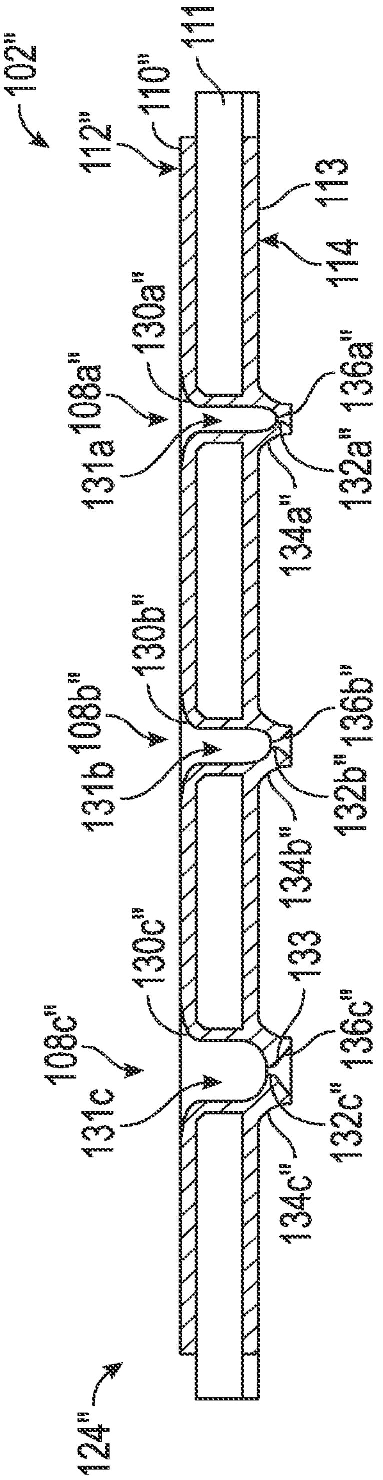
FIG. 12 is a sectional elevation view of a portion of the shower assembly of FIGS. 4A-B, shown according to an exemplary embodiment.
Figure 33:
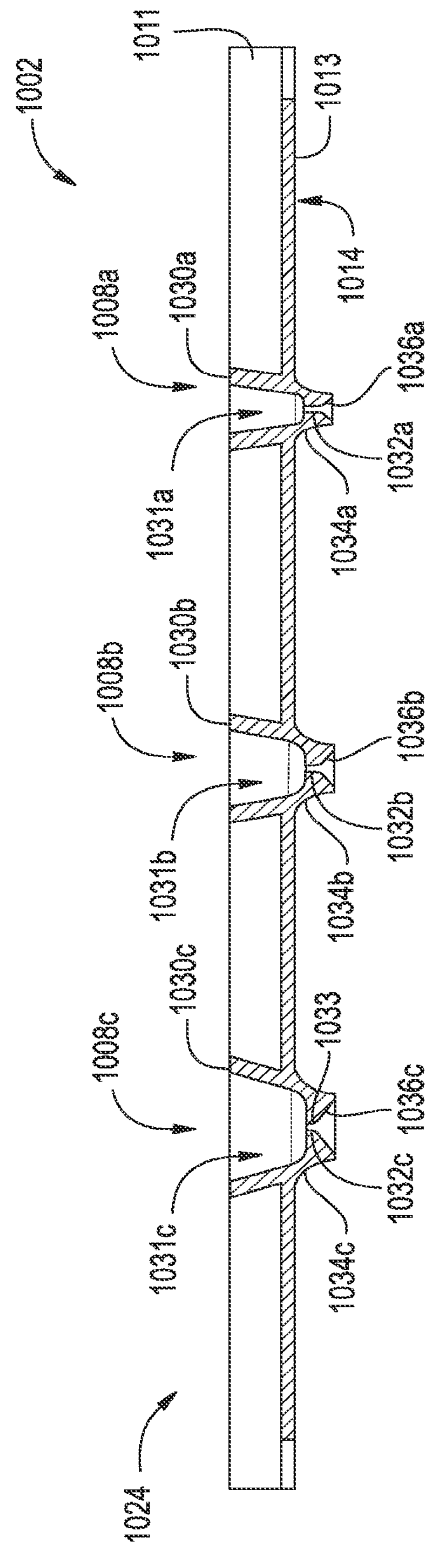
FIG. 33 is a sectional elevation view of a portion of the shower assembly of FIGS. 4A-B, shown according to an exemplary embodiment.
Figure 34:
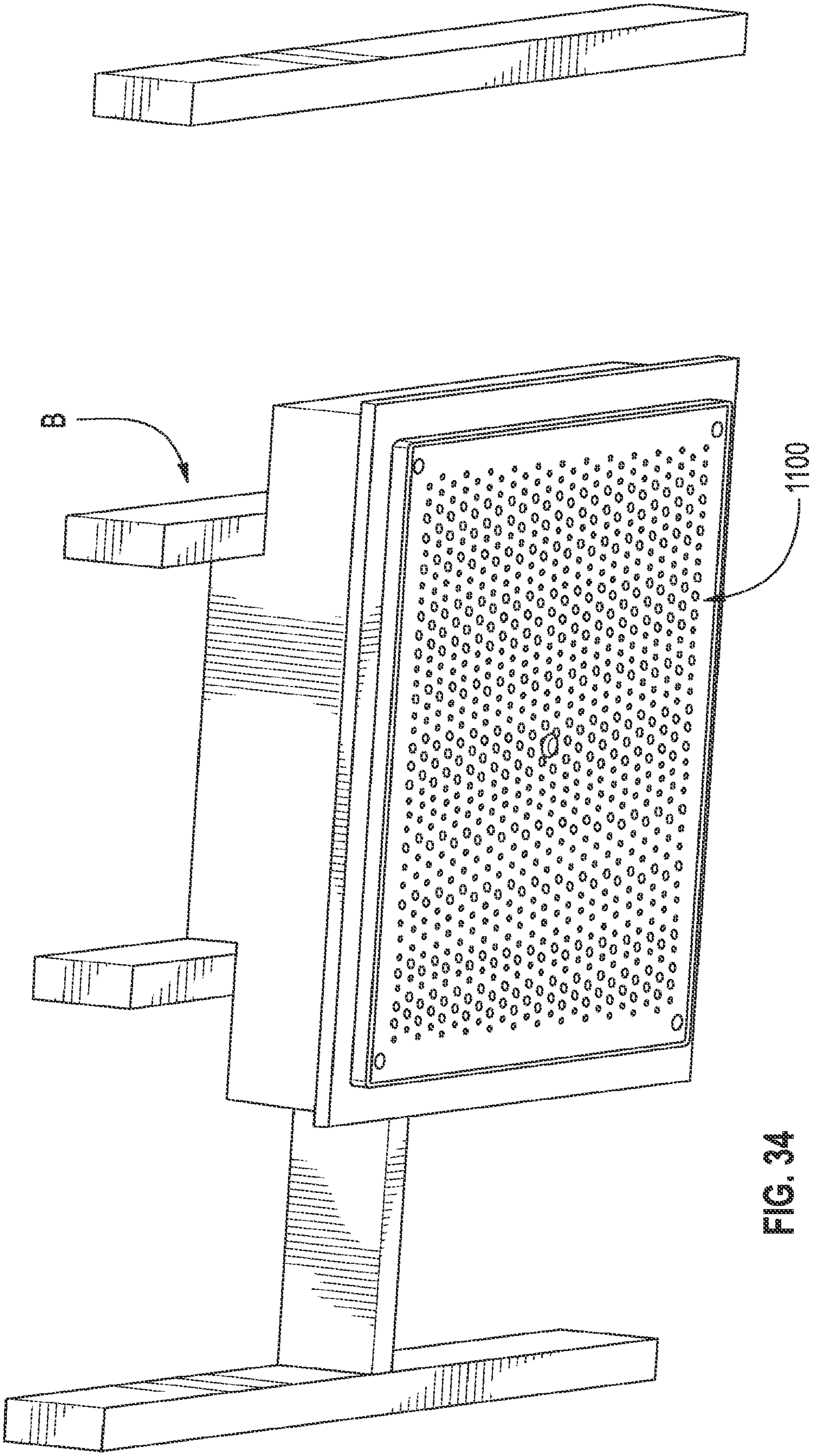
FIG. 34 is a lower perspective view of a shower assembly according to an exemplary embodiment installed in a building structure.
Figure 35:
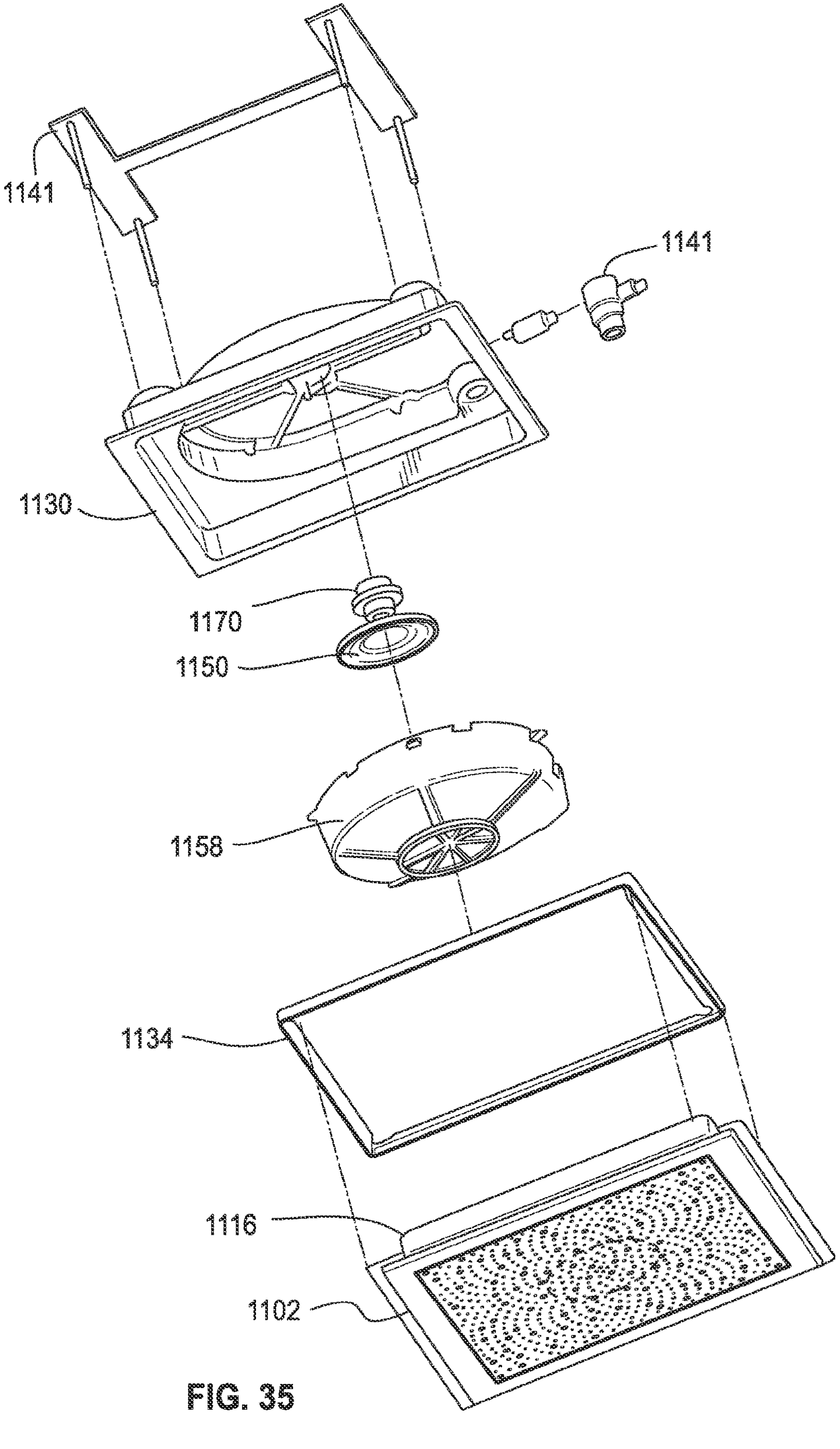
FIG. 35 is an exploded view of the shower assembly according to the exemplary embodiment shown in FIG. 34.
Figure 36:
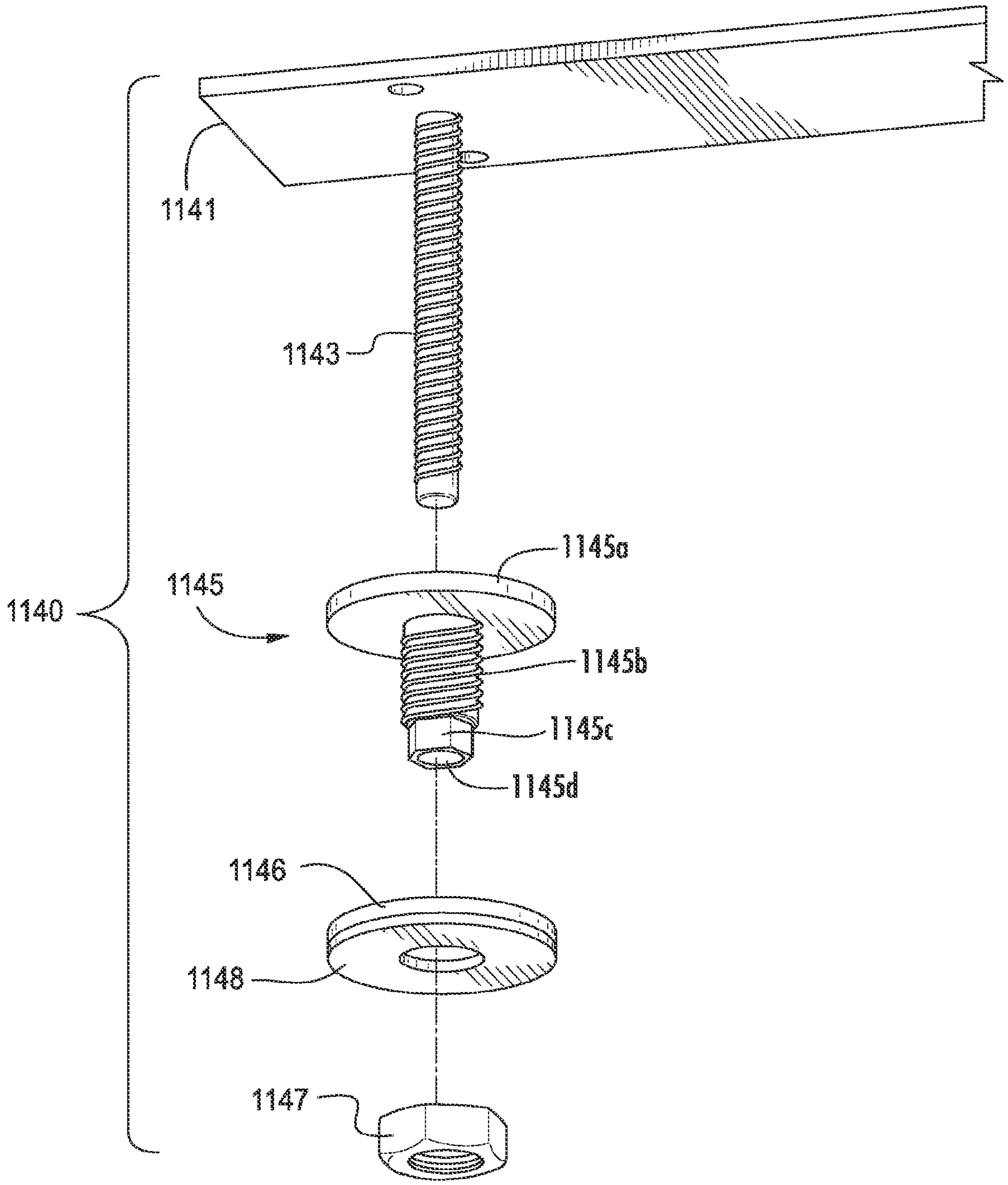
FIG. 36 is a partial exploded view of a portion of a mounting system a shower assembly.
Figure 37:
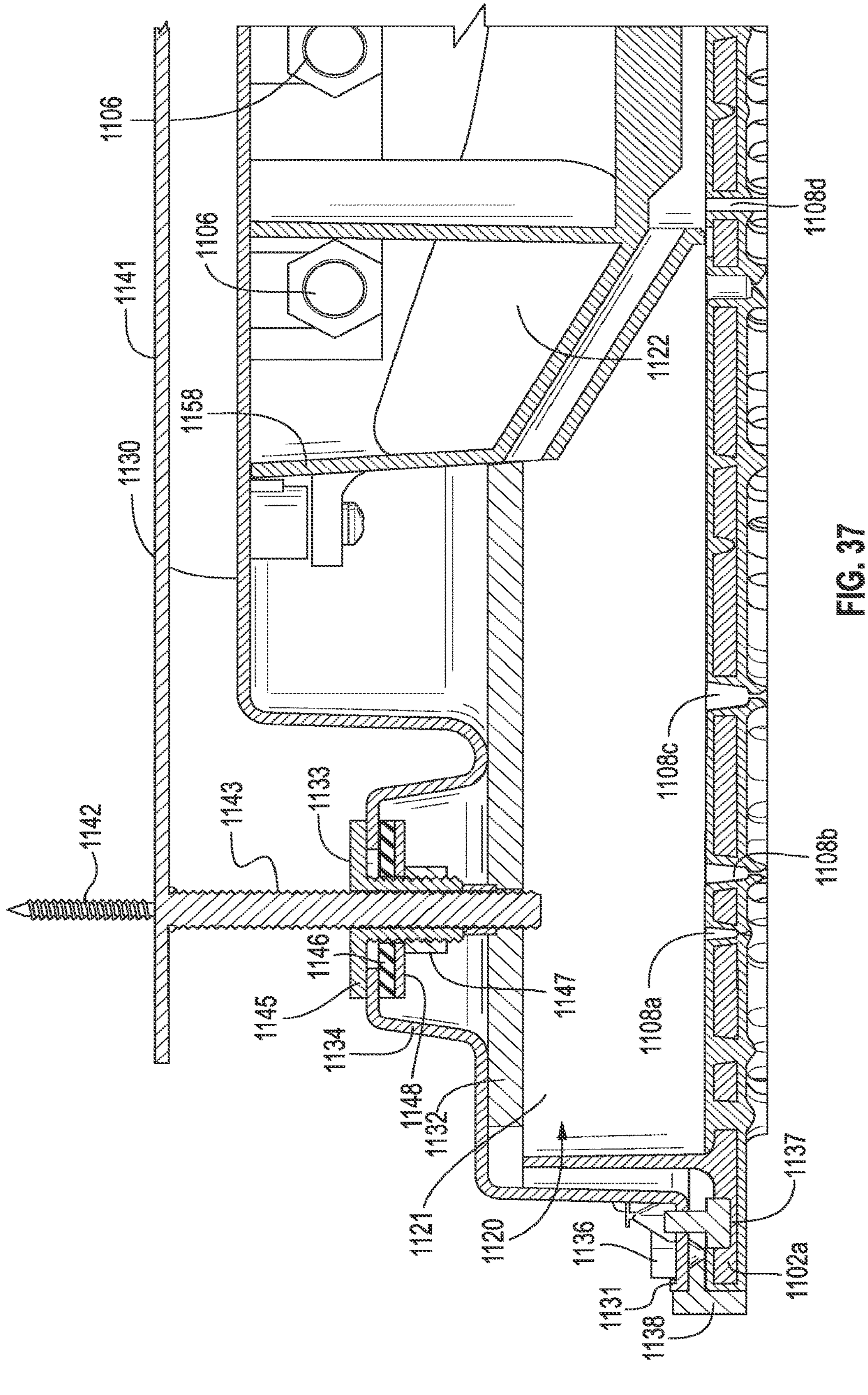
FIG. 37 is a partial cross-sectional view of the shower assembly according to the exemplary embodiment shown in FIG. 34.

The panel 102 includes a wall (e.g., first wall, lower wall, spray wall, drip wall, etc.), shown as bottom wall 110, having a first surface (e.g., inner surface, inlet side, etc.), shown as top surface 112, and a second surface (e.g., outer surface, outlet side, spray face, drip face, etc.), shown as bottom surface 114 opposite the top surface 112. According to the exemplary embodiment, the bottom surface 114 is on a side of the bottom wall 110 that is toward a showering area, and the top surface 112 is on a side of the bottom wall 110 that is away from a showering area. The panel 102 may further include one or more sidewalls 116 extending up from the bottom wall 110 and a top wall 118. A reservoir 120 (e.g., chamber, cavity, tank, etc.) is at least partially defined by one or more of the bottom wall 110, sidewalls 116, and top wall 118. The bottom wall 110 may be formed of any suitable material having appropriate machine-ability or mold-ability (e.g., acrylic, silicone, polycarbonate, Lithocast®, stainless steel, etc.). Referring briefly to FIG. 12, the panel 102" may be formed by overmolding a second material onto a substrate 111 (e.g., core, etc.). For example, the substrate 111 may be a substantially rigid plastic core that provides structural integrity to the bottom wall 110 and may have a silicone surface 113 overmolded thereon to facilitate cleaning (e.g., hygiene, mineral buildup, etc.). The silicone surface 113 may substantially surround the substrate 111 and form the top surface 112", the bottom surface 114", or both. For example, as shown in FIG. 33, the bottom wall 1010 includes a substrate 1011 having holes therethrough with silicone lining the holes of the substrate 1011 to form the outlet ports 1008 (e.g., the inlet 1030, bore 1032, and outlet 1034). The substrate 1011 generally forms the top surface 1012 of the bottom wall 1010, along with the inlets 1030 that are generally flush with the substrate 1011. The silicone is further coupled to a bottom of the substrate to form the bottom surface 1014 of the bottom wall 1010, along with the outlet ports 1008, which protrude downward therefrom. It should be noted that the configuration of the bottom wall 1010 depicted in FIG. 33 and described herein may be used with any of the embodiments of the shower assemblies disclosed herein (e.g., 100, 200, 300, 400, 500, 600, 1100).

The panel 102 may be opaque, translucent, or transparent. A translucent panel may allow light through the panel without showing mineral buildup in the reservoir. A transparent panel may allow light and any mineral buildup to be seen through the panel 102, and a hydrophobic pattern may be applied to the top surface 112 of the panel 102 to cause the mineral buildup to form in an aesthetically pleasing pattern. The transparent or translucent panels may be backlit (e.g., by one or more lights 212 shown in FIG. 23), thereby allowing the movement of water in the panel 102 to be seen by the user, which may be aesthetically pleasing. The sidewalls 116 and top wall 118 may be formed of the same or a different material as the bottom wall 110. According to the embodiment shown, the walls (bottom wall 110, sidewalls 116, etc.) of the panel 102 are flat; however, it is contemplated that the walls may be curved to facilitate fluid flow and thorough emptying of the panel 102 (e.g., to facilitate drying of the panel between uses).

The panel 102 may open to permit access to the reservoir 120 for cleaning and maintenance. According to various embodiments, the bottom wall 110 may releasably couple to the sidewalls 116, or the sidewalls 116 may be releasably coupled to the top wall 118. For example, the various walls (bottom wall 110, sidewalls 116, top wall 118, etc.) may be snapped together, latched together, or coupled by one or more hinges. According to the exemplary embodiment shown, the bottom wall 110 and the sidewalls 116 form a unitary structure that is rotatably coupled to the top wall 118 via a hinge 122.

The source of water may be pressurized (e.g., from a municipal water supply, well pump, water tower, elevated water tank etc.), and the flow of water to the panel 102 may be controlled by a control system 200, which may include one or more fluid control valves 202 (e.g., volume control valve, mixing valve, thermostatic valve, pressure balance valve, etc.). The fluid control valve 202 may also be configured to limit or restrict a flow rate of water received from a water source (e.g., a water source flow rate) to reduce a flow rate into the shower assembly 100, itself, (e.g., a maximum inlet flow rate). For example, instead or in addition to the fluid control valve 202, the inlet 106 may include a flow restrictor that restricts water flow from the water source, or may otherwise be configured to restrict flow, such that maximum inlet flow to the shower assembly 100 is limited, for example, according to local regulations. As will be described in more detail below, it is contemplated that during an exemplary use of the shower assembly 100, the reservoir 120 may be only partially filled (e.g., not be completely filled) and, therefore, not pressurized. Thus, the top wall 118 may be provided to prevent overflow, contain inadvertent splashing, facilitate cleaning, etc.

According to one embodiment, the shower assembly 100 may include a disinfecting system 700 that disinfects portions of the shower assembly 100 to kill bacteria. For example, another embodiment of the disinfecting system 700 may include a heater that raises the temperature of the fluid control valve 202 to kill any bacteria therein. Exemplary disinfecting systems are described in U.S. patent application Ser. No. 13/797,263, entitled "Mixing Valve," and U.S. patent application Ser. No. 13/796,337, entitled "Plumbing Fixture with Heating Elements," both of which were filed Mar. 12, 2013, and are incorporated herein by reference in their entireties. Operation of the disinfecting system may be controlled by the control system 200 described in more detail below.

Before discussing further details of the panel 102 and/or the components thereof, it should be noted that elements of various sizes and geometry in the exemplary embodiment are shown with an alphanumeric reference numeral. For the purpose of clarity, elements are generically referred to using only the numeric reference numeral.

Figure 6:
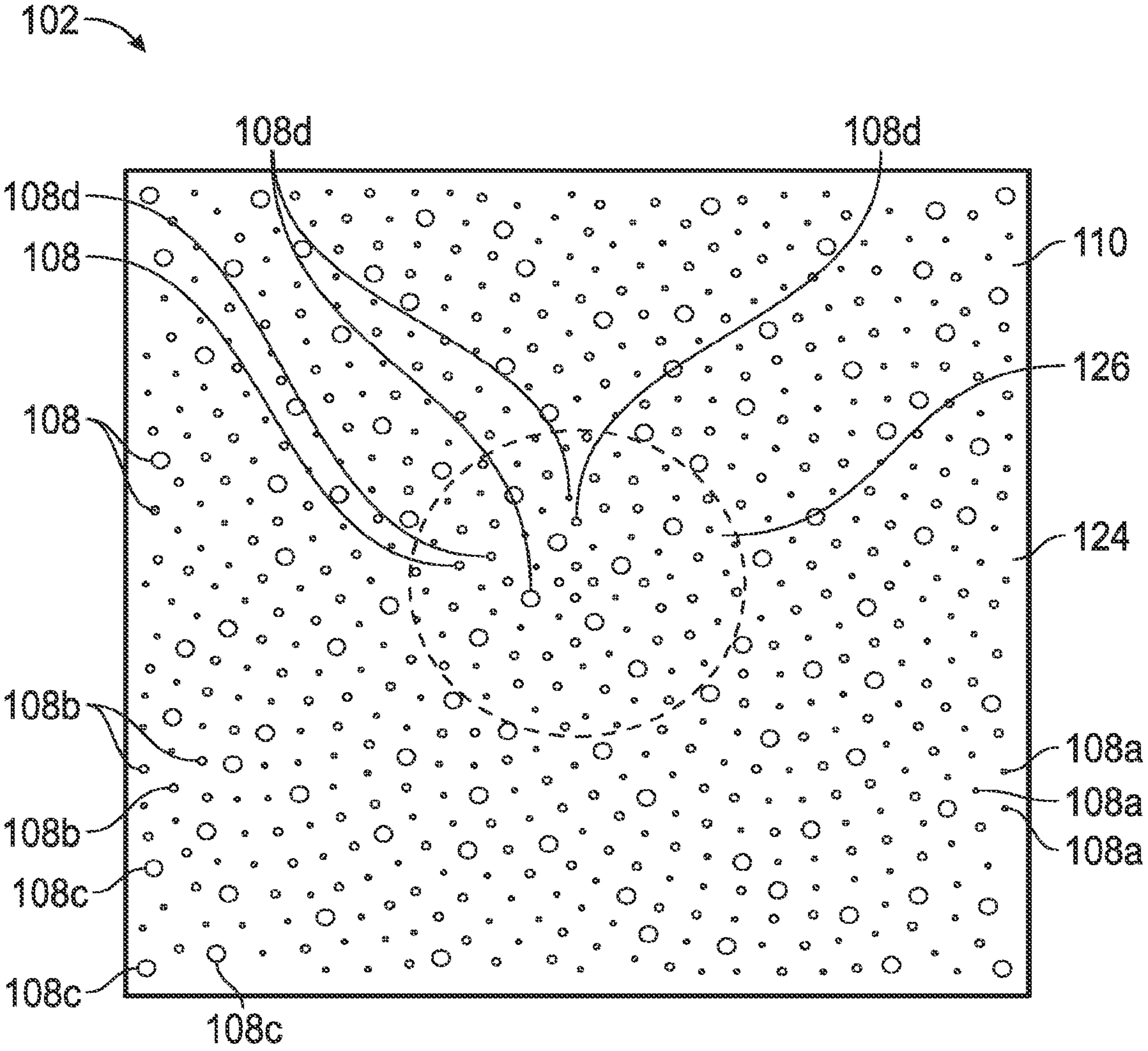
FIG. 6 is a bottom plan view of the shower assembly of FIGS. 4A-B, shown according to an exemplary embodiment.

Referring to FIG. 6, a bottom plan view of the panel 102 is shown according to an exemplary embodiment. As shown, a plurality of outlet ports, shown generally as holes 108, is located on the bottom wall 110. According to the exemplary embodiment shown, the plurality of holes 108 may include a first plurality of holes 108*a*, a second plurality of holes 108*b*, a third plurality of holes 108*c*, and a fourth plurality of holes 108*d* (e.g., plurality of streaming holes, etc.). As will be discussed further below, the first, second, and third pluralities of holes 108*a*, 108*b*, 108*c* are shown to form small, medium, and large drops 20, respectively (e.g., drops 20 having a first diameter, a second diameter, and a third diameter). In various other embodiments, the respective pluralities of holes may form any size drops 20 or combinations thereof, and panel 102 may include additional pluralities of holes 108 configured to form other sizes or rates of drops 20.

The bottom wall 110 includes a first region 124 (e.g., outer region, dripping region, etc.) and a second region 126 (e.g., inner region, streaming region, etc.). The first region 124 and the second region 126 may be of any suitable sizes or shapes. For example, the first regions 124 and/or the second region 126 may circular, oval, elliptical, regular or irregular polygons, Reuleaux polygon, or any other suitable shape, which may have linear or curved sides. According to the exemplary embodiment shown, the first region 124 has an outer periphery of 24 inches by 24 inches (approximately 60 cm by 60 cm) square, and the second region 126 is substantially circular with a diameter of approximately 9 inches (approximately 23 cm). According to other exemplary embodiments, the first region 124 has an outer periphery of approximately 19 inches by 19 inches (approximately 48 cm by 48 cm) square, The dimensions could, of course, differ in other embodiments. For example, the first region 124 could be square or rectangular having at least one dimension of 21 inches (approximately 53 cm), 32 inches (approximately 81 cm), 36 inches (approximately 91 cm), etc. According to other embodiments, the shower assembly 100 may be modular, for example, formed of a plurality of adjoining (e.g., contiguous, adjacent, etc.) panels. The adjoining panels may, for example, each form a quadrant of the first region 124 and the second region 126. A modular assembly may facilitate an increased area of drop formation (i.e., raining) to accommodate additional users and may facilitate an increased flow rate (e.g., drops per second, volume per second, etc.), which may provide therapy benefits to the user, for example, increasing heat transfer to the user, increasing the temperature of the showering area, and increasing the humidity of the showering area. According yet other embodiments, the shower may include a plurality of spaced apart panels; for example, each panel being spaced approximately 4 inches (10 cm) from neighboring panel, and each panel may have different patterns and distributions of holes 108 to provide zones of different rain-type characteristics.

Figure 7:
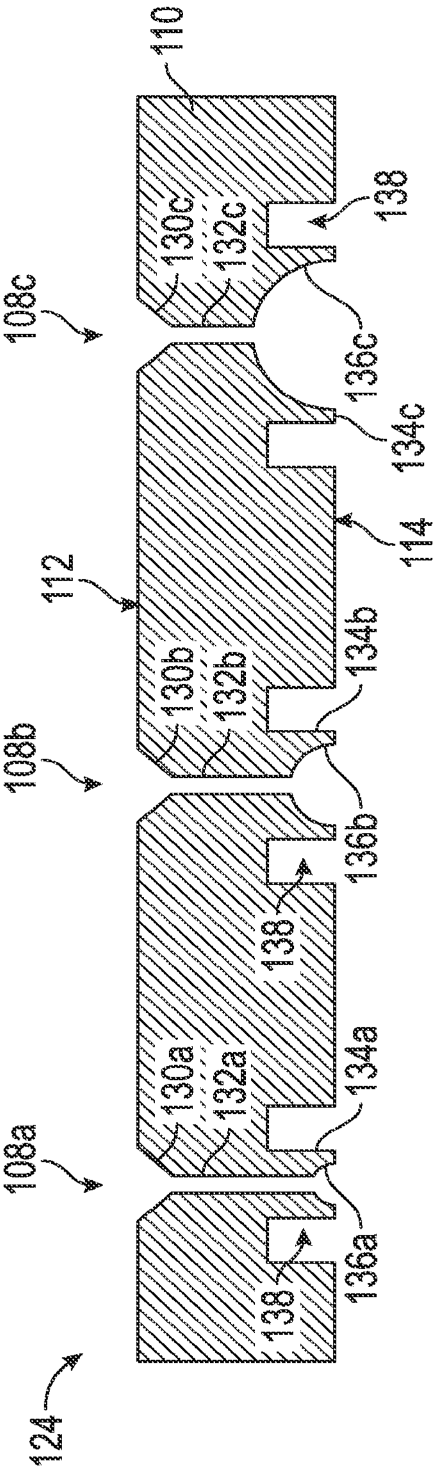
FIG. 7 is a sectional elevation view of a portion of the first region of the shower assembly of FIG. 6, shown according to an exemplary embodiment.

Further referring to FIG. 7, a cross-sectional view of a portion of the first region 124 of bottom wall 110 is shown, according to an exemplary embodiment. Cross-sectional views of an exemplary embodiment of each of the first, second, and third pluralities of holes 108*a*, 108*b*, and 108*c* are shown. Each hole 108 has an inlet 130 for receiving water from the reservoir 120; inlets 130 are shown to be conical to facilitate flow into the hole 108 (see also FIG. 33), but may be any other shape. That is, the inlets 130 may taper inwardly moving downward to the bore 132 with various profiles (e.g., conical or otherwise straight, hemispherical or otherwise curved), and may additionally define cisterns as described below. Each hole 108 has an outlet 136 defined by nozzle 134. According to the exemplary embodiment shown, the nozzle 134 is defined by a channel or groove formed (e.g., machined, molded, cast, countersunk, etc.) in the bottom surface 114 of the bottom wall 110.

A bore 132 extends between the inlet 130 and the outlet 136, providing a passageway for water to flow between the inlet 130 and the outlet 136. The bore 132 is configured to restrict the flow of water from the reservoir 120 to the outlet 136 such that the surface tension of water causes a drop 20 to form on the outlet 136. The diameter of the bore 132 is a function of the pressure of the water in the bore 132 and the inlet 130. In the exemplary embodiment shown, water flows through the bore 132 under the force of gravity, so the maximum pressure is limited to the height or depth of the panel 102. That is, the maximum pressure of water flowing in the reservoir is not impacted or pressurized by a supply pressure (e.g., line pressure) of the water source. Furthermore, to achieve a desired water height, and thereby pressure, within the reservoir, the number of holes 108 may be adjusted relative to the expected flow rate, for example if restricted by the inlet, into the shower assembly 102. According to other embodiments, the panel 102 may be pressurized by the supply of water to the panel, in which case the diameter of the bore 132 may be narrow to further restrict the flow of water from the reservoir 120 to the outlet 136. When the drop 20 reaches a predetermined size (e.g., critical stage), gravity overcomes the surface tension of the water and causes the drop 20 to decouple and fall from the panel 102. The size and rate of the drop 20 at the critical stage is a function of the material properties bottom wall 110, the temperature of the water (which in turn affects the temperature of the bottom wall), impurities in the water, the diameter of the bore 132, the length of the bore 132, and the geometry of the outlet 136. Applicants have determined how to regulate the flow of water to prevent streaming across operating conditions. Applicants have determined ranges of the bore 132 diameters and the outlet 136 geometries that provide consistent drop 20 formation across a variety of materials, operating temperatures, and bore lengths. More particularly, the geometries of the outlets 136 affect the size of the drops 20, and the diameter of the bore 132 affects drop formation versus streaming. That is, the geometry of each of the holes 108 is configured to produce discrete drops of water and to prevent streaming when water in the reservoir 120 is at or below the maximum pressure in the reservoir 120.

The diameter of the bore 132 is preferably less than 0.04 inches. According to another embodiment the diameter of the bore 132 is between 0.01 inches and 0.04 inches. According to the exemplary embodiment shown, the diameter of bore 132 is preferably between 0.025 inches and 0.03 inches. While the bores 132 are shown to be of the same diameter, it is contemplated that in various embodiments, the diameters of the bores **132*a*, 132*b*, 132*c* may be the same or different. For example, the diameter of the bore 132*c* may be slightly larger than the diameter of the bore 132*b*, which may be slightly larger than the diameter of the bore 132*a*. The slightly larger bore diameter for the large outlets 136 may increase flow rate through the bore 132**, which in turn may increase the rate (i.e., drops per second) of drop formation, thereby bringing the rate of large drop formation closer to that of the rate of medium or small drop formation.

As shown, the outlet 136 is hemispherical. However, it is contemplated that the outlet geometry make take other shapes, for example, ovoid, pyramidical, conical (shown, e.g., in FIGS. 12 and 13, as well as FIG. 33), substantially flat (shown, e.g., in FIG. 14), etc. According to some embodiments, the diameter of the outlet 136 ranges from the diameter of the bore 132 to about 0.35 inches. That is, the diameter of the outlet 136 may taper outwardly moving downward from the bore. According to another embodiment, the diameters of the outlets 136 range from about 0.025 inches to about 0.32 inches. According to the exemplary embodiment shown, the diameters of the outlets 136 range from about 0.075 inches to about 0.315 inches. According the exemplary embodiment shown, the diameter of the outlet **136*b*** is about 0.17 inches.

Figure 8:
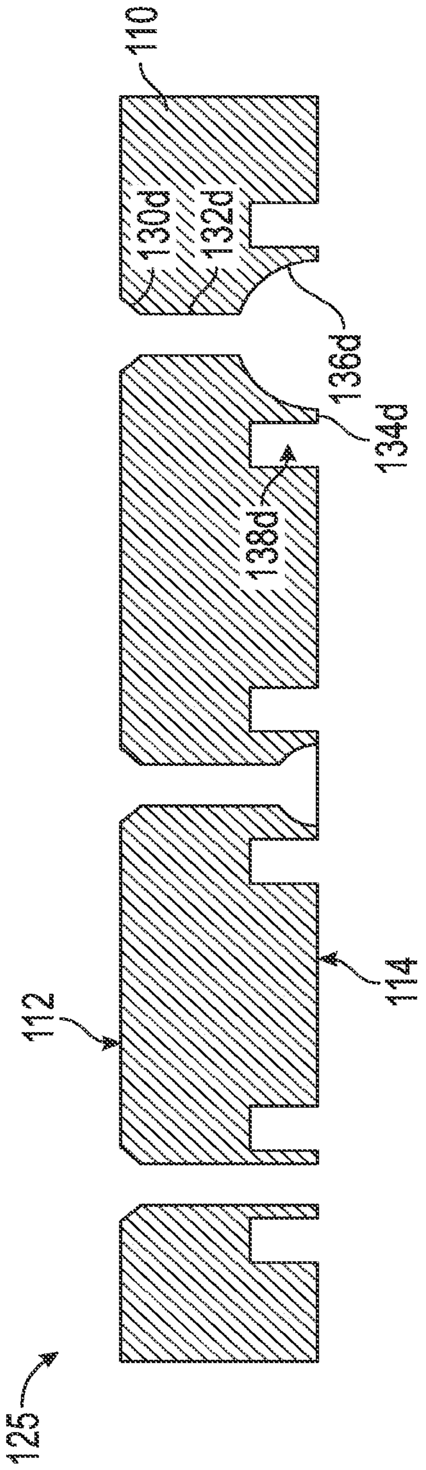
FIG. 8 is a sectional elevation view of a portion of the second region of the shower assembly of FIG. 6, shown according to an exemplary embodiment.

Further referring to FIG. 8, a cross-sectional view of a portion of the second region 126 of bottom wall 110 is shown, according to an exemplary embodiment. Cross-sectional views of exemplary embodiments of the fourth or streaming pluralities of holes **108*d* are shown. The holes 108*d* are shown to have an inlet 130*d*, a bore 132*d*, and an outlet 136*d* defined by a nozzle 134*d*. The nozzle 134*d* is shown to be defined by a groove 138*d* formed in the bottom surface 114 of the panel 102. The diameter of the bore 132*d* is sufficiently large such that water may pass sufficiently freely through the bore 132 so as to form a substantially continuous stream of water. In other words, the mass flow rate of water through the hole 108*d* is great enough that the gravitational force acting on the mass of the water continuously exceeds the surface tension force of the water attempting to bind the water to the panel 102. According to one embodiment, the bore 132*d* may have a diameter greater than 0.1 inches. According to the exemplary embodiment shown, the bore 132*d* has a diameter of about 0.125 inches. As described more below, a user may prefer a continuous stream 12 of water for some bathing activities, for example, rinsing off soap or shampoo. The holes 108*d* are shown to have outlets 136*d*. Because water flowing through the holes 108*d* forms a substantially continuous stream 12, the outlets 136*d* may not contribute to the formation of drops 20 during operation of the shower assembly 100**.

Figure 9:
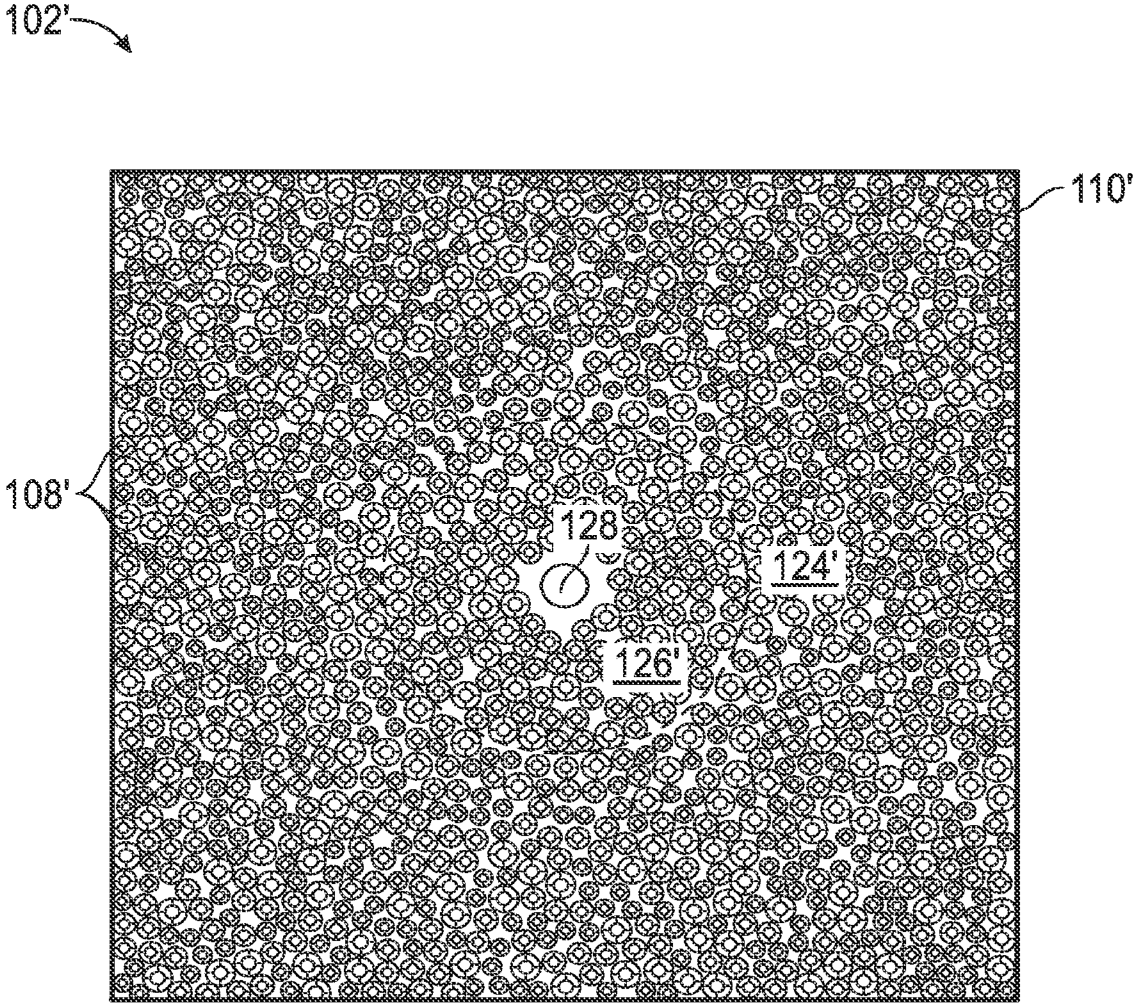
FIG. 9 is a bottom plan view of the shower assembly of FIGS. 4A-B, shown according to another embodiment.

Referring to FIG. 9, a bottom plan view of panel 102' is shown according to another exemplary embodiment having a bottom wall 110'. As shown, the bottom wall 110' has a plurality of outlet ports 108' distributed across a first region 124' and a second region 126' of the bottom wall 110'. The first region 124' and the second region 126' may be of any suitable sizes or shapes. According to the exemplary embodiment shown, the first region 124' has an outer periphery of 24 inches by 24 inches square (60 cm by 60 cm), and the second region 126' is substantially circular with a diameter of approximately 10 inches (approximately 25 cm); however, it is contemplated that other embodiments may have other sizes.

Figure 24:
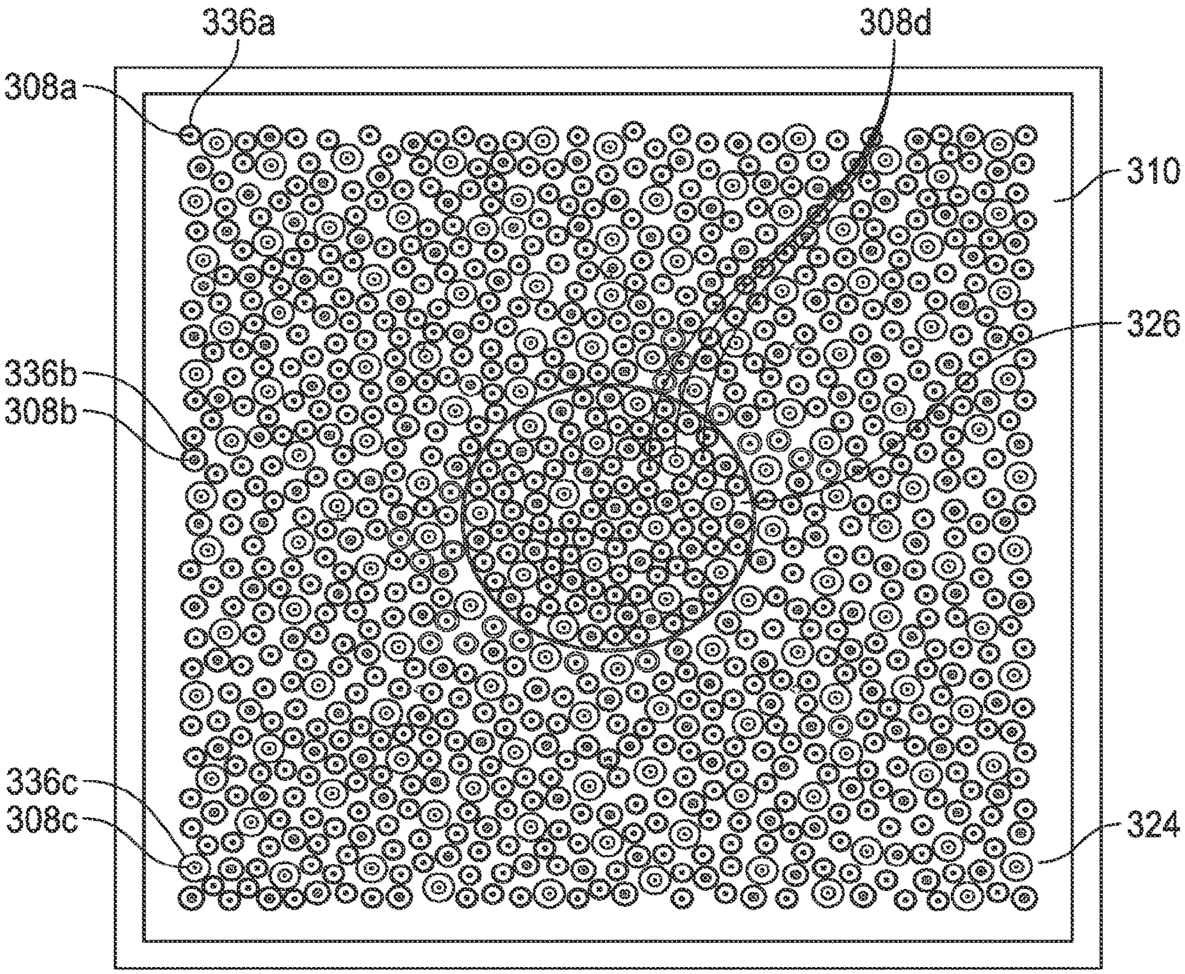
FIG. 24 is a bottom plan view of the shower assembly of FIG. 23.

The degree of randomness of the holes 108' shown in the embodiment of FIG. 9 is shown to be greater than the degree of randomness of the holes 108 shown in the embodiment of FIG. 6. For example, the distribution of holes 108 of the embodiment of FIG. 6 are relatively more ordered and relatively less random that the distribution of holes 108'. Referring briefly to FIG. 24, the holes 308 are shown to have a greater degree of randomness than the degree of randomness of the holes 108 shown in the embodiment of FIG. 6, and the density of holes 308 is shown to be between the density of the holes 108 shown in FIGS. 6 and 9. The random distribution of holes 108, 108', 308 provides a greater sensation of natural rain to the user than do ordered holes 108, 108', 308. However, it is contemplated that holes 108, 108', 308 may be arranged in rank and file, circles, spirals, or other ordered regular or irregular patterns. One of skill in the art will understand, upon reviewing this specification, that the random (e.g., substantially random, pseudo-random, statistically random, etc.) distribution of holes 108 may not be truly random in all respects because, for production purposes, a single substantially random pattern may be reproduced rather than forming a truly random distribution on each panel. That the distribution contains no recognizable patterns or regularities may be sufficient to be a random distribution as used herein. Furthermore, the random distribution of holes 108 may be segregated by, or within a, region. For example, holes **108*a*, 108*b*, 108*c* may be randomly distributed within the first region 124, 124', and the holes 108*d* may be randomly distributed with the second region 126, 126'**.

As shown, the density of holes 108' shown in the embodiment of FIG. 9 is greater than the density of holes 108 shown in the embodiment of FIG. 6. According to one exemplary embodiment, the bottom wall 110 of the panel 102 includes between approximately 250 and approximately 500 holes 108 per square foot. According to another embodiment, the panel 102 includes between approximately 300 and approximately 450 holes 108 per square foot. According to another embodiment, the panel 102 includes between approximately 300 and approximately 425 holes 108 per square foot. According to another embodiment, the panel 102 includes between approximately 400 holes 108 per square foot. These densities of holes 108 provide an authentic feeling of rain having enough drops to provide sufficient heat transfer to keep the user warm.

According to various embodiments, the distribution of small, medium, and large outlets 136, 136' may not be equal. For example, the distribution of small outlets 136*a* to large or medium and large outlets 136*b*, 136*c* may be in the range of approximately 2:1 to approximately 3:1. Referring briefly to FIG. 24, the distribution of outlets 336 is shown to be biased toward more small outlets 336*a* and fewer medium and large outlets 336*b*, 336*c*. Small outlets 136*a* form small drops 20*a*, which are formed faster than medium or large drops 20*b*, 20*c* are formed. Faster drop formation increases the rate (i.e., drops per second) of drops falling, thereby creating greater drop density and increasing heat transfer to the user. As discussed above, increasing the size of the panel 102 could increase the number of large outlets 136*c*, thereby increasing the rate of large drops 20*c*; however, this would require a higher flow rate and be over a larger area, not all of which may project onto the user. Furthermore, too many large drops may desensitize the user to the smaller drops. It is further contemplated that the distribution of holes may be configured to match local preferences for rain (e.g., monsoon versus shower, etc.) and to operate under local rates of supplied water (which may be as high as 6 gallons per minute).

Figure 10:
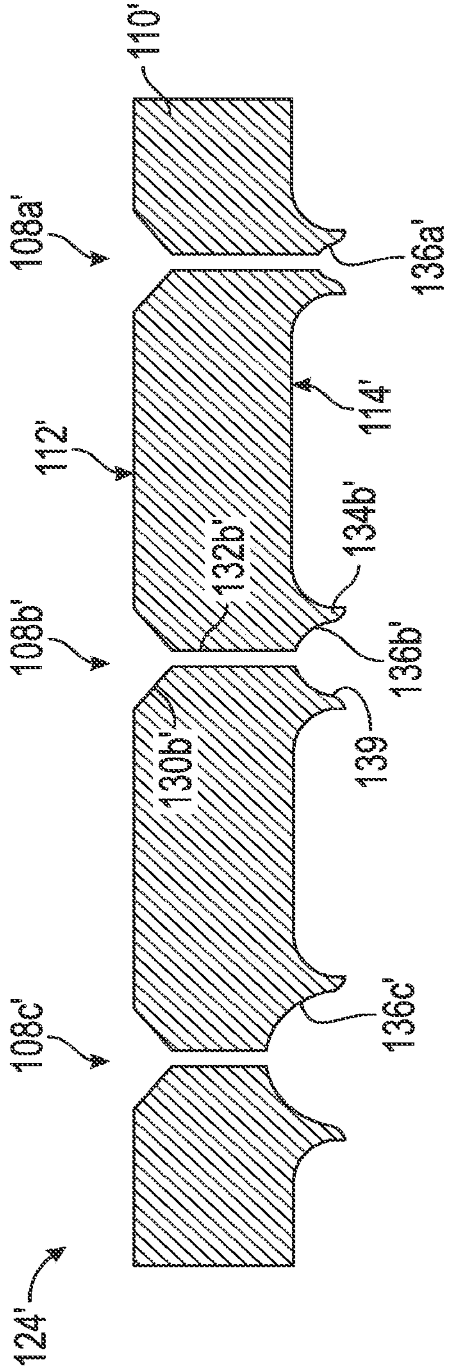
FIG. 10 is a sectional elevation view of a portion of the first region of the shower assembly of FIG. 9, shown according to an exemplary embodiment.

Further referring to FIG. 10, a cross-sectional view of a portion of the first region 124' of the bottom wall 110' is shown according to an exemplary embodiment. The holes 108' of the first region 124' may be substantially similar to the holes 108 of the first region 124 of the embodiment of FIG. 7. For example, the first region 124' may include holes 108*a*', 108*b*', 108*c*', which may have different sizes and/or geometries. As shown, each hole 108*b*' may have an inlet 130*b*' for receiving water from the reservoir 120, an outlet 136*b*' defined by nozzle 134*b*', and a bore 132*b*' extending between the inlet 130*b*' and the outlet 136*b*' providing a passageway for water to flow between the inlet 130*b*' and the outlet 136*b*'. According to the exemplary embodiment shown, nozzle 134' protrudes from the bottom surface 114' and has a rounded inner edge 139.

Figure 11:
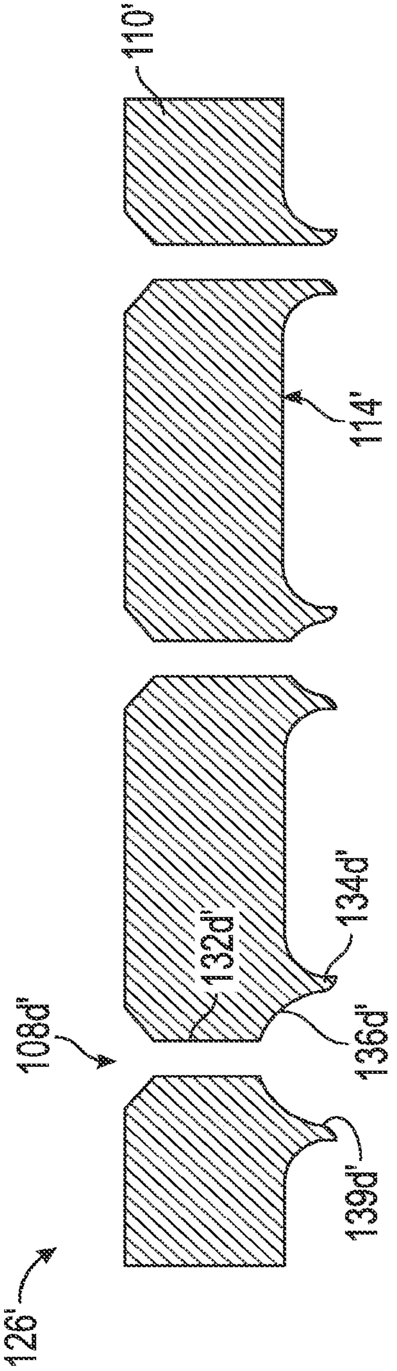
FIG. 11 is a sectional elevation view of a portion of the second region of the shower assembly of FIG. 9, shown according to an exemplary embodiment.

Further referring to FIG. 11, a cross-sectional view of a portion of the second region 126' of bottom wall 110' is shown according to an exemplary embodiment. The holes 108' of the second region 126' may be substantially similar to the holes 108 of the second region 126 of the embodiment of FIG. 8. For example, streaming holes 108*d*' may include a bore 132*d*' having a sufficiently large diameter such that water may pass sufficiently freely through the bore 132*d*' so as to form a substantially continuous stream of water. According to the exemplary embodiment shown, the outlet 136*d*' is substantially hemispherical and the nozzle 134*d*' is formed as a protrusion from the bottom surface 114' having a rounded inner edge 139*d*'.

Referring to FIG. 12, a cross-sectional view of a portion of the first region 124" of the bottom wall 110" is shown according to another exemplary embodiment. The first region 124" may include holes 108*a*", 108*b*", 108*c*", which may have different sizes and/or geometries. As shown, each hole 108*c*" may have a bore 132*c*", which is axially shorter than the bores 132, 132' of the embodiments of FIGS. 7-8, 10-11, and 13-15, and an inlet 130*c*", which extends axially longer than the inlets 130, 130' of the embodiments of FIGS. 7-8, 10-11, and 13-15. As shown, the bore 132*c*" forms an orifice (e.g., orifice plate, throttle, etc.), and the inlet 130*c*" extends substantially through the bottom wall 110" to form a cistern 131 (e.g., reservoir, sac, etc.), shown as cistern 131*c*, above the orifice. The cistern 131 stores water so that, during operation of the streaming apparatus 150, 350 (e.g., deluge, douse, drench, flood, etc.) or low water levels, the outlets 136" are not starved for water and may continue to form drops until the cistern 131 is empty. According to one embodiment, the size of the cistern 131 is configured to hold enough water such that the outlets 136" are provided water to form drops during the period when the reservoir 120 is emptied during an operation of the streaming apparatus 150, 350 until the reservoir 120 is sufficiently filled to cover the top surface 112" of the bottom wall 110" with water.

As shown, the outlet 136*c*" is substantially conical and defined by a nozzle 134*c*". The hole 108*c*" includes a rounded shoulder 133 that smoothly blends the surface of the bore 132*c*" with the surface of the outlet 136*c*". Providing a smooth transition facilitates drop formation and avoids discontinuities which may cause water to separate from the surface of the bore 132*c*", shoulder 133, or outlet 136*c*". The bore 132*c*" is also shown to have walls that extend radially outward as the walls extend axially away from the inlet 130*c*". Accordingly, the orifice formed by the bore 132*c*" is a point restriction. The point restriction facilitates more rapid formation of drops. Further, advantageously, the shortened bore 132*c*" may flex in response to the flexing of the nozzle 134*c*" (e.g., with a finger); therefore, mineral buildup in the orifice may be cleaned (e.g., removed, broken up and flushed out by water, etc.) by rubbing a finger over the nozzle 134*c*". According to various embodiments, the bore 132*c*" may be conical or frustoconical. According to the embodiment shown, the sidewall of the bore 132*c*" has a continuous curve that blends smoothly into the surface of the outlet 136*c*". According to one embodiment, the bore 132*c*" and the outlet 136*c*" has an inverted (i.e., upside-down) funnel shape.

According to some embodiments, the diameter of bore 132" is preferably between 0.025 inches (approximately 0.63 mm) and 0.03 inches (approximately 0.76 mm) at its narrowest point. According to the exemplary embodiment shown, the diameters of bores 132" are between 0.027 inches (approximately 0.69 mm) and 0.029 inches (approximately 0.74 mm) at its narrowest point. The diameters of the bores 132*a*", 132*b*", 132*c*" may be the same or different. For example, the diameter of the bore 132*c*" is shown to be slightly larger than the diameter of the bore 132*b*", which is shown to be slightly larger than the diameter of the bore 132*a*". According to the exemplary embodiment shown, the diameters of the outlets 136" range from about 0.14 inches (approximately 3.55 mm) to about 0.335 inches (approximately 8.5 mm) at their widest points. According the exemplary embodiment shown, the diameter of the outlet 136*b* is about 0.17 inches.

While the cisterns 131 depicted in FIG. 12 have generally constant diameters, as shown in FIG. 33, the holes 1008 may instead include cisterns 1031 that taper inwardly (e.g., conically) from the inlet 1030 or an upper most surface of the holes 1008 down to the bore 1032. Furthermore, while the upper surface 110" in FIG. 12 is shown to be of the same material (e.g., silicone) forming defining the geometries of the holes 108, as shown in FIG. 33, the substrate 1011 may instead form the upper surface of the 1012 of the bottom panel 1002 of the shower assembly 1000, while the bottom surface 1014 is formed from the material forming the geometries of the holes 1008 (e.g., silicone) that is coupled to the substrate 1011 so as to entirely cover the lower surface of the substrate 1011. Additionally, the silicone defining the geometry of the holes 1008 may additionally protrude downward from the bottom surface of the substrate 1011 and/or the bottom plate 1002, itself.

Figure 13:
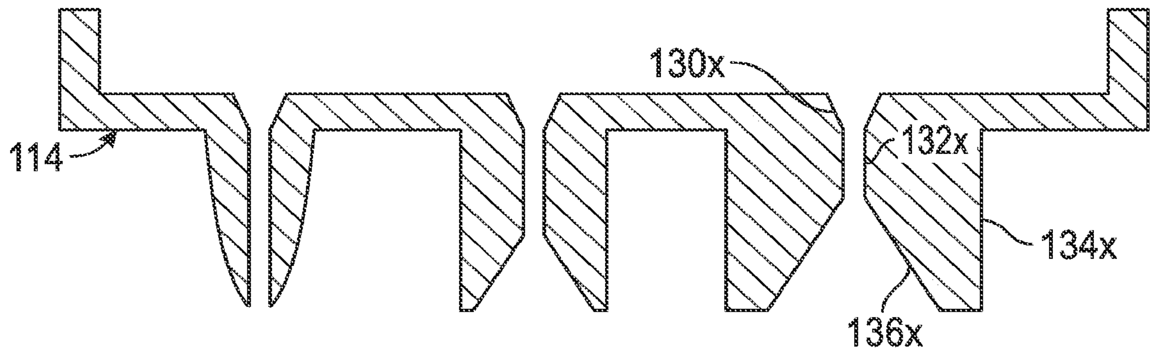
FIG. 13 is a sectional elevation view of a portion of the shower assembly of FIGS. 4A-B, shown according to an exemplary embodiment.
Figure 14:
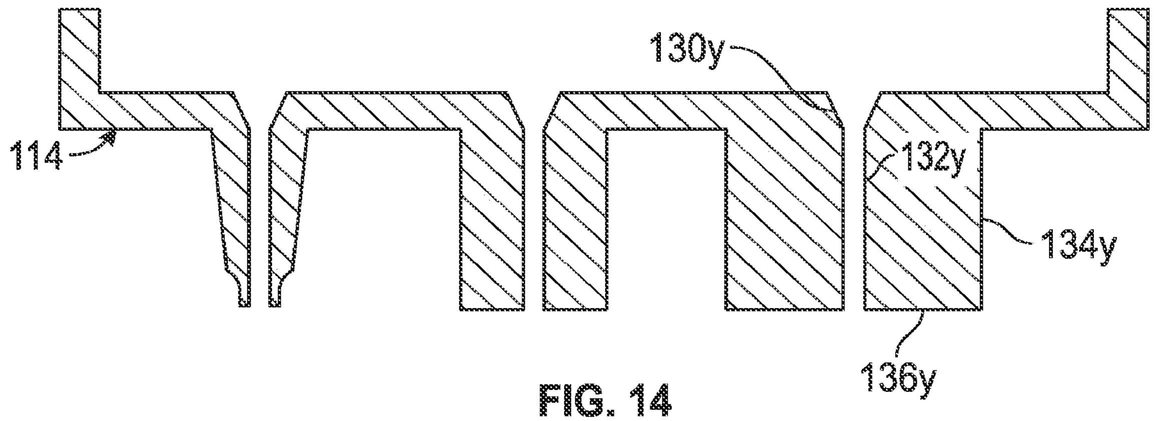
FIG. 14 is a sectional elevation view of a portion of the shower assembly of FIGS. 4A-B, shown according to an exemplary embodiment.
Figure 15:
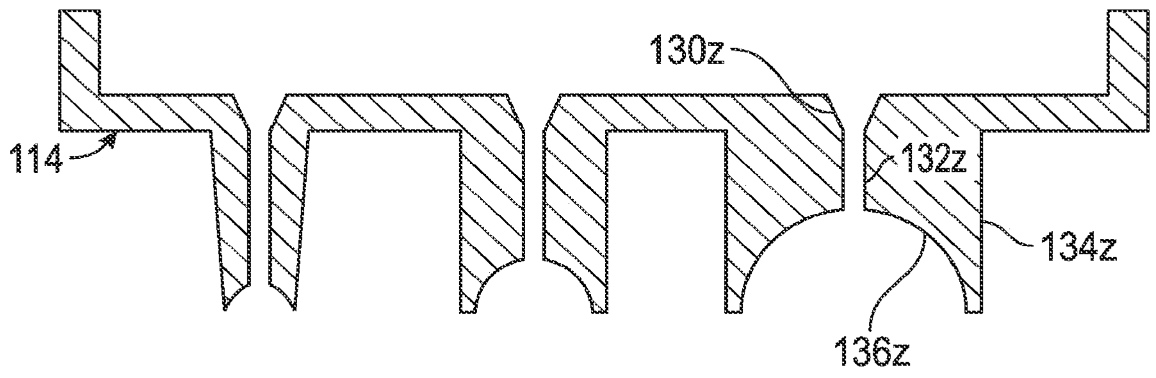
FIG. 15 is a sectional elevation view of a portion of the shower assembly of FIGS. 4A-B, shown according to an exemplary embodiment.

FIGS. 13-15 show various exemplary embodiments of nozzles 134 formed as protrusions from the bottom surface 114 of the bottom wall 110. The outlet 136*x* of FIG. 13 is shown to be substantially conical. The outlet 136*y* of FIG. 14 is shown to be substantially flat or orthogonal to the bore 132*y*. The outlet 136*z* of FIG. 15 is shown to be substantially hemispherical.

Figure 16:
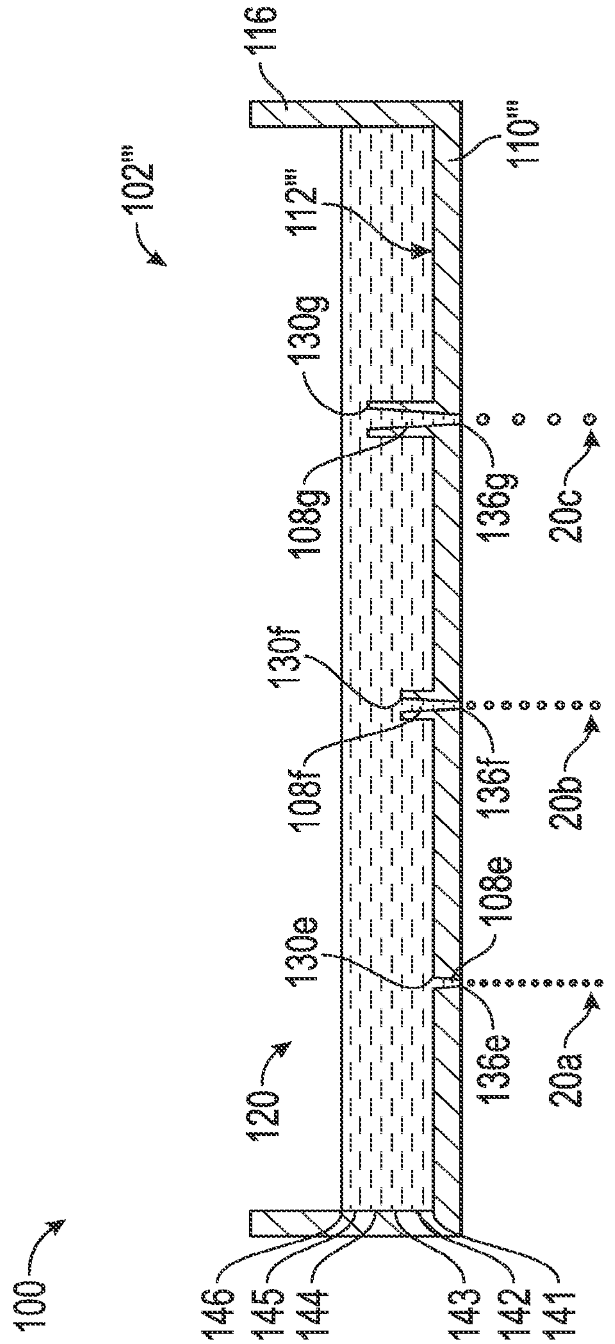
FIG. 16 is a schematic front sectional view of the shower assembly of FIGS. 4A-B, shown according to another exemplary embodiment.
Figure 17:
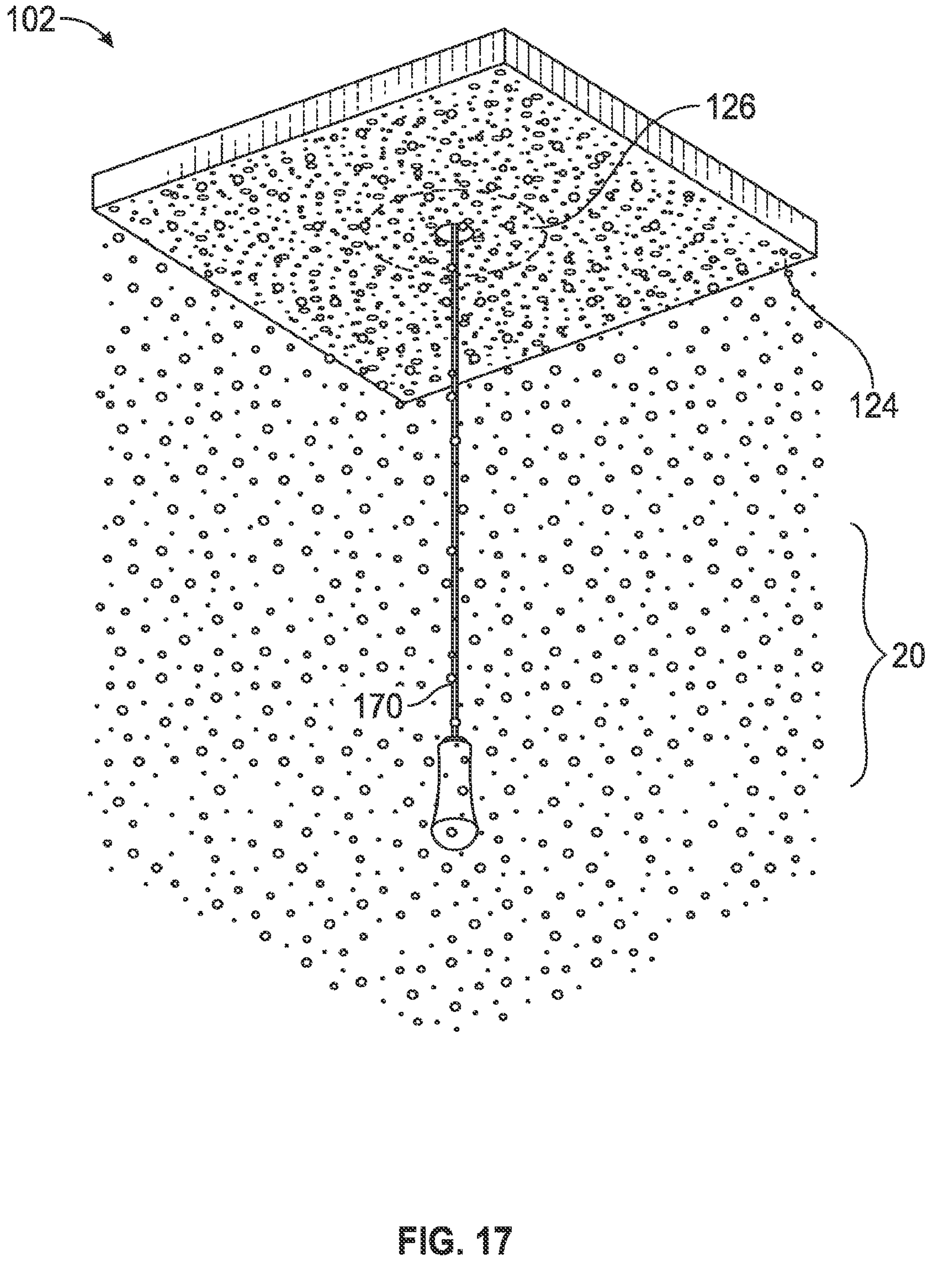
FIGS. 17 and 18 are a bottom perspective view and a front sectional view, respectively, of the shower assembly of FIGS. 4A-B, with the stopper in a first position, shown according to another exemplary embodiment.

Referring briefly to FIGS. 5 and 16, it is contemplated that the shower assembly 100 is configured to prevent the water that is entering the reservoir 120 from completely filling the reservoir 120. The partially filled (e.g., not be completely filled) reservoir 120 is not pressurized, and the water exits through the holes 108 via the force of gravity. Gravitational force may pull directly on the water (e.g., water molecules, portions of water, etc.) and/or may act indirectly on one portion of the water by acting on other portions of the water to create a head pressure proportional to gravity and to the height of the water in the reservoir 120. According to one embodiment, the total flow capacity of the holes 108 exceeds the maximum flow rate of the fluid control valve 202 or inlet 106 (e.g., maximum inlet water flow rate) (e.g., less than or equal to 2.5 gallons per minute). According to another embodiment, the sidewalls 116 or bottom wall 110 may include overflow passages to permit excess water to flow out of the panel 102 (see e.g., snorkel 465 in FIG. 26). The shower assembly 100 may include a switch (e.g., float valve) configured to at least partially close fluid control valve 202 in response to the depth of the water in the reservoir 120 reaching a predetermined depth. The switch may operate directly on the fluid control valve 202, or indirectly by sending a signal through the control system 200, described in more below.

Referring to FIG. 16, a panel 102''' is shown, according to another embodiment. For the sake of clarity, FIG. 16 is shown with only a few holes 108''' (e.g., holes 108*e*, 108*f*, 108*g*), although it should be understood that there may be many holes 108'''. The panel 102''' includes a bottom wall 110''' defining a first hole 108*e* having an inlet 130*e*, a second hole 108*f* having an inlet 130*f*, and a third hole 108*g* having an inlet 130*g*. The heights of the inlets 130*e*, 130*f*, 130*g* are staggered such that water in the reservoir 120 gains access to different holes 108 depending on the depth of the water in the reservoir 120. The inlet 130*e* of the first hole 108*e* is at a first height 141 above the top surface 112''' of the bottom wall 110'''. As shown, the height of the inlet 130*e* and the top surface 112''' is substantially equal. When water is at a second height 142, the water flows through first hole 108*e*. Inlet 130*f* of the second hole 108*f* is at a third height 143 above the top surface 112''' of the bottom wall 110'''. As shown, the third height 143 is greater than the first height 141 and the second height 142 such that when the level of water in the reservoir 120 is at the second height 142, water flows through the first hole 108*e*, but not through the second hole 108*f*. When water is at a fourth height 144, the water may also flow through second hole 108*f*. Inlet 130*g* of the third hole 108*g* is at a fifth height 145 above the top surface 112''' of the bottom wall 110'''. As shown, the fifth height 145 is greater than the fourth height 144 and the third height 143 such that when the level of water in the reservoir 120 is at the fourth height 144, water flows through the second hole 108*f*, but not through the third hole 108*g*. When water is at a sixth height 146, the water may also flow through third hole 108*g*.

The shower assembly 100 may be configured such that, when water is provided to the reservoir at a first operating flow rate (e.g., a low flow rate), water partially fills the reservoir above 120 the first height 141, passes through a plurality of first holes 108*e* by gravitational force, forms a drop 20 at the outlet 136*e* of each of the plurality of first holes 108*e*, and falls from the bottom wall 110 as a plurality of drops 20. At the first operating flow rate, the rate of water exiting through the first holes 108*e* may be equal to the rate of water entering the reservoir 120 such that the height of the water in the reservoir 120 does not exceed the height inlets 130*f*.

The shower assembly 100 may be configured such that when water is provided to the reservoir at a second operating flow rate (e.g., a moderate flow rate), water partially fills the reservoir 120 above the third height 143, passes through the plurality of first holes 108*e* and a plurality of second holes 108*f* by gravitational force, forms a drop 20 at the outlet of each of the plurality of first holes 108*e* and the plurality of second holes 108*f*, and falls from the bottom wall 110 as a plurality of drops 20. At the second operating flow rate, the rate of water exiting through the first and second holes 108*e*, 108*f* may be equal to the rate of water entering the reservoir 120 such that the height of the water in the reservoir 120 does not exceed the height inlets 130*g*.

The shower assembly 100 may be configured such that when water is provided to the reservoir at a third operating flow rate (e.g., a high flow rate), water partially fills the reservoir above the fifth height 145, passes through the plurality of first holes 108*e*, the plurality of second holes 108*f*, and a plurality of third holes 108*g* by gravitational force, forms a drop 20 at the outlet of each of the plurality of first holes 108*e*, the plurality of second holes 108*f*, and the plurality of third holes 108*g*, and falls from the bottom wall 110 as a plurality of drops 20. At the third operating flow rate, the rate of water exiting through first, second, and third holes 108*e*, 108*f*, 108*g* may be equal to the rate of water entering the reservoir 120 such that the water does not fill the reservoir 120. According to an exemplary embodiment, the rate of water exiting through first, second, and third holes 108*e*, 108*f*, 108*g* is approximately 2.5 gallons per minute. Because of the feeling of individual drops 20, a user may enjoy a satisfying shower experience at a lower flow rate than required by streams 12 of water. That is, the individual drops 20 of water may cause a user to perceive a greater flow rate than is perceived from an equivalent flow rate of streams 12 of water. Accordingly, a user may use less water while perceiving a conventional, higher flow rate. Thus, at the third operating flow rate, the rate of water exiting through first, second, and third holes 108*e*, 108*f*, 108*g* may be configured to be equal to the rate of water entering the reservoir 120 and the capacity of the fluid control valve 202, which may be less than 2.5 gallons per minute.

According to various embodiments, the outlets 136*e*, 136*f*, 136*g* may have the same or different geometries. For example, the outlet 136*f* may be larger than 136*e* such that larger drops 20 are formed on the outlet 136*f*. Thus, the second operating flow rate would create larger rain drops corresponding to the medium drops 20*b* formed in moderate rain. The holes 108*g* may have larger outlet 136*g* again to create even larger drops 20*c* in response to the third operating flow rate, thereby simulating a downpour. According to another embodiment, the third holes 108*g* may be streaming holes as described with respect to holes 108*d* and 108*d'* in FIGS. 8 and 11. Thus, a high operating flow rate may cause streams of water to flow from the panel 102'''.

Figure 20:
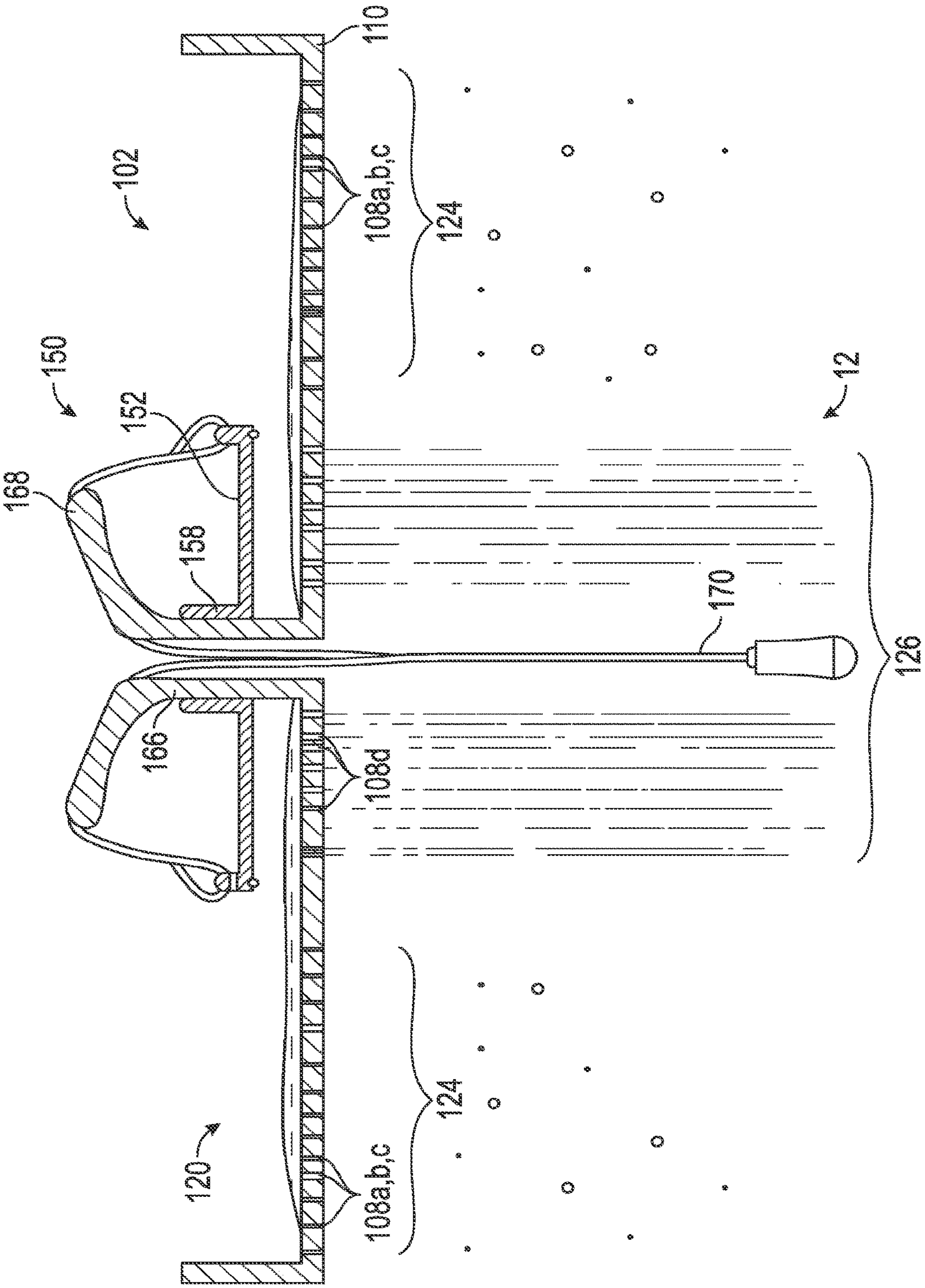
Figure 21:
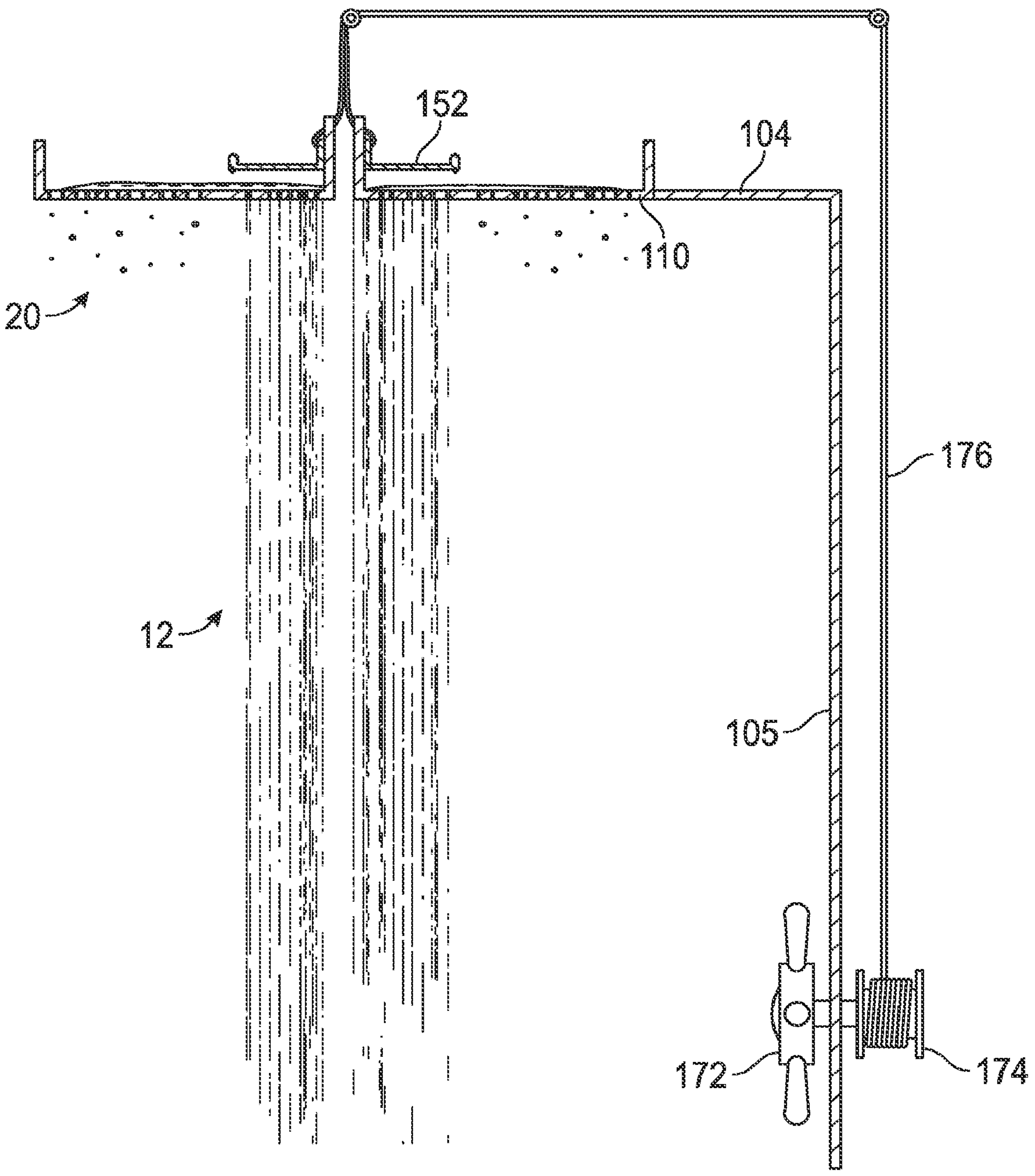
FIG. 21 is a schematic diagram of a streaming apparatus for use with the shower assembly of FIGS. 17-20, shown according to another embodiment.
Figure 22:
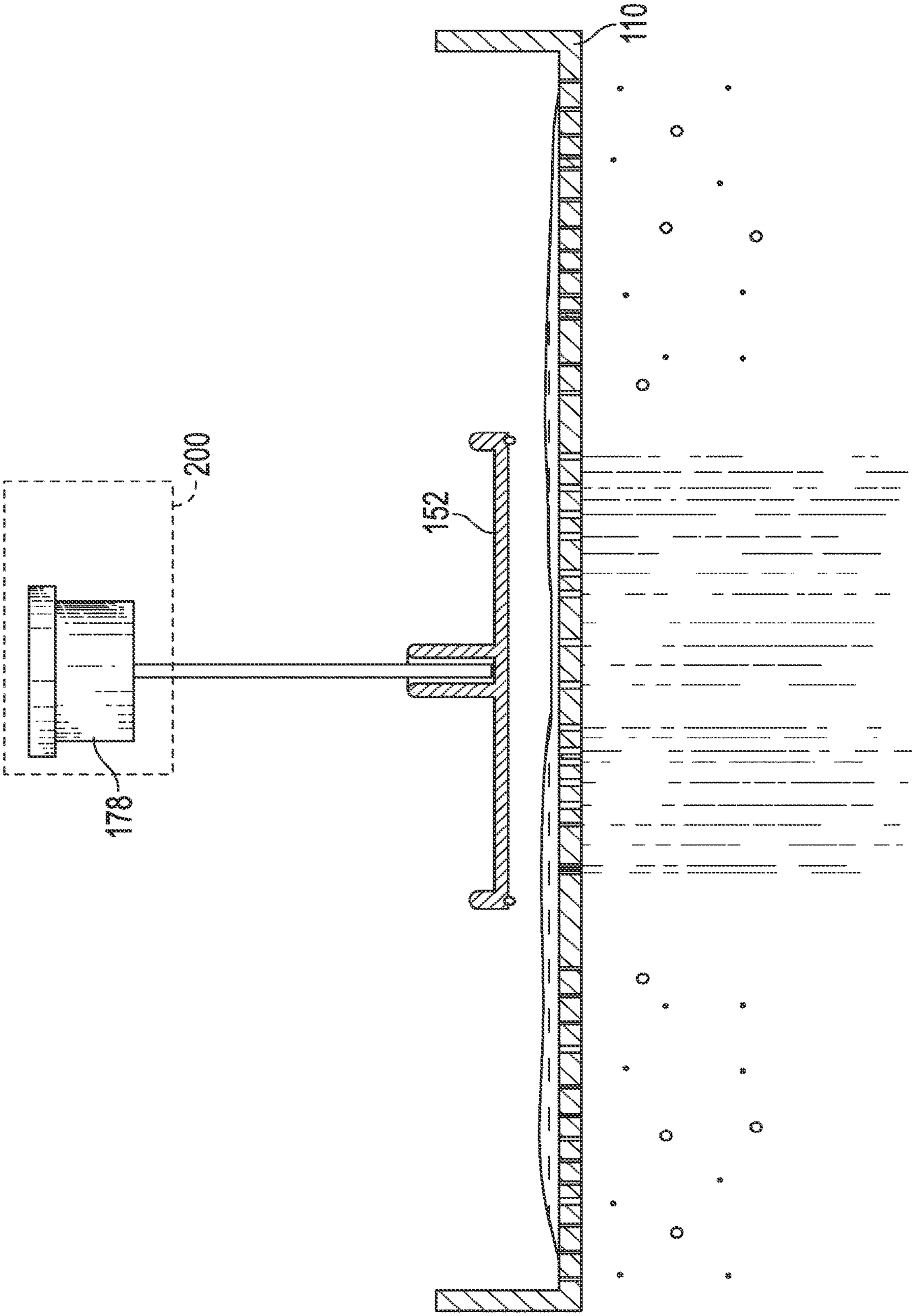
FIG. 22 is a schematic diagram of a streaming apparatus for use with the shower assembly of FIGS. 17-20, shown according to another exemplary embodiment.

Referring to FIGS. 17-20, a shower assembly 100, including a streaming apparatus 150 configured to cause streams of water to fall from the panel 102, is shown according to an exemplary embodiment. The streaming apparatus 150 is shown to include a stopper 152 movable between a first position (shown, e.g., in FIG. 18) and a second position (shown, e.g., in FIG. 20). When the stopper 152 is in the first position, water provided to or present within the reservoir 120 is permitted (e.g., without selection by a user) to pass through a first plurality of holes (e.g., holes 108*a*, holes 108*b*, holes 108*c*, etc., which are in constant fluidic communication with the reservoir 120) extending through the first region 124, but the water is prevented from passing through plurality of streaming holes 108*d* extending through the second region 126 of the bottom wall 110. When the stopper 152 is in the second position, water provided to the reservoir 120 is permitted to pass through the plurality of streaming holes 108*d*. That is, the streaming holes 108*d* are in selective fluidic communication with the reservoir 120. As also shown in FIG. 20, because water may still be present above holes 108*a*, 108*b*, 108*c*, while the stopper 152 is in the second position, water may simultaneously fall from holes 108*a*, 108*b*, 108*c* and from holes 108*d*.

According to the exemplary embodiment shown, the holes 108*a*, 108*b*, 108*c* are substantially similar to the holes 108*a*, 108*b*, 108*c* shown and described in FIGS. 6-7. Accordingly, the first plurality of holes 108*a*, 108*b*, 108*c* in the first region 124 are configured such that water flowing through the first plurality of holes 108 forms drops 20 on the bottom wall 110 before falling off of the bottom wall 110. As further shown, the streaming holes 108*d* are substantially similar to the holes 108*d* as shown and described in FIGS. 6 and 8. Accordingly, water flowing through the plurality of streaming holes 108*d* falls from the panel 102 as substantially continuous streams of water. According to the exemplary embodiment shown, the diameter of the holes 108*d* is sized to cause rapid emptying of water from the reservoir 120 such the that user is deluged (e.g., doused, drenched, flooded, etc.) by the streams 12 of water. Such rapid emptying of the reservoir 120 may be beneficial for rinsing off soap or shampoo. The plurality of streaming holes 108*d* may be configured such that the rapid emptying of water from the reservoir 120 exceeds the maximum flow rate of the fluid control valve 202. That is, a collective flow rate of water present in the tank flowing through the first plurality of holes 108*a*, 108*b*, 108*c* and a collective flow rate of water present in the tank flowing through the second plurality of holes 108*d* together exceed the maximum inlet flow rate of the water entering the showering assembly (e.g., via the inlet port 106) from the water source (i.e., a source flow rate). Furthermore, the collective flow rate of water flowing through the second plurality of holes 108*d* may, by itself, exceed the maximum flow rate of water entering the showering assembly from the water source. For example, the flow rate through the plurality of streaming holes 108*d* may exceed 2.5 gallons per minute, while the fluid control valve 202 may have a maximum flow capacity of 2.5 gallon per minute. According to an exemplary embodiment, the flow rate through the plurality of streaming holes 108*d* may exceed 8 gallons per minute. Such rapid emptying of water from the reservoir 120 may facilitate emptying the reservoir 120 between uses of the panel 102. Furthermore, the collective flow rate of the first plurality of holes 108*a*, 107*b*, 108*c* may additionally be configured to have a maximum flow rate that is greater than or equal to the maximum source flow rate, such that the reservoir 120 does not overflow. These concepts regarding the relative collective flow rates of the different holes and the water source are applicable to the other shower assembly embodiments discussed below.

According the exemplary embodiment shown, the stopper 152 includes a first portion 153 and a seal 156 coupled to the first portion 153. As shown, the first portion 153 includes a lower wall 154 (e.g., bottom wall, dam, etc.), and the seal 156 is coupled to the lower wall 154. The seal 156 may be an O-ring seated in an annular groove extending about an outer periphery of the lower wall 154. When the stopper 152 is in the first position, the seal 156 separates the first region 124 from the second region 126. When the stopper 152 is in the first position, the lower wall 154 is located adjacent the second region 126 of the bottom wall 110 and may cover the holes 108*d*. When the stopper 152 is in the second position, the lower wall 154 is spaced apart from the second region 126, and the holes 108*d* may be uncovered. In this manner, the stopper 152 acts as a valve to prevent or permit water from flowing to the holes 108*d*.

The stopper 152 is further shown to include a guidewall 158 extending upward from the lower wall 154 and defining an inner opening 160. An outer sidewall 162 extends upward from the lower wall 154 about an outer periphery of the stopper 152. The outer sidewall 162 defines one or more holes 164 (e.g., slots, passages, etc.) extending through the sidewall 162, thereby facilitating water above the stopper 152 to pour off the stopper 152 when the stopper 152 is moved from the first position to the second position. Similarly, the holes facilitate water from the reservoir 120 above the first region 124 to flow onto the stopper 152, thereby pushing the stopper 152 toward the first position and increasing the sealing force on the stopper 152 and seal 156.

The exemplary embodiment of the streaming apparatus 150 is further shown to include a column 166 extending upward from the bottom wall 110 and through the inner opening 160 of the stopper 152. According to an exemplary embodiment, the guidewall 158 extends upward from the bottom wall 110 and about a perimeter of the column 166. When the stopper 152 moves between the first position and the second position, the guidewall 158 translates along the column 166, thereby guiding the motion of the stopper 152 in preventing inadvertent dislodging of the stopper 152 from above the second region 126.

The stopper 152 may move between the first position and the second position in response to an actuator (e.g., handle, lever, knob, button, cord, the motor, etc.). According the exemplary embodiment shown, a pull cord 170 extends through a passage 128 extending through the bottom wall 110 and column 166. The pull cord 170 extends over arms 168 and couples to the stopper 152, for example, for example to the sidewall 162. The pull cord 170 is routed over the arms 168 such that when a proximal end of the pull cord 170 is pulled downward, the distal end of the pull cord 170 pulls upward on the stopper 152, thereby raising the stopper 152 from the first position toward the second position. According to various embodiments, the pull cord 170 may run over a smoothed edge of the arms 168, or the pull cord 170 may run over one or more pulleys.

According to various other embodiments, the stopper 152 may be actuated via a mechanical linkage located on the panel 102, on the ceiling 104, or on another shower wall 105. For example, referring to the schematic diagram of FIG. 21, an actuator (e.g., lever, button, etc.) shown as knob 172 mounted to a wall 105 is operably coupled to a cam 174. Actuation of the cam 174 causes motion of a push cable 176 which in turn moving stopper 152 between the first position and the second position. According to various other embodiments, for example referring to the schematic diagram of FIG. 22, the stopper 152 may be actuated via an electric actuator 178 (e.g., motor, solenoid, linear actuator, etc.), which may be controlled by a control system 200, described in more detail below. According one embodiment, the stopper 152 may be hinged (e.g., centrally, at one or more outer edges, etc.) such that the stopper 152 rotates from the first position to the second position. According to another embodiment, the stopper 152 may be configured to slide laterally from the first position to the second position. According to various other embodiments, the streaming apparatus 150, and the stopper 152, thereof, may be configured to actuate as a canister valve, a rotary valve, a flapper valve, an iris, a carburetor, an electric valve, a hydraulic valve, and electro-hydraulic valve, or a pneumatic valve. According to various other embodiments, the stopper 152 may be configured to automatically actuate when the water in the reservoir 120, or portion thereof, reaches a certain level. For example, one of more floats may be interconnected to the stopper 152 such that when the float rises to a predetermined level, the stopper 152 is moved to the open position. The float may be interconnected to the stopper 152 via a chain, mechanical linkage, lever arm, switch, etc. According to one embodiment, a less dense material (e.g., foam, air-filled containers, evacuated containers, etc.) may be coupled to the stopper to bring the stopper 152 to slightly heavier than neutral buoyancy so that one or more floats may easily lift the stopper. According to another embodiment, the stopper may be buoyant, and the deluge feature actuates (e.g., the stopper lifts off of the panel) when a downward force is removed from the stopper.

Figure 18:
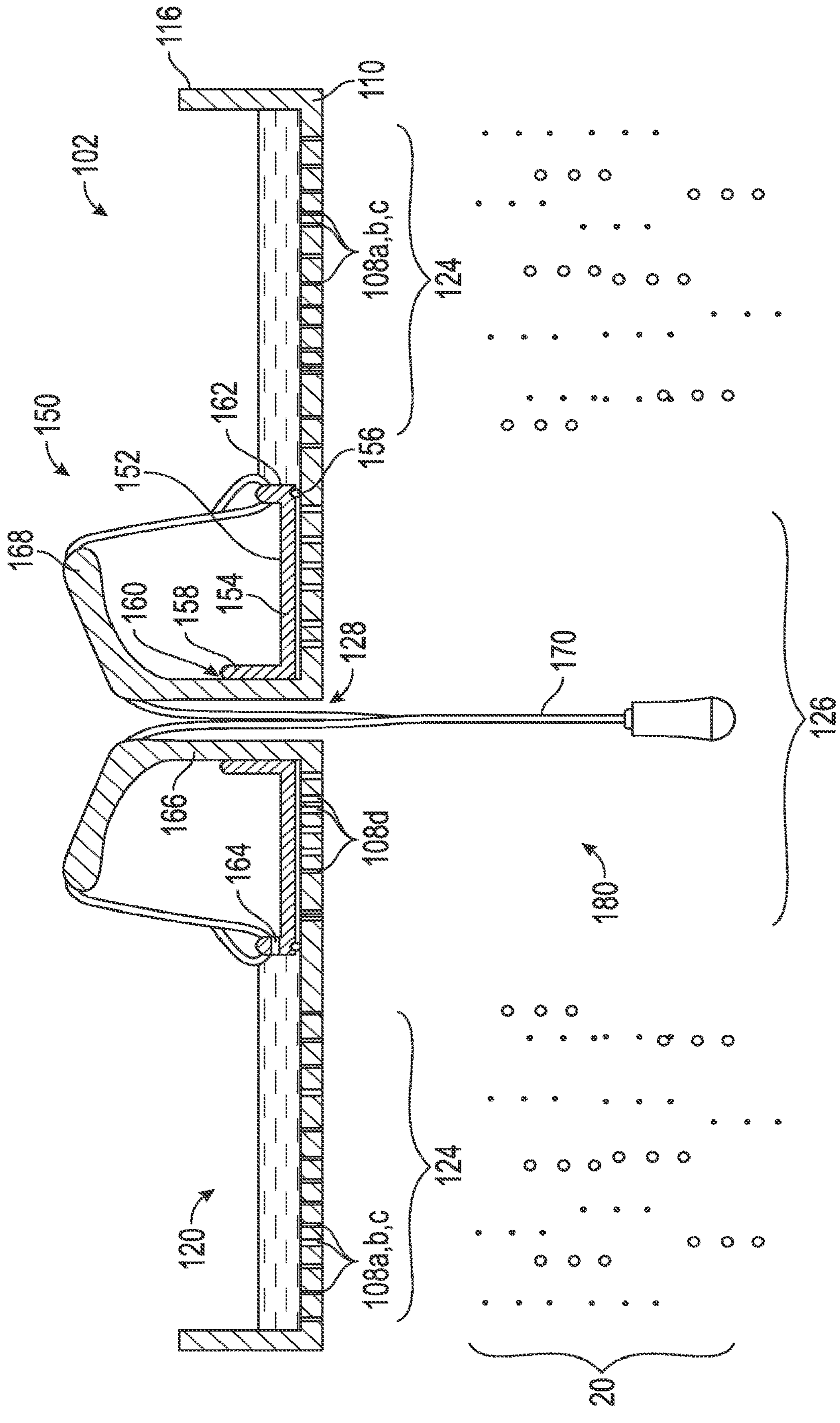
Figure 19:
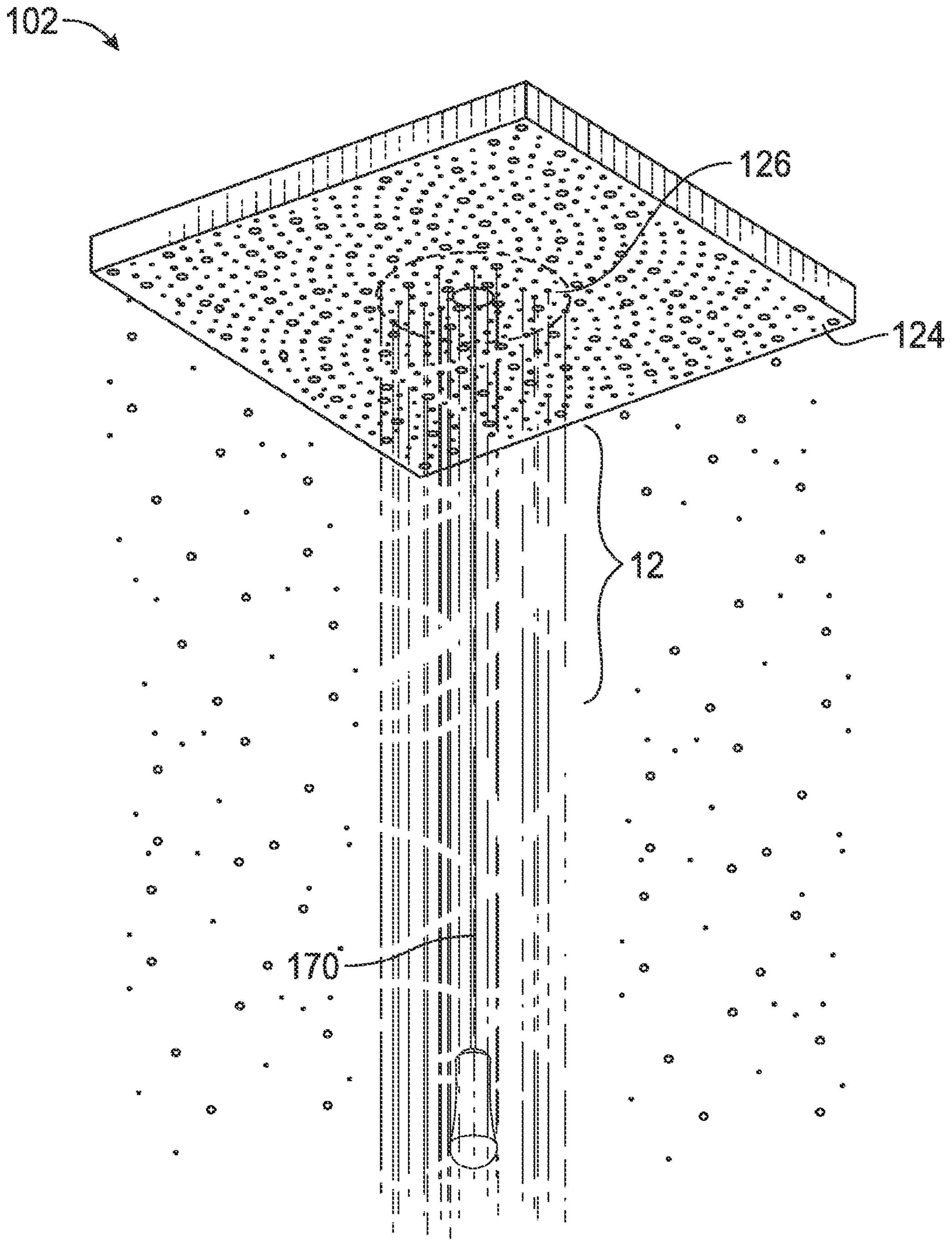
FIGS. 19 and 20 are a bottom perspective view and a front sectional view, respectively, of the shower assembly of FIGS. 4A-B, with the stopper in a second position, shown according to an exemplary embodiment.

Referring to FIG. 18, when the stopper 152 is in the first position, water from the reservoir 120 is prevented from flowing through the holes **108*d* of the second region 126. Accordingly, neither drops 20 nor streams 12 fall in the space 180 (e.g., volume, eye, dry zone, etc.) below the second region 126. Having a space 180 within the falling drops 20 has several advantages. For example, a user can easily breathe in this space 180**. For example, a user may stand in the (warm) water without having water fall on the user's face, which many users find discomforting.

Figure 23:
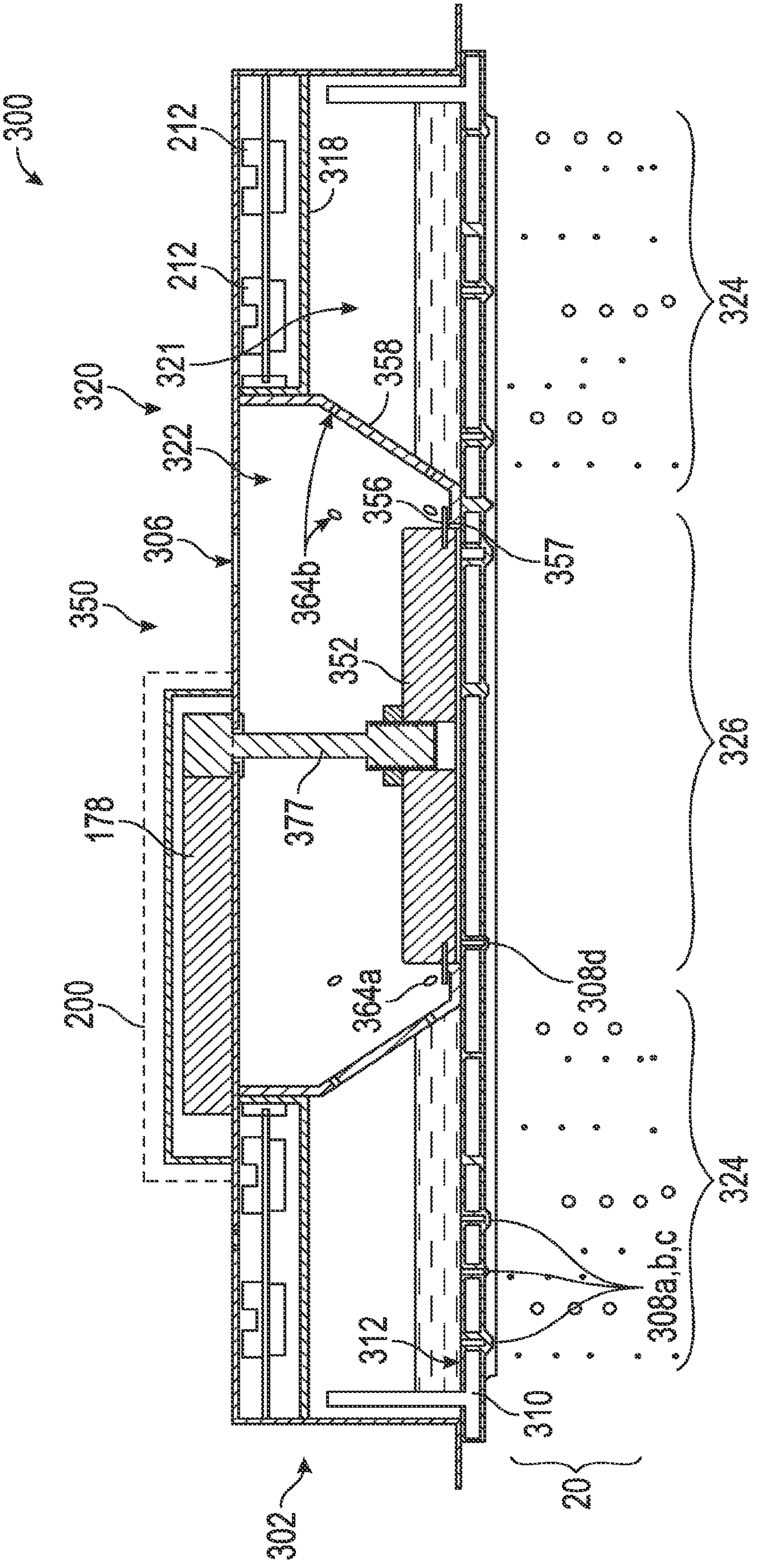
FIG. 23 is a front sectional view of the shower assembly of FIGS. 4A-B, including a streaming apparatus according to another exemplary embodiment.

Referring to FIGS. 23 and 24, a shower assembly 300 having a streaming apparatus 350, is shown according to another exemplary embodiment. The shower assembly 300 includes a panel 302 having a bottom wall 310 having holes **308*a*, 308*b*, 308*c*. A bottom plan view of the bottom wall 310 is shown in FIG. 24. The holes 308 are shown to be similar to holes 108" as described above with respect to bottom wall 110", but in other embodiments may have any of the holes 108, 108', 108'", or combination thereof, as described above. The panel 302 further includes a top wall 318. One or more lights 212 (e.g., incandescent bulb, fluorescent bulbs, light emitting diodes, etc.) may be located above the top wall 318 so that the lights 212, and any other electronics located there, may be kept separated from the water (i.e., dry). The top wall 318 may be transparent or translucent such that light from the lights 212 may pass through the top wall 318**.

The panel 302 defines a reservoir 320 that may be separated by a wall 358 into a first tank 321 (e.g., dripping tank, rain tank, etc.), located above a first region 324 of the panel 302, and a second tank 322 (e.g., streaming tank, deluge tank, etc.), located above a second region of 326 of the panel 302, the wall 358 preventing or limiting water flow between the first tank 321 and the second tank 322. The holes **308*a* 308*b*, 308*c* of the first region 324 are configured to form drops 20, whereas the holes 308*d* of the second region 326 are configured to form continuous streams 12 (not shown). As described above with respect to streaming apparatus 150, when the stopper 352 is in a first position (as shown), water is prevented from streaming through holes 308*d*, and when the stopper 352 is in a second position (e.g., not the first position, spaced apart from the bottom wall 310, un-sealed, etc.), water is permitted to stream through the holes 308*d*. That is, the holes 308*d* are in selective fluidic communication with the second tank, whereas the holes 308*a*, 308*b*, 308*c*** are in constant fluidic communication with the first tank.

The wall 358 may have a plurality of holes 364 therethrough to permit water to pass between the first tank 321 and the second tank 322. During operation, water enters the second tank 322 from a water source 306 and begins to fill the second tank 322. When water reaches the level of the holes 364, water passes through the wall 358 and begins to fill the first tank 321, thereby supplying water to holes **308*a*, 308*b*, 308, which in turn causes formation of drops 20. As shown, a first course (e.g., row, layer, level, etc.) of holes 364*a* (e.g., one or more first holes) is formed at a first height above the top surface 312 of the bottom wall 310, and a second course of holes 364*b* (e.g., one or more second holes) is formed as at a second height above the top surface 312. The first course of holes 364*a* may be sized such that the flow rate of water that may pass through the first course of holes 364*a* (e.g., a collective flow rate of the first holes, or a first collective flow rate) is less than the flow rate of water entering the second tank 322 (e.g., a maximum flow rate from an inlet into the second tank). Accordingly, the water level in the second tank 322 would continue to rise even as water flows from the second tank 322 to the first tank 321. The second course of holes 364*b* may be sized such that the flow rate of water that may pass through the first (e.g., the first collective flow rate) and second (e.g., a collective flow rate of the second holes, or a second collective flow rate) courses of holes 364*a*, 364*b* is equal to or greater than the flow rate of water entering the second tank 322 from the water source. Accordingly, the water level in the second tank 322 may rise until the water level reaches the second courses of holes 364*b*, and then the water flows primarily to the first tank 321**.

Separating the reservoir 320 into the first tank 321 and the second tank 322, and filling the first tank 321 out of the second tank 322, have several benefits. First, they permit rapid refilling of (e.g., reduces the time required to refill) the second tank 322 in order to quickly recharge the deluge feature (e.g., douse, drench, flood, etc.). According to an exemplary embodiment, the deluge feature may release approximately two-thirds of a gallon of water over a 5 second period, and recharge the deluge feature in approximately one minute with an inlet flow rate of 1.9 gallons/minute. Second, the first tank 321 may act as a manifold to improve temperature mixing of the water to provide a more consistent experience for the user. Third, the wall inhibits flow of water from the first tank 321 to second tank 322, thereby lessening starvation of holes **308*a*, 308*b*, 308*c* during operation of the streaming apparatus 350. Fourth, as shown, the first course of holes 364*a* is above the height of a seal 356 on the stopper 352; accordingly, quickly filling the second tank 322 above the height of the seal 356 enables a head pressure to be quickly formed on the seal 356 to help stop flow through the streaming holes 308*d***.

According to various embodiments, the reservoirs (e.g., reservoir 120, reservoir 320, reservoir 420, reservoir 520, etc.) and/or second tanks (e.g., deluge tank 622, etc.) of this disclosure may act as an accumulator. For example, in low flow environments, the reservoirs and/or second tanks may be fluidly coupled to a showerhead so when the deluge feature is actuated, water exits the panel through the showerhead. The showerhead may be wall mounted or hand held, may be a high flow showerhead, which would drain the reservoirs relatively quickly, or may be a low flow showerhead, which would drain the reservoir relatively slowly. The concentrated flow of the showerhead may facilitate rinsing of soap, shampoo, and/or dirt from a user. Thus, the reservoirs and/or second tanks may facilitate accumulation and temporal shifting of water use in low-pressure, low flow environments to improve the bathing experience without increasing overall water usage.

According to the embodiment shown, the seal 356 is a flexible seal that extends radially outward from the stopper 352. When the stopper 352 is in the first position, the seal sealingly engages a bead 357 raised on the top surface 312 and extending around the second region 326 of the panel 302. The flexible, outwardly extending seal 356 may deflect to compensate for differences in height between the height of bead 357 and the height of the stopper 352 when the stopper 352 is in the first position.

According to the exemplary embodiment shown, the stopper 352 may be interconnected with an electric actuator 178 by a shaft 377. The electric actuator 178, which may be part of, or controlled by, control system 200 may be controlled to raise and lower the stopper 352. According to other embodiments, the stopper 352 may be actuated by any of the actuation assemblies described with respect to FIGS. 17-22. According to another embodiment, the electric actuator 178 in FIG. 23 may be replaced by a diaphragm coupled to a shaft 377. A flow of water directed to the diaphragm would cause the stopper 352 to move from the first position to the second position. For example, a diverter valve may be controlled by the user to divert water from flowing directly into the second tank 322 to flowing to the diaphragm, and the flow of water to the diaphragm may transmit an upward force to the stopper 352 via the shaft 377, thereby lifting the stopper 352 and causing water to stream from holes **308*d*. According to one embodiment, the diverter valve may be controlled by the control system 200**.

Figure 25:
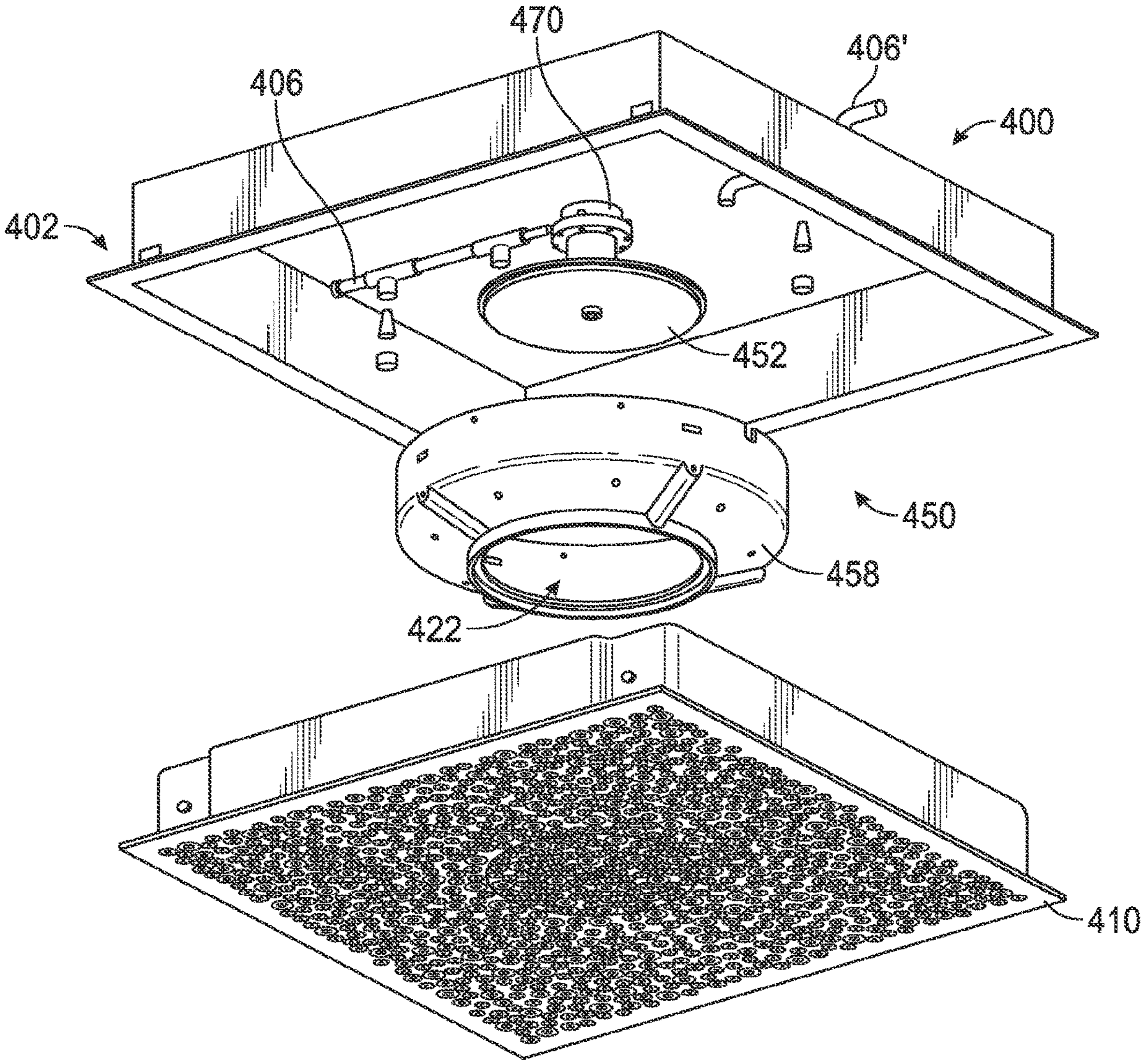
FIG. 25 is an exploded, bottom perspective view of the shower assembly of FIGS. 4A-B, shown according to another exemplary embodiment.
Figure 26:
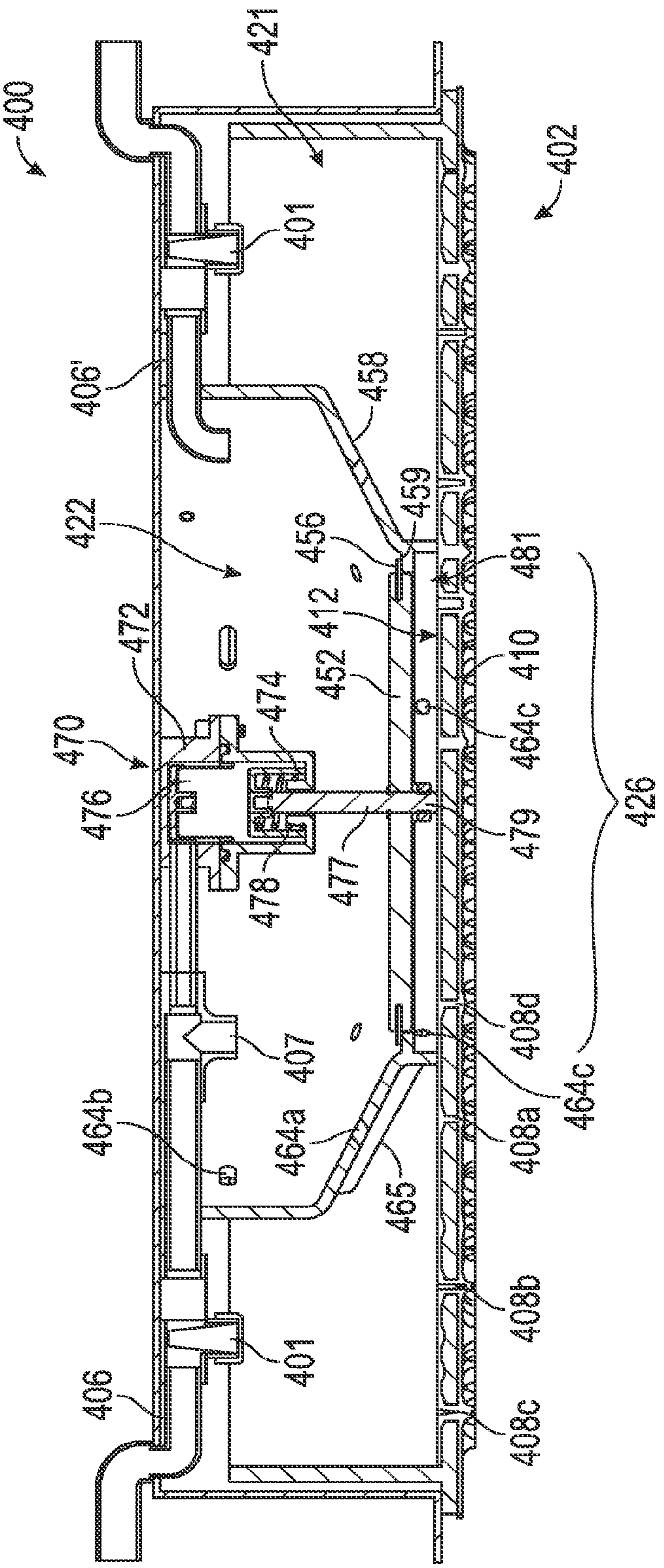
FIG. 26 is a sectional elevation view of the shower assembly of FIG. 25, shown according to an exemplary embodiment.

Referring to FIGS. 25 and 26, an exploded view and a sectional elevation view, respectively, of a shower assembly 400 having a streaming apparatus 450, are shown according to another exemplary embodiment. The shower assembly 400 includes a panel 402 having a bottom wall 410. Bottom wall 410 is shown to be substantially similar to bottom wall 310 as shown and described with respect to FIGS. 23 and 24. The streaming apparatus 450 is shown to include a wall 458, which defines a second tank 422 (e.g., streaming tank, deluge tank, etc.), a stopper 452, and an actuator 470. During operation, water enters the second tank 422 from a water source 406, 406'.

Referring to FIG. 26, the streaming apparatus 450 includes an actuator 470. The actuator 470 has a housing 472 and a diaphragm 474, which is operatively coupled to the shaft 477, which in turn is coupled to the stopper 452. A seal 456 sealingly engages between the stopper 452 and a ledge 459. The ledge 459 is shown to extend radially inward from the wall 458 and to be spaced apart from the second region 426 of the bottom wall 410. According to the embodiment shown, the seal 456 extends radially outward from the stopper 452 and seals against a top surface of the ledge 459 when the stopper 452 is in the first or closed position. Accordingly, water gathered in the second reservoir 422 pushes down on the seal 456 thereby assisting the sealing between the seal 456 and the ledge 459. The shaft 477 is shown to extend through the stopper 452 such that a lower end 479 of the shaft 477 rests on the top surface 412 of the bottom wall 410, thereby relieving some of the load of the water on the stopper 452 and transferring the load to the panel 402 via the shaft 477 and the bottom wall 410.

A space 481 is located between the stopper 452 and the bottom wall 410 when the stopper 452 is in the first position. As shown, the space 481 is at least partially defined by a portion of the wall 458 below the ledge 459. A snorkel 465 extends from the wall 458 and defines an overflow passage into the space 481. According to the embodiment shown, the snorkel extends from a first or upper end above the first course of holes **464*a*. If the water level in the first reservoir 421 exceeds the height of the upper end of the snorkel 465, then the water flows through the snorkel 465, through the hole 464 in the wall 458, through the space 481, through the holes 408*d* in the second region 426 of the bottom wall 410, and out of the panel 402. In this manner, the snorkel 465 provides nonselective fluidic communication between the first tank or reservoir 421 and the holes 408*d* to allow excess water to freely pass from the first tank 421 to the holes 408*d* and out of the shower assembly 400. Accordingly, the snorkel 465 may prevent the reservoir 420 from being overfilled (e.g., overflowing, pressurizing, etc.), and may provide a user with an indication that the reservoir is full by releasing water from through the streaming openings 408*d*. The user may do nothing and enjoy the heavy downpour portion of their rain-showering experience, reduce flow to the reservoir, or may actuate the deluge feature to at least partially drain the reservoir 420**.

The housing 472 and the diaphragm 474 of the actuator 470 at least partially define a chamber 476, which is fluidly coupled to the water source 406. A return mechanism, shown as a spring 478, normally biases the diaphragm 474, and therefore the shaft 477 and the stopper 452, to a second or open position. The actuator 470 is shown to be in series downstream of inlet 407; however, other arrangements are contemplated. For example, the actuator 470 and the inlet 407 could be plumbed in parallel. By moving between the open and closed positions, the stopper 452 acts as a valve to permit or prevent, respectively, water from flowing to the outlets **408*d***.

During operation, water from the water source 406 may pass through a filter 401 and into the second tank 422 via an inlet 407. Water from the water source 406 also enters the chamber 476, thereby pressurizing the chamber 476 and pressing on diaphragm 474. In turn, the spring 478 is compressed and the shaft 477 moves or pushes the stopper 452 into a first or closed position, which prevents water from exiting the shower assembly 400 through the plurality of streaming openings **408*d*. Thus, when water is permitted to flow to the shower assembly 400 from the inlet or water source 406, the actuator normally maintains the stopper 452 in a closed position. When the flow of water from the water source 406 is reduced (e.g., inhibited, slowed, stopped, etc.) to the actuator 470, the pressure in the chamber 476 reduces, the spring 478, and therefore the diaphragm 474, shaft 477, and stopper 452, is allowed to return to the second or open position, thus allowing water to stream through holes 408*d*. Thus, the actuator 470 moves the valve to the open position by changing the amount (e.g., reducing) of water supplied to the actuator, for example, when selectively actuated by a user. As the diaphragm returns to the second position, the water in the chamber 476 is pushed out of the chamber and may, for example, flow into the second tank 422 via the inlet 407. A normally open arrangement of the return mechanism advantageously moves the stopper 452 to an open position when the shower is turned off, which allows the panel 402 to quickly drain water, which speeds drying of the panel, which aids cleanliness and hygiene. That is, when water is not permitted to flow to the shower assembly 400, the actuator normally maintains the stopper 452 in the open position. Further draining of the panel 402** after use prevents drips and prevents water being stored in the panel long term from being uncomfortably delivered to the next shower occupant at a cold temperature.

The actuator 470 may further be configured to move the stopper 452 to the open position for a predetermined amount of time, for example, an amount of time that does not allow the second tank 422 to completely empty of water. For example, the actuator 470 may be configured such that, after the actuator 470 is actuated to move the stopper 452 to the open position, the actuator 470 moves the stopper 452 back to the closed position after only a portion of the water in the tank 422 is released (e.g., between 25% and 75% of the capacity of the second tank 422 is released with each actuation). In this manner, a user may selectively release water from the second tank 422 multiple times in succession without emptying the tank. That is, the use may actuate the valve at least twice successively (i.e., within approximately 1-2 seconds after the stopped is returned to the closed position) in order to completely empty the tank. Alternatively or additionally, the actuator 470 may be configured for a user to maintain the stopper 452 in the open position for an extended period of time (i.e., longer than a single actuation), so as to release more or all water from the second tank 422. According to other exemplary embodiments, the actuator 422 may be configured to move the stopper 452 to the open position for a sufficient amount of time for a volume of water in the second tank 422 to substantially or entirely empty through the holes 408*d*. For example, the actuator 470 may be configured to move the stopper 452, after being moved to the open position, back to the closed position at a time substantially coincident with the tank 422 completely emptying through the holes 408*d*, such that the tank 422 is substantially emptied of water.

Furthermore, the shower assembly 400 may be configured such that while the actuator 470 is actuated to release water from the second tank 422, water is continuously released from the shower assembly (e.g., through the first plurality of holes 408*a*, 408*b*, 408*c* and/or the second plurality of holes 408*d*) without interruption, so long as water is continuously supplied by the water source 406 to the shower assembly 400 itself. That is, the maximum volume of the first tank 421 and collective flow rate of the first plurality of holes 408*a*, 408*b*, 408*c* are configured relative to the flow rate of the water source 406 and initial volume of the second tank 422 (i.e., the volume at which water begins to flow from the second tank 422 to the first tank 421), such that after emptying of the second tank 422 by selectively actuating the actuator 470, water begins to flow from the second tank 422 to the first tank 421 before the first tank 421 can be emptied from its maximum volume.

Figure 27:
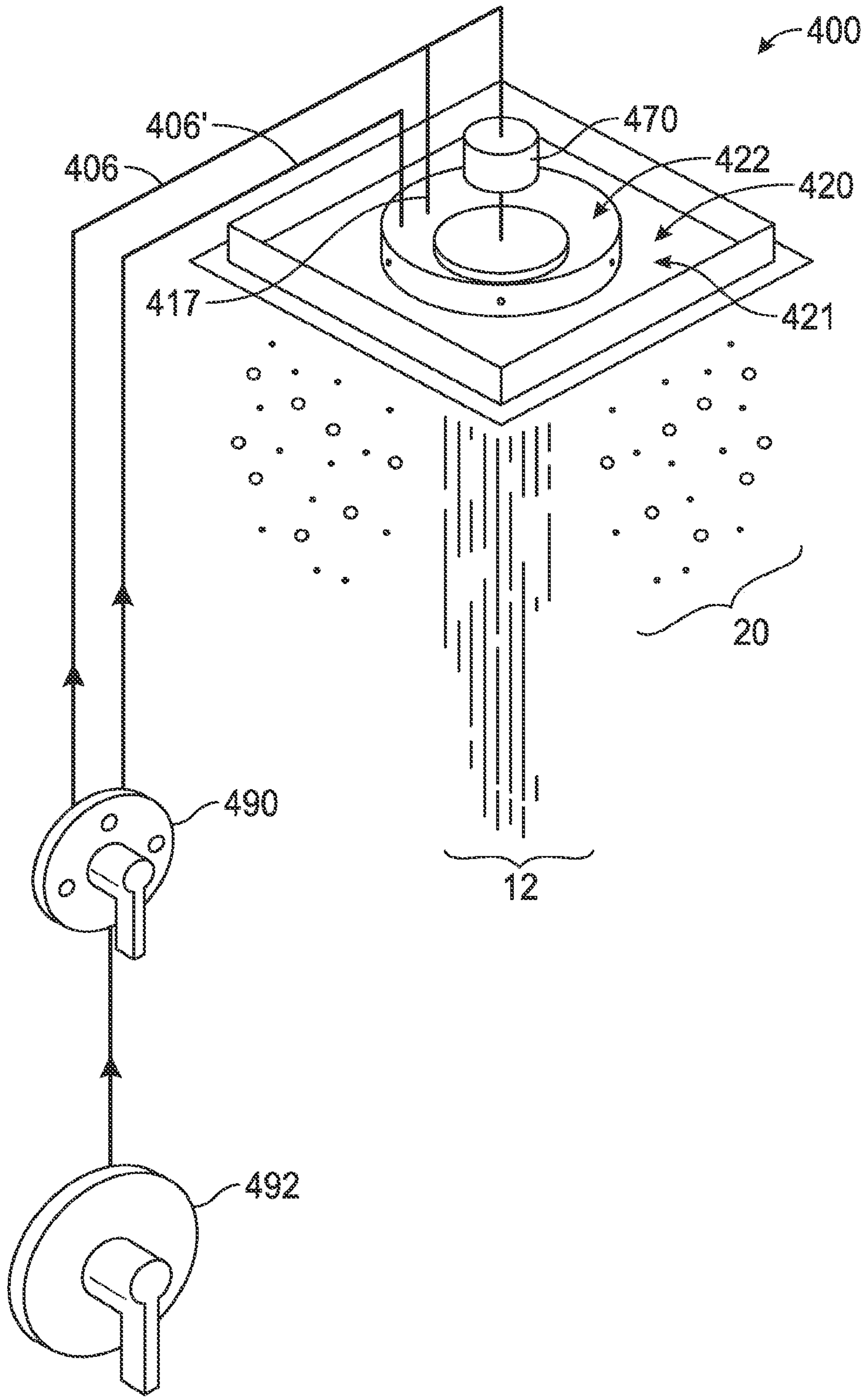
FIG. 27 is a schematic diagram of the shower assembly of FIG. 25, shown according to an exemplary embodiment.

Referring to FIG. 27, a schematic diagram of a shower assembly 400 is shown, according to an exemplary embodiment. A valve, shown as a diverter valve 490, receives water, for example, from a mixing valve 492. When the diverter valve 490 is in a first state, water flows from the water source 406, fills the reservoir 420 via the inlet 407, and pressurizes the chamber 476 to close the stopper 452. Accordingly, water only flows through the first plurality of holes 408*a*, 408*b*, 408*c* to fall from the panel 402 as drops 20. When the diverter valve 490 is in a second state, water flows into the second tank 422 from the water source 406'. Accordingly, the reduced or stopped flow of water through the water source 406 reduces the pressure in the chamber 476, allowing the stopper 452 to lift from the bottom wall 410 and allow water to stream from the second plurality of holes 408*d*. Providing water to the second tank 422 from the water source 406', rather than completely stopping flow, allows for continuous operation of the shower while in the streaming state. As described, the diverter valve 490 is a two-way valve. According to other embodiments, the diverter valve 490 may be a multi-way valve (e.g., three-way, four-way, etc.), which may allow water to be diverted to other plumbing fixtures (e.g., a hand shower, a showerhead 10, a tub spout, etc.). According to other embodiments, the valve 490 may be a transfer valve. For example, the transfer valve may be configured to operate the deluge feature and a showerhead (e.g., for final rinsing), or the rain feature and a tub spout (e.g., for bathing in the rain), at the same time.

Figure 28:
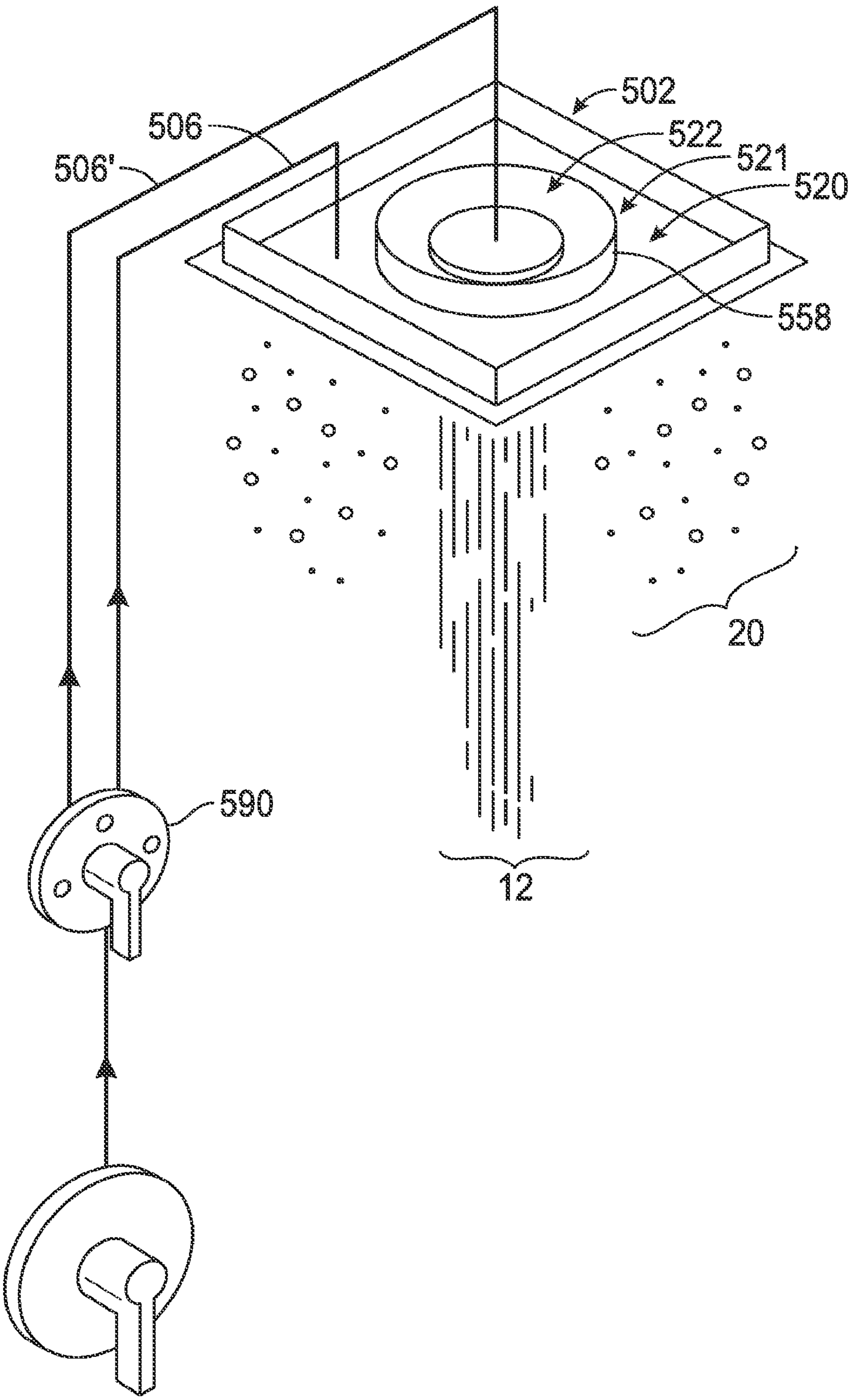
FIG. 28 is a schematic diagram of a shower assembly of FIGS. 4A-B, shown according to another exemplary embodiment.

Referring to FIG. 28, a schematic diagram of a shower assembly 500 is shown, according to an exemplary embodiment. The shower assembly 500 includes a panel 502 and a wall 558 dividing the reservoir 520 into a first tank 521 and a second tank 522. The panel 502 may be similar to panel 402; however, the panel 502 does not include a stopper or actuator. The shower assembly 500 may be suitable for use in high flow source conditions (e.g., six gallons per minute water supply). For example, when the diverter valve 590 is in a first state, water flows from the water source 506 into the first tank 521, flows through the first plurality of holes and falls from the panel 502 as drops 20. When the diverter valve 590 is in a second state, water flows from the water source 506' into the second tank 522 and flows through the second plurality of holes to fall from the panel 502 as streams 12. Because the supply of water is sufficiently high, there is no need to store water in the second tank 522 (e.g., with a stopper) to create a deluge. Further, because water is directly supplied to the first tank 521, the wall 558 may not include the first and second courses of holes for allowing the passage of water between the first tank 521 and the second tank 522. According to another embodiment, the wall 558 may include the second or upper course of holes, which would allow water to pass between tanks if the flow rate into one of the first tank 521 and the second tank 522 is greater than the rate of water flowing from the first or second plurality of holes, respectively. Water flowing from the unexpected holes (e.g., water flowing from the streaming holes when water is being supplied to the dripping holes) may serve as a signal to the user to reduce the flow rate of water to the shower assembly 500. It is contemplated that in high flow source conditions, the panel 502 may not include cisterns (e.g., cisterns 131) formed in the bottom wall of the panel 502 because sufficient flow would be available to prevent the first plurality of holes from being starved for water when water is flowed through the second plurality of holes. According to other embodiments, the shower assembly 500 may be configured with a stopper (e.g., 452), such that the tank 522 collects and selectively releases water in the manner described above.

Figure 29:
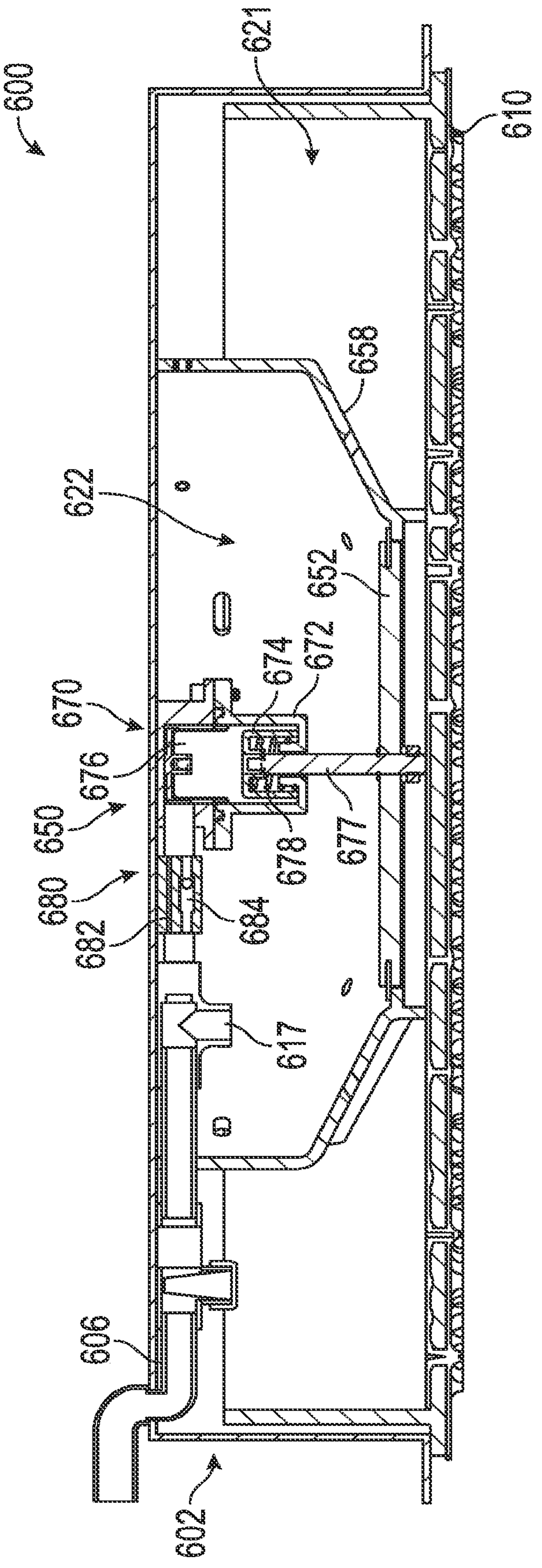
FIG. 29 is a sectional elevation view of the shower assembly of FIGS. 4A-B, shown according to another exemplary embodiment.
Figure 30:
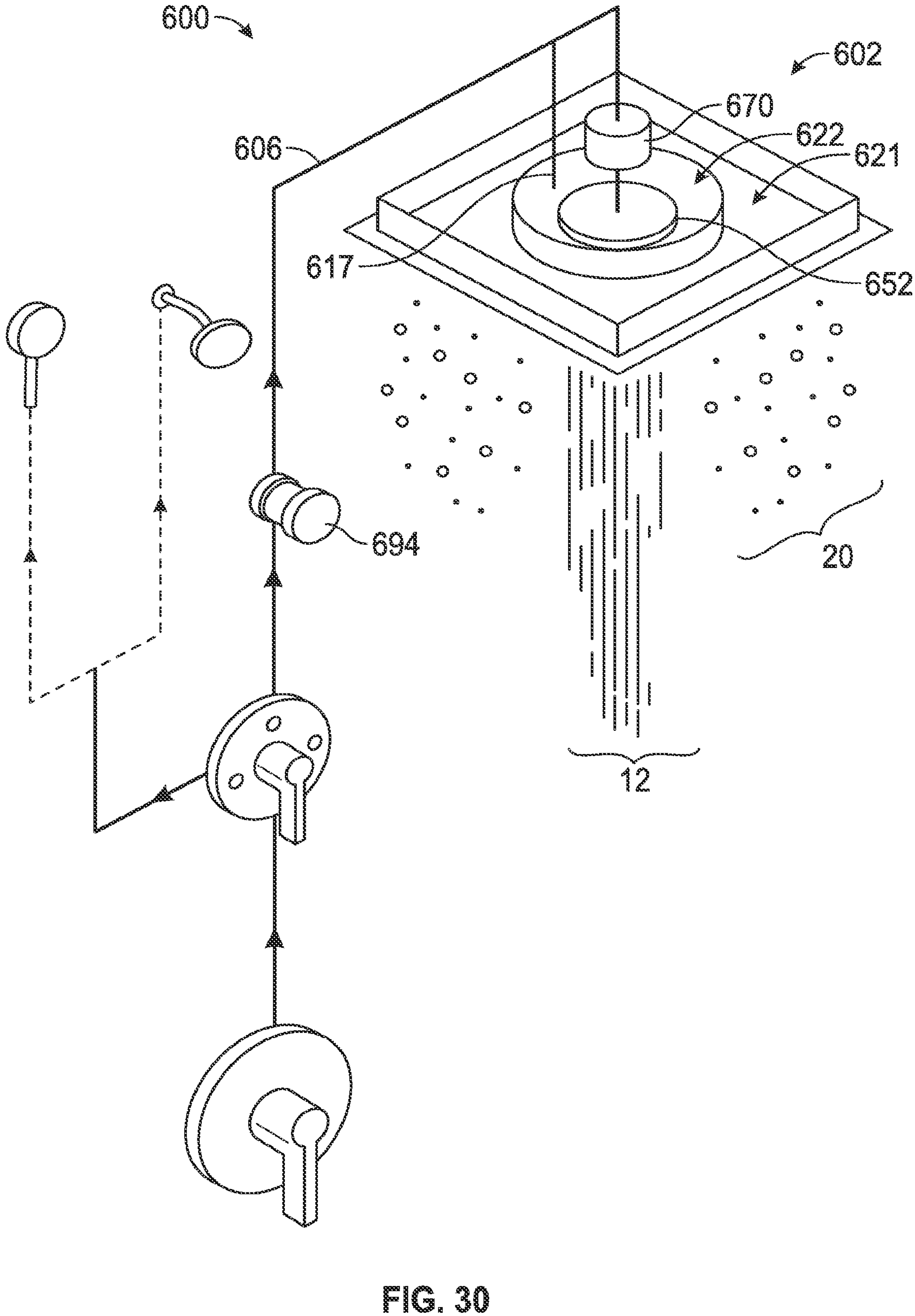
FIG. 30 is a schematic diagram of the shower assembly of FIG. 29, shown according to an exemplary embodiment.

Referring to FIGS. 29 and 30, a sectional elevation view and a schematic diagram of a shower assembly 600 having a streaming apparatus 650, are shown according to another exemplary embodiment. The shower assembly 600 includes a panel 602 having a bottom wall 610. Bottom wall 610 is shown to be substantially similar to bottom wall 310, 410 as shown and described with respect to FIGS. 23-26. The streaming apparatus 650 is shown to include a wall 658 that separates a second tank 622 (e.g., streaming tank, deluge tank, etc.) from a first tank 621, a stopper 652, and an actuator 670. During operation, water enters the second tank 622 from a water source 606.

Referring to FIG. 29, the streaming apparatus 650 includes an actuator 670. The actuator 670 has a housing 672 and a diaphragm 674, which is operatively coupled to a shaft 677, which in turn is coupled to the stopper 652. The diaphragm 674, the chamber 676, and the spring 678 operate similarly to those in the actuator 470 described with respect to FIG. 26; however, a flow regulator 680 is fluidly coupled upstream of chamber 676. The flow regulator 680 includes an orifice 682 (e.g., weep hole, etc.) and a check valve 684. During operation, water from the water source 606 pushes the check valve 684 closed and flows through the orifice 682 to fill the chamber 676, thereby moving the stopper 652 to the first or closed position.

Referring to FIG. 30, a restrictor valve 694 is shown to be located upstream of the panel 602. When the restrictor valve 694 is actuated, the flow of water from the water source 606 is reduced or stopped. The reduced or stopped flow reduces the pressure on the upstream side of the check valve 684, and thus the chamber 676. Accordingly, the spring 678 pushes the diaphragm 674 towards the chamber 676, and water is pushed out of the chamber 676 through the check valve 684. When the restrictor valve 694 is de-actuated (e.g., released), water again flows from the water source 606 to the inlet 617, closes the check valve 684, and fills the chamber 676 via the orifice 682. According to various embodiments, the restrictor valve 694 be include a plunger or diaphragm which can at least partially block the flow of water from the source 606, or may include a spring-loaded ball-valve, which may be turn to a closed position and spring-returned to the open position. According to the embodiment shown, the restrictor valve 694 operates as a push button that temporarily reduces (e.g., relieves, etc.) supply pressure.

According to the exemplary embodiment shown, the spring 678 and the check valve 684 are configured to allow rapid expulsion of water from the chamber 676, which enables the stopper 652 to quickly move from the closed position to an open position. The orifice 682 and the chamber 676 are configured to return the stopper 652 to the closed position over a period time. For example, the orifice size may be configured, based on the supply pressure of the water source 606, to provide a desired period of time. According to the exemplary embodiment, the period of time is approximately or slightly longer than the time for the water stored in the second tank 622 to stream out through the second plurality of holes. According to one embodiment, the period of time is substantially equal to the time for the water stored in the second tank 622 to stream out through the second plurality of holes. According to another embodiment, the period of time is between approximately 5 and 10 seconds. According to another embodiment, the period of time is between approximately 10 and 15 seconds. According to various embodiments, the actuator 670 begins to slowly move the stopper 652 towards the closed position while the second tank 622 is still draining. When the stopper 652 is closed, the second tank 622 begins refilling.

The interaction of the actuator 670 and the flow regulator 680 advantageously only requires plumbing of one supply line to the panel 602, enables automatic draining of the second tank 622 when the shower is turned off, enables simple push-button actuation by the user, eliminates the need to switch back to the rain feature after selecting the deluge feature.

Because the deluge feature is actuated when water flow to the actuators 470, 670 is ceased, the panel 400, 600 is automatically drained when water to shower is turned off. This allows the panel to dry out between uses and prevents cold water from remaining in the panel, which may be uncomfortable to the user during the next use. Further, as discussed above, the orifice 682 may be configured to slowly move the stopper 652 toward the closed position over a period of time. Thus, when the shower is turned on, cold water in the plumbing lines may be purged through the streaming holes until the stopper 652 reaches the closed position, thereby preventing the initial cold water from chilling the subsequent water and providing an uncomfortable showering/deluge experience.

According to various other embodiments, the hydraulic circuit and actuators 470, 670 may be reversed such that a flow of water into the chamber 476, 676 causes actuation of the deluge feature. For example, the chamber 476, 676 may be below the diaphragm 474, 674, which may be below the spring 478, 678, which in turn may be coupled to the shaft 477, 677 so as to push the stopper into a normally closed position. Accordingly, directing water into the chamber 476, 676 would cause water to pressurize the chamber 476, 676, pushing up on the diaphragm 474, 674, in turn compressing the spring 478, 678 and lifting the stopper 452, 652. A flow regulator having a check valve and orifice may be used to allow the chamber 476, 676 to slowly drain and return the stopper to a closed position. Water may be directed in to the chamber via, for example, a rotary or push button diverter valve.

Additional technologies are contemplated that may be used with any of the above embodiments, in whole or in part, and that may be used with the control system described below. For a first example, a vibrator may be coupled to the panel to cause the bottom wall to vibrate thereby causing for facilitating drops of water to fall from the panel. According to various embodiments, the vibrator may include an eccentric motor, a magnetostrictive transducer, or a piezoelectric transducer. According to one embodiment, the vibrator causes ultrasonic vibrations in the bottom wall of the panel. Instructions for controlling the vibrator may be stored in a vibration module in the memory of the processing electronics. For a second example, at least some of the holes through the bottom wall of the panel are fluidly coupled to a solenoid. According to one embodiment, a field of solenoids may cover the top surface of the bottom wall of the panel and push or spray water through the holes in the bottom wall. According to various embodiments, one solenoid may be fluidly coupled to one hole or one solenoid may be coupled to a plurality of holes. According to one embodiment, an array of solenoids may be fluidly coupled to a plurality of holes. Instructions for controlling the solenoid(s) may be stored in a solenoid module in the memory of the processing electronics. For a third example, a rotating foil having openings therethrough may be located above or below the bottom wall of the panel. For an embodiment with the foil below the bottom wall, the foil may impact the drops to slice the drops from the bottom wall or may create turbulence (e.g., pressure vortices, pressure disruptions, etc.) which break the drops from the bottom wall. The rotating foil on the bottom wall may provide a lateral force in the direction of rotation to the drops so that the drops may not fall vertically. A screen below the foil may prevent inadvertent contact with the foil and may rectify the direction of the drops. For an embodiment with the foil above the bottom wall, the alternating passage of foil and opening over the hole through the bottom wall may create pressure oscillations and/or cavitation, which facilitates the water breaking into drops. Instructions for controlling the foil (e.g., the motor rotating the foil, etc.) may be stored in a foil module in the memory of the processing electronics.

Figure 31:
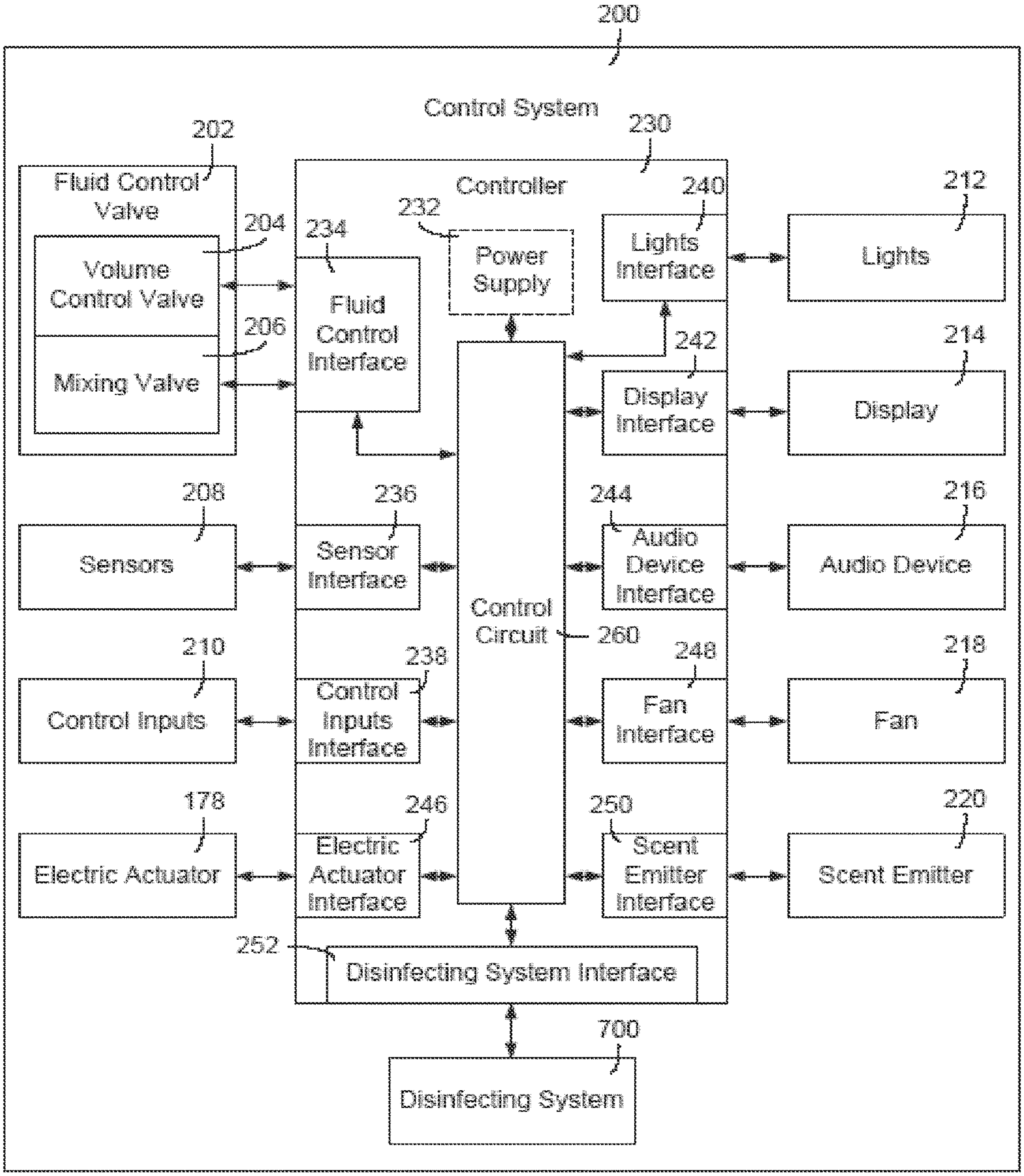
FIG. 31 is a schematic block diagram of a control system for the shower assembly, shown according to an exemplary embodiment.

Referring to FIG. 31, a schematic diagram of a control system 200 is shown, according to an exemplary embodiment. The control system 200 may include a controller 230 having a control circuit 260, which is powered by a power supply 232. Power supply 232 may be a battery, coupling to mains power, or any other suitable power source. As shown, power supply 232 provides power to the control circuit 260;

however, in some embodiments, the power supply may provide power to one or more of the components of the control system 200 (e.g., sensors 208, electric actuators 178, lights 212, displays 214, etc.).

The controller 230 may include one or more interfaces (e.g., fluid control interfaces 234, sensor interface 236, control inputs interface 238, lights interface 240, display interface 242, audio device interface 244, electric actuator interface 246, fan interface 248, scent emitter interface 250, disinfecting system interface 252, etc.). The interfaces may include one or more ports (e.g., jacks, inlets, outlets, connectors, etc.) for communicating with various components of the control system. The interfaces may include any necessary hardware or software for translating (e.g., digital to analog, analog to digital, pulse-width modulation, network protocol, wireless protocol, infrared transmitter-receiver, etc.) signals and/or data to and from the components of the control and the control circuit 260.

The control system 200 may include one or more fluid control valves 202. The fluid control valves may include a volume control valve 204, mixing valve 206, thermostatic valve, pressure balance valve, etc., or any combination thereof. The fluid control valve 202 may be a manually controlled (i.e., mechanical) valve having one or more sensors 208 (e.g., position sensor, on-off switch, flow meter, etc.) operably coupled to it. According to other embodiments, the fluid control valve 202 may include one or more electronically controlled valves (e.g., solenoid valves). According to an exemplary embodiment, the fluid control valve 202 may include both manually controlled valves and electronically controlled valves operably coupled, for example, in series. The electronically controlled valves may be operably coupled to the control circuit 260 via the fluid control interface 234 and may be controlled by processing electronics 262, described in more detail below.

The control system 200 may include one or more sensors 208, which may provide information to the control circuit 260 via the sensor interface 236. As described above, the sensors 208 may include a valve position sensor, an on-off switch, a water flow meter, etc. Sensors 208 may include one or more temperature sensors (e.g., thermocouples, thermistors, thermometers, etc.) which may be used to measure water temperature from the source (e.g., Thot, Tcold, etc.), mixed water temperature (e.g., Tmixed), air temperature, etc.

The control system 200 may also receive user input from one or more control inputs 210. Control inputs 210 may include button, switches, knobs, levers, capacitive sensors, touch sensitive displays (e.g., touchscreens), etc. The control inputs 210 may receive inputs or commands from a user and provide electronic signals representing those inputs to the control circuit 260, via the control inputs interface 238, for implementation of the commands.

The control system 200 may include one or more lights 212. The lights 212 may provide general utility lighting and/or may provide ambient or mood lighting. The lights 212 may be of a single or various colors, and the lights 212 may be of various brightness or intensity. At least one of the lights may be a strobe light. The lights 212 may be operably coupled to the control circuit 260 via the lights interface 240.

The control system 200 may include one or more displays 214. The display 214 may provide information to the user such as water temperature, flow rate, music selection, audio loudness, etc. The display 214 may be a touch sensitive display and, thus, also serve as a control input 210. The display 214 may also be illuminated at a desired brightness or color and, thus, also serve as a light 212. The display 214 may be operably coupled to the control circuit 260 via the display interface 242.

The control system 200 may include one or more audio devices 216. The audio device 216 may include one or more speakers to provide music and/or sound effects (e.g., thunder, jungle sounds, ocean (e.g., surf) sounds, etc.). The audio device 216 may also include one or more media streaming devices, digital media receivers, media servers, portable media players (e.g., iPod, iPhone, Zune, etc.), etc. The audio devices 216 may be connected to the control circuit 260 via the audio device interface 244 by wire or wirelessly (e.g., IEEE 802.11, Bluetooth, etc.).

The control system 200 may include one or more electric actuators 178, which may be controlled by signals from processing electronics 262. The electric actuators 178 (e.g., motor, solenoid, linear actuator, etc.) may be used to move or affect the position of an object. For example, an electric actuator 178 may be used to move the stopper 152 between the first position and the second position. The electric actuator 178 may be operably coupled to the control circuit 260 via the electric actuator interface 246.

The control system may include one or more control one or more fans 218. Fan 218 may be an exhaust fan controlled in order to affect the humidity of the showering area. Fan 218 may be oriented to provide a lateral force to drops 20, thereby creating a more natural, non-vertical trajectory of the drops 20. According to various embodiments, the fan 218 may be a bladed fan, a bladeless fan, an air compressor, etc. The fan 218 may be operably coupled to the control circuit 260 via the fan interface 248.

The control system may include one or more scent emitters 220. Scent emitter 220 may be an atomizer, sprayer, etc. configured to provide a scent or aroma to the showering area. For example, the scent emitter 220 may provide aromatherapy scents, petrichor, ocean scents, etc. The scent emitter 220 may be operably coupled to the control circuit 260 via the scent emitter interface 250.

The control system may include one or more disinfecting systems 700. The disinfecting system 700 may include a heater that raises the temperature of the fluid control valve 202 to kill any bacteria therein. The disinfecting system 700 may be operably coupled to the control circuit 260 via the disinfecting system interface 252.

Figure 32:
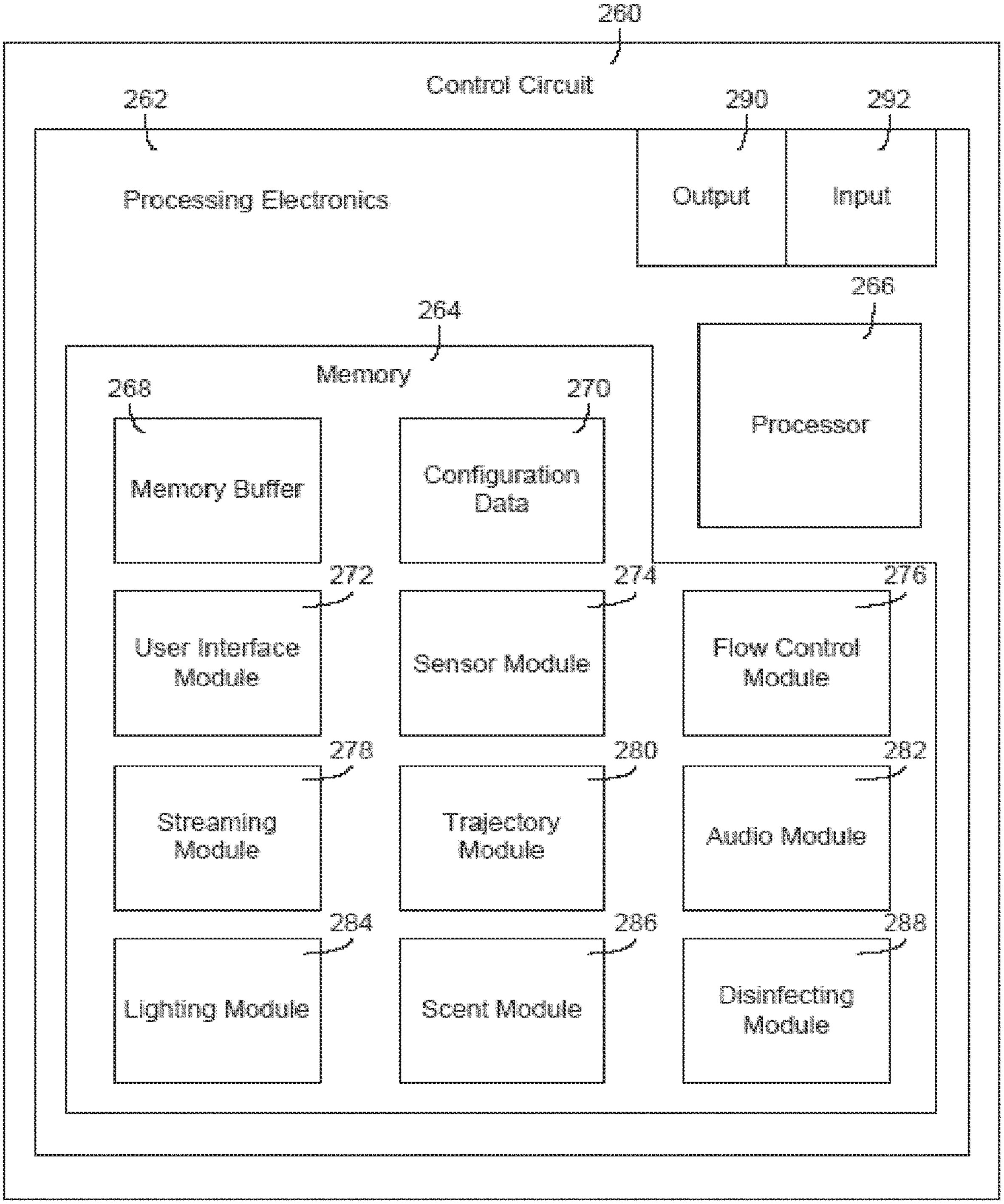
FIG. 32 is a schematic block diagram of processing electronics of the control system of FIG. 31, shown according to an exemplary embodiment.

Referring to FIG. 32, a detailed block diagram of the control circuit 260 of FIG. 24 is shown, according to an exemplary embodiment. The control circuit 260 is shown to include processing electronics 262, which includes a memory 264 and processor 266. Processor 266 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 266 is configured to execute computer code stored in memory 264 to complete and facilitate the activities described herein. Memory 264 can be any volatile or non-volatile memory device capable of storing data or computer code relating to the activities described herein. For example, memory 264 is shown to include modules 272-288 which are computer code modules (e.g., executable code, object code, source code, script code, machine code, etc.) configured for execution by processor 266. When executed by processor 266, processing electronics 262 is configured to complete the activities described herein. Processing electronics includes hardware circuitry for supporting the execution of the computer code of modules 272-288. For example, processing electronics 262 includes hardware interfaces (e.g., output 290) for communicating control signals (e.g., analog, digital) from processing electronics 262 to the control circuit 260. Processing electronics 262 may also include an input 292 for receiving, for example, user input from control circuit 260, sensor signals from control circuit 260, or for receiving data or signals from other systems, devices, or interfaces.

Memory 264 includes a memory buffer 268 for receiving user input data, sensor data, audio data, etc., from the control circuit 260. The data may be stored in memory buffer 268 until buffer 268 is accessed for data. For example, user interface module 272, sensor module 274, audio module 282, or another process that utilizes data from the control circuit 260 may access buffer 268. The data stored in memory 264 may be stored according to a variety of schemes or formats. For example, the user input data may be stored in any other suitable format for storing information.

Memory 264 further includes configuration data 270. Configuration data 270 includes data relating to fluid control valve 202, sensors 208, control inputs 210 and display 214, and electric actuator 178. For example, configuration data 270 may include fluid control valve operational data, which may be data that flow control module 276 can interpret to determine how to command control circuit 260 to operate a flow control valve 202. For example, configuration data 270 may include information regarding flow rate information for various volume control valve 204 positions and mixed water temperature information for various mixing valve 206 positions. For example, configuration data 270 may include sensor operational data, which may be data that sensor module 274 can interpret sensor data from control circuit 260 into data usable by flow control module 276. For example, configuration data 270 may include voltage to temperature curves, or voltage to flow rate curves. For example, configuration data 270 may include display operational data which may be data that user interface module 272 or lighting module 284 can interpret to determine how to command control circuit 260 to operate a display 214. For example, configuration data 270 may include information regarding size, resolution, refresh rates, orientation, location, and the like. Configuration data 270 may include touchscreen operational data which may be data that user interface module 272 can use to interpret user input data from memory buffer 268.

Memory 264 further includes a user interface module 272, which includes logic for using user input data in memory buffer 268 to determine desired user responses. User interface module 272 may be configured to interpret user input data to determine various buttons pressing, button combinations, button sequences, gestures (e.g., drag versus swipe versus tap), the direction of gestures, and the relationship of these gestures to icons. User interface module 272 may include logic to provide input confirmation and to prevent unintended input. For example, logic to activate single-finger touch only at the moment and location the finger is lifted may be used. User interface module 272 may include logic for responding to input through, for example, color halos, object color, audible tones, voice repetition of input commands, and/or tactile feedback.

Memory 264 further includes a sensor module 274, which includes logic for interpreting data from sensor 208 and sensor interface 236. For example, the sensor module 274 may be configured to interpret signals from sensor interface 236 or memory buffer 268, in conjunction with look up tables or curves from configuration data 270, to provide temperature, valve position, flow rate, etc. data to the processor 266 and other modules.

Memory 264 further includes a flow control module 276, which includes logic for controlling the flow control valves 202. For example, flow control module 276 may include logic for processing sensor information (e.g., temperature, valve position, flow rate, etc.) from sensor module 274 and user input from user interface module 272 to provide commands to fluid control valves 202 over the control circuit 260. For example, a user may input a desired temperature into the control inputs 210, and the flow control module 276 may be configured to receive the input and provide one or commands to the flow control valves 202 to achieve the desired temperature, either via open-loop or closed-loop (e.g., using data from sensor module 274) control. For example, a user may input a desired flow rate or type of drops (e.g., small drops 20*a*, medium drops 20*b*, large drops 20*c*), and the flow control module 276 may be configured to receive the input and provide one or commands to the flow control valves 202 to achieve the desired flow rate, either via open-loop or closed-loop (e.g., using flow rate data or water depth in the reservoir 120 from sensor module 274) control. According to an exemplary embodiment, the flow control module 276 may process user input, in conjunction with configuration data 270, to cause a predetermined temporal pattern (e.g., cycle, sequence, etc.) of drops 20 to fall from the panel 102. For example, the flow control module 276 may include logic to cause the shower to begin as a light rain (e.g., small drops 20*a*), to progress to a moderate rain (e.g., including medium drops 20*b*), to progress to a downpour (e.g., including large drops 20*c*), and to end with a light rain (e.g., small drops 20*a*).

Memory 264 further includes a streaming module 278, which includes logic for controlling the streaming apparatus 150. For example, streaming module 278 may include logic for processing user input from user interface module 272 to provide commands to electric actuator 178 over the control circuit 260. The commands may cause the stopper 152 to move from the first position to the second position, from the second position to the first position, or anywhere in between. For example, the streaming module 278 may provide commands to the electric actuator 178 in response to data (e.g., a depth or height of water in the reservoir 120) received from the sensor module 274. According to one embodiment, the streaming module 278 may provide commands to the electric actuator 178 in response to a signal received from the flow control module 276 as part of causing the predetermined temporal pattern of drops 20. For example, the commands may cause the stopper 152 to move to the first position, or the commands may augment a downpour portion of the cycle with a deluge by moving the stopper 152 to the second position.

Memory 264 further includes a trajectory module 280, which includes logic for controlling the fan 218. For example, trajectory module 280 may include logic for processing inputs to provide commands to the fan 218. The inputs may be from the user interface module 272 or the flow control module 276. For example, the fan 218 may draw or push air to impart a lateral force onto the drops 20, thereby creating a more realistic trajectory (e.g., non-vertical) of the drops 20. The trajectory module 280 may provide commands that cause different fan speeds to create different trajectories of the drops 20 to help simulate, for example, different intensities of rainfall.

Memory 264 further includes an audio module 282, which includes logic for controlling the audio device 216. For example, the audio module 282 may include logic for distributing audio content received from audio device interface 244, or audible feedback indicia from another module in memory 264, to speakers in the showering area. The audio module 282 may include logic for processing user input from user interface module 272 to provide commands (e.g., play, stop, skip, etc.) to audio device 216 over the control circuit 260. According to one embodiment, in response to instructions from the flow control module 276, the audio module 282 may provide commands to speakers in the showering area to simulate thunder while simulating a downpour.

Memory 264 further includes a lighting module 284, which may include logic for controlling the lights 212 and display 214. For example, the lighting module 284 may include logic for brightening or dimming the lights 212 and/or display 214 in response to user input from user interface module 272. The lighting module 284 may include logic for processing instructions from other modules in memory 264. For example, in response to instructions from the flow control module 276, the lighting module 284 may provide commands to cause the lights 212 to dim when simulating a downpour or to cause lights 212 to flash to simulate lightning.

Memory 264 further includes a scent module 286, which includes logic for controlling the scent emitters 220. For example, the scent module 286 may include logic for commanding the scent emitter 220 to provide a scent or aroma to the showering area in response to user input from user interface module 272 or in response to instructions from the flow control module 276. For example, the scent module 286 may include logic for commanding the scent emitter 220 to spray petrichor in the showering area while a low flow rate of water is flowing through the panel 102.

Memory 264 further includes a disinfecting module 288, which may include logic for controlling the disinfecting system 700. For example, the disinfecting module 288 may include logic for causing the disinfecting system 700 to disinfect at least a portion of the shower assembly 100 in response to user input from user interface module 272. For example, a user may press a button associated with a "Clean Now" label on the control inputs 210, and the disinfecting module 288 may provide commands to the disinfecting system 700 in response to receiving the input via the control inputs interface 238 and the control circuit 260. According to another embodiment, the disinfecting module 288 includes logic for activating and controlling the disinfecting system 700 on a schedule (e.g., weekly, monthly, etc.).

According to various embodiments of the shower assembly (e.g., 100, 200, 300, 400, etc.), the shower assembly is configured to be mounted to an overhead structure or ceiling (e.g., rafters, joists, framing, concrete, etc.). The shower system or assembly may also be configured, or include a mounting system, so as to be mounted to the overhead structure or ceiling, and then be adjusted into a final precise orientation relative to horizontal. For example, the shower assembly may require a specific orientation to ensure proper orientation of the panel (e.g., 102, 202, 302, etc.) and its bottom wall (e.g., 110, 210, 310, etc.) are level and/or to ensure proper water flow to the various outlet ports (e.g., 108, 208, 308, etc.). These mounting concepts are discussed in further detail below with respect to the embodiment of the shower assembly 1100, but are similarly applicable to the other embodiments of the shower assemblies disclosed herein.

With reference to FIGS. 34-37, According to various embodiments, the shower system or assembly 1100 includes an adjustable mounting system or assembly 1140, which is configured to fixedly couple to an overhead building structure (generally referred to as B) and is configured to adjustably couple to the shower assembly 1100. The shower assembly 1100 includes a panel 1102 similar to those described previously, which defines a reservoir 1120 having one or more tanks 1121, 1122. The reservoir 1120 may, for example, include an outer or side wall 1116 that defines the outer bounds of the reservoir and that is divided into the first tank 1121 and the second tank 1122 by an interior wall 1158. The interior wall 1158 prevents or limits a flow of water between the tanks 1121, 1122 (e.g., water received through an inlet coupled to a water source, the inlet and the water source collectively or individually referred to by reference numeral 1106). The first tank 1121 is formed between the sidewall 1116 and the interior wall 1158 and is in fluidic communication with a plurality of drop outlets 1108*a*, 1108*b*, 1108*c* to release water from the first tank, for example, in the form of discrete drops. The first tank 1121 and drop outlets 1108*a*, 1108*b*, 1108*c* are configured, such that water present in the first tank 1121 releases without selective actuation by a user (e.g., no valve is present to restrict water in the first tank 1121 from being released through the drop outlets 1108*a*, 1108*b*, 1108*c*, such that a user cannot internally control (i.e., from within the shower assembly 1100, such as with a valve or other mechanism) whether water passes). The second tank 1122 is defined within the bounds of the interior wall 1158 (e.g., having a circular shape) and is in fluidic communication with a plurality of streaming outlets 1108*d* to release water from the first tank, for example, in the form of continuous streams of water. Release of water from the second tank 1122 through the streaming outlets 1108*d* maybe selectively controlled by a user using an actuator 1170 that moves a stopper 1152, which act as a valve for the selective release of water from the second tank 1122. The flow of water to, between, and from the various tanks and outlets may be configured as described above for the various other exemplary embodiments (e.g., controls, flow direction, flow rates, pressures, heights, etc.). Furthermore, the configuration of the outlets 1108 may be configured as described above for the various other exemplary embodiments (e.g., geometries, relative geometries, flow rates, etc.)

The shower assembly 1100 also includes an upper wall or casing 1130 (e.g., wall, cover, top, shroud, etc.) that surrounds the sidewall 1116 of the panel 1102 and generally contains therein the tanks 1121, 1122, stopper 1152, and actuator 1170. The casing 1130 may provide a sealed upper surface or wall to prevent moisture from the chamber leaking upward into the building structure. The casing 1130 may further be configured couple to the panel 1102 to form a chamber with the reservoir 1120 in a manner that may substantially seal the chamber (other than the inlet 1106 and outlets 1108*a*, 1108*b*, 1108*c*, 1108*d*, other intentional water inlets or outlets, and any intentional air inlets or outlets), which may help further prevent moisture (e.g., steam from heated water received in the tanks 1121, 1122 of the reservoir 1120) from being released into the building structure to which the shower assembly 1100 is mounted. For example, the casing 1130 may include an outwardly protruding flange 1131 (e.g., horizontally extending) that is complementary to an outwardly protruding flange 1102*a* (e.g., horizontally extending) of the panel 1102 and is configured mate therewith. Fasteners 1133 (e.g., threaded fasteners, clips, etc.) couple the outwardly protruding flange 1102*a* of the bottom panel 1102 to the outwardly protruding flange 1131 of the casing 1130. A peripheral trim piece 1138 may be coupled to edges of the flanges 1102*a*, 1131 and/or between the flanges

1102*a*, 1131 (e.g., having a T- or L-shaped cross-section), so as to cover a seam or joint between the flanges 1102, 1131. Instead, or additionally, the shower assembly 1100 may include a seal 1132 (e.g., preferably a gasket, or alternatively a curable material, such as caulk), which is positioned (e.g., compressed) between the sidewall 1116 and a lower, peripheral surface of the casing 1130, so as to form a seal between the panel 1102 and the casing 1130. Alternatively or additionally, the trim piece 1138 may function as or include a seal (e.g., gasket and/or curable material) to form a seal between the panel 1102 and casing 1130. Furthermore, the casing 1130 may include a central vertical recess 1135 configured to receive the interior wall 1158 which may extend to a greater height than the sidewall 1116 and/or engage the casing 1130 at a greater height than that which the sidewall 1116 engages the seal 1132 and/or the casing 1130.

The shower assembly 1100 may also be configured to engage the building structure in an aesthetically pleasing and/or sealing manner. For example, the building structure may include a drop ceiling, such that framing and/or drywall define a recess in which the shower assembly 1100 is substantially positioned. The horizontal flange 1131 may engage a lower peripheral surface of the drop ceiling and may include a seal 1136 (e.g., gasket and/or curable material) positioned therebetween. The seal 1136 functions to seal the shower assembly 1100 against the building structure so as to prevent moisture (e.g., steam) from water released through the outlets 108*a*, 108*b*, 108*c*, 108*d*, or other moisture present in a showering enclosure or area, from reaching an interior of the building structure. According to other exemplary embodiments, the shower assembly 1100 may be configured to surface mount to a building structure and include a decorative shell or façade to hide otherwise exposed portions of the shower assembly 1100 from view (e.g., the casing 1130, plumbing, etc.).

As mentioned above, the mounting system 1140 is configured to mount the shower assembly 1100 to a building structure (e.g., framing, concrete, etc.), while providing for adjustment therebetween to achieve proper orientation (e.g., substantially horizontal lower surface of the panel 1102) of the shower assembly 1100, as may be required for proper flow of water to the outlets 108*a*, 108*b*, 108*c*, 108*d*. The mounting system may generally include a bracket 1141 configured to mount to the building structure, for example, with threaded fasteners 1142. The bracket mounting features, such as elongated studs 1143 (e.g., posts), are coupled to the bracket 1141 at predefined, non-adjustable locations that correspond with shower mounting features at non-adjustable shower mounting locations of the shower assembly 1100 In this manner, the bracket mounting features are positioned in the same fixed (i.e., predefined, non-adjustable) spatial relationship or orientation relative to each other, as are the shower mounting features of the shower assembly 1100 positioned relative to each other to facilitate alignment and coupling therewith. The elongated studs 1143 extend vertically downward from the bracket 1141 and may, for example, be supplied to a customer or installer already attached to the bracket 1141 or may be configured to couple to the bracket 1141 at the predefined locations (e.g., using holes, nuts, threads, etc.). While the bracket 1141 is depicted as being substantially H-shaped, so as to extend to four mounting locations, the bracket 1141 may have other shapes (e.g., L-shaped, triangular, rectangular) and extend to more or fewer mounting locations (e.g., 2, 3, 5, 6, etc.). According to other exemplary embodiments, the posts may be couple directly to the building structure without the bracket 1141, as opposed to being indirectly coupled to the building structure by way of the bracket 1141 as described previously.

The locations at which the threaded fasteners 1142 (i.e., for attaching the bracket 1141 to the building structure) are coupled to the bracket 1141 may substantially correspond to the mounting locations of the elongated studs 1143 (e.g., being positioned within approximately 1" thereof) and/or may be positioned at other locations, for example, according to framing of the building structure. Moreover, the bracket 1141 may include multiple mounting locations for the fasteners 1142, for example, by providing holes for receiving the fasteners 1142 at various locations, not all of which may be used for a given installation.

The shower assembly 1100 and, in particular, the casing 1130, includes the shower mounting features that mate with the bracket mounting features of the mounting assembly 1140 on the bracket 1141. For example, the shower mounting features may be holes 1133 configured to receive the elongated studs 1143. For example, the casing 1130 may include holes 1133 through an upper surface thereof, which are in the same predefined, non-adjustable spatial orientation or relationship as the elongated studs 1143 to facilitate alignment and receipt of the elongated studs 1143 within the holes 1133. For example, the holes 1133 may be positioned in protrusions 1134 of the casing 1130 to accommodate other fastening components that allow for coupling, sealing, and/or adjustment.

The fastening components may generally include a fitting 1145 (e.g., level fitting), a seal 1146 (e.g., gasket), and a nut 1147. The fitting 1145 generally includes an upper flange 1145*a*, a shaft 1145*b* extending downward from the flange 1145*a*, and terminating at an end 1145*c*. The fitting 1145 also includes a central bore 1145*d* extending therethrough from the flange 1145*a*, through the shaft 1145*b*, and to the end 1145*c*. Each fitting 1145 is configured as a female member that receives one of the studs 1143 acting as a male member therein and is adjustably coupled to with the stud 1143 via complementary threads (i.e., each stud 1143 is threaded on an outer surface thereof, and the bore 1145*d* is internally threaded to receive the threads of the stud 1143, such that the position of the fitting 1145 may be adjusted relative to the stud 1143). As the fitting 1145 is vertically adjustable on the stud 1143, the flange 1145*a* forms an adjustable upper limit against which the casing 1130 may be positioned. Each fitting 1145 is additionally positioned in one of the holes 1133 of the casing 1130 with the flange 1145*a* being positioned above the casing 1130 and the shaft 1145*b* extending through the hole 1133. Each stud 1143 may, by virtue of extending through the bore 1145*d* of the fitting, also extend through the holes 1133 of the casing 1130. The seal 1146 is received on the fitting 1145 and is positioned against a lower surface of the casing 1130. The nut 1147 is adjustably received on the shaft 1145*b* (e.g., the nut 1147 has internal threads that are complementary to external threads of the shaft 1145*b*), so as to compress the seal 1146 and the casing 1130 between the nut 1147 and the flange 1145*a* of the fitting. The seal 1146 may instead be provided as a portion of the nut 1147 (e.g., as a single unit), such that the seal 1146 is compressed against the casing 1130 around the hole 1133. The mounting system may further include a washer 1148, which may be provided as a separate component or as part of a single unit with the seal 1146, that distributes force from the nut across the seal 1146. In this manner, the holes 1133 may be sealed, as discussed above, to prevent moisture from the tanks 1121, 1122 reaching an interior of the building structure. The end 1145*c* may, for example, have a hex head to allow tightening of the nut 1147 on the fitting 1145 using conventional tools (e.g., the hex head and the nut 1147 being moved and/or held with a wrench). For casings 1130 that include a protrusion 1134 (as shown), the shaft 1145*b* of the fitting 1145, the seal 1146, the nut 1147, and the stud 1143 may all be positioned within the protrusion 1134. According to other exemplary embodiments, the stud or post 1143 may be configured as a female member (e.g., a nut, an internally threaded tube, etc.) that is configured to receive the fitting 1145, which is instead configured as a male member (e.g., externally threaded).

A method for mounting the shower assembly 1100 (or any of the previously described shower assemblies) using the mounting system 1140 is contemplated. In a first step, the building structure is prepared for mounting the shower assembly 1100, which may include installation of plumbing to provide a water source to the shower assembly 1100, and in appropriate installations, preparation of a drop ceiling to provide a recess in which the shower assembly may be positioned. Furthermore, during the first step, all finishing of the drop ceiling and/or other building structures may be completely finished prior to installation of the shower assembly 1100, since all additional steps for mounting and connecting the shower assembly 1100 occur from within the recess of the building structure or from within the shower assembly 1100 itself.

In a second step, the bracket 1141 is coupled to the building structure. For example, in applications using conventional framing, threaded fasteners 1142 (e.g., drywall or wood screws) are inserted through holes in the bracket 1141 at locations corresponding to suitable coupling locations of the building structure (e.g., at joist positions). In applications where the building structure is concrete, other threaded fasteners 1143 suitable for use with concrete are inserted through holes in the bracket 1141 for coupling to the building structure.

In a third step, the fittings 1145 (e.g., four fittings 1145 corresponding to the four holes 1133 of the casing 1130) are coupled to the studs 1143, and then adjusted to a final height (e.g., by threading). The predefined orientation of the shower assembly 1100 (e.g., having a substantially level bottom surface) requires that all fittings 1145 be substantially level with each other (e.g., within approximately 1 degree of horizontal, and/or within a range of ½ in elevation). The proper height also requires that the shower assembly 1100 be positioned at a proper elevation relative to the building structure (e.g., such that the seal 1136 is compressed between the shower assembly 1100, such as the flange 1131 of the casing 1130, and the building structure). Instead, or additionally, the fittings 1145 may be adjusted to a rough height (e.g., by threading) allowing a greater degree of variation between the fittings 1145 relative to level. Whether initially adjusting to a final or a rough height, the height of the fittings 1145 may be further adjusted after the shower assembly 1100 is coupled to the mounting assembly 1140, as described below.

In a fourth step, the shower casing 1130 is coupled to the mounting assembly 1140. During the fourth step, the panel 1102 is removed from the shower casing 1130, or the panel 1102 may be initially provided decoupled from the casing 1130. The shower casing 1130 is raised and positioned, so as to insert the shaft 1145*b* of each fitting 1145 into the holes 1133 of the casing. Each seal 1146 is then placed on one of the shafts 1145*b*, which is followed by one of the nuts 1147 being threaded onto the shaft 1145*b*. The nuts 1147 are then tightened on the shaft 1145*b*, so as to compress the casing 1130 and the seal 1146 between the flange 1145*a* of the fitting 1145 and the nut 1147, so as to fixedly couple the casing 1130 to the mounting system 1140 and to seal the holes 1133 of the casing 1130. More particularly, the hex head end 1145*d* is held in a fixed position (e.g., with an open ended wrench), while the nut 1147 is rotated on the shaft 1145*b* (e.g., with another open ended wrench). If any of the fittings 1145 require height adjustment on the studs 1143, for example because they moved out of their final position, were initially placed in a rough position, or were otherwise initially placed out of position, each fitting 1145 may be adjusted by rotating the fitting 1145 on the stud 1143, for example, by using a wrench that engages the hex head end 145*d* of the fitting. Prior to such adjustment, it may be necessary to loosen the nut 1147, so as to less the compression and friction between the fitting 1145, seal 1146, and the casing 1130 and allow rotation therebetween. After such adjustment, it may be necessary to then again tighten the nut 1147, so as to recompress the casing 1130 and seal 1146 between the fitting 1145 and nut 1147. During the fourth step, the seal 1136 may also be positioned on the flange 1131 of the casing, such that when the casing 1130 is coupled to the mounting system 1140 and raised to its final position, the seal 1136 is compressed between the building structure and the flange 1131. During the fourth step, the inlet 1106 of the shower assembly may also be coupled to the plumbing of the building (i.e., a water source).

In a fifth step, the panel 1102 is coupled to the casing 1130. The panel 1102 is raised and positioned relative to the casing 1130, such that their respective outwardly extending flanges 1102*a*, 1131, are aligned and brought into contact with each other or the trim piece 1138 or seal is compressed therebetween. The fasteners 1137 are then inserted and tightened, so as to couple the panel 1102 to the casing 1130 and complete installation of the shower assembly 1100. It should also be noted that the inner wall 1158, stopper 1152, and/or actuator 1170 may be provided with, and therefore, installed with the casing 1130. When so configured, when the panel 1102 is raised and positioned relative to the casing 1130, the interior wall 1158 is brought into contact (e.g., sealing contact) with a top surface of the panel 1102, so as to divide the reservoir 1120 into the first tank 1121 and the second tank 1122. In this manner, the interior wall 1158 is coupled to the panel 1102 by virtue of the panel 1102 being coupled to the casing 1130.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A shower assembly comprising:

an inlet port for receiving water from a water source at an inlet flow rate;

a reservoir for receiving water from the inlet port, wherein the reservoir is not pressurized by a line pressure of the water source even when the reservoir receives the water at a maximum inlet flow rate of 2.5 gallons per minute; and a plurality of drop outlet ports;

wherein each of the plurality of drop outlet ports is configured such that water passes from the reservoir through the plurality of drop outlet ports, forms a drop at each drop outlet port, and only falls from each drop outlet port by gravity as discrete drops of water; and wherein a total flow capacity of the plurality of drop outlet ports is greater than or equal to the maximum inlet flow rate.

2. The shower assembly of claim 1, wherein:

at least one of the plurality of drop outlet ports includes an inlet, an outlet, and a bore extending between the inlet and the outlet; and the outlet defines a diameter that increases in a direction extending away from the inlet.

3. The shower assembly of claim 2, wherein water falls from the at least one of the plurality of drop outlet ports when a drop of water reaches a predetermined size, wherein the predetermined size is a size of the drop that overcomes the surface tension of water at the outlet.

4. The shower assembly of claim 2, wherein the outlet comprises a hemispherical shape.

5. The shower assembly of claim 1, wherein:

at least one of the plurality of drop outlet ports includes an inlet, an outlet, and a bore extending between the inlet and the outlet; and the inlet defines a diameter that decreases in a direction extending towards the outlet.

6. The shower assembly of claim 1, wherein:

each of the plurality of drop outlet ports includes an inlet, an outlet, and a bore extending between the inlet and the outlet;

a first bore of a first drop outlet port of the plurality of drop outlet ports defines a first diameter; and a second bore of a second drop outlet port of the plurality of drop outlet ports defines a second diameter that is greater than the first diameter.

7. The shower assembly of claim 1, wherein:

each of the plurality of drop outlet ports includes an inlet, an outlet, and a bore extending between the inlet and the outlet;

a first bore of a first drop outlet port of the plurality of drop outlet ports defines a first diameter; and a second bore of a second drop outlet port of the plurality of drop outlet ports defines a second diameter that is equal to the first diameter.

8. The shower assembly of claim 1, wherein:

each of the plurality of drop outlet ports includes an inlet, an outlet, and a bore extending between the inlet and the outlet;

a first outlet of a first drop outlet port of the plurality of drop outlet ports defines a first geometry; and a second outlet of a second drop outlet port of the plurality of drop outlet ports defines a second geometry that is different from the first geometry.

9. A shower assembly comprising:

an inlet port for receiving water from a water source at an inlet flow rate;

a reservoir for receiving water from the inlet port, wherein the reservoir is configured to prevent the reservoir from completely filling with water such that the reservoir is not pressurized by a line pressure of the water source even when the inlet flow rate of the water received by the reservoir is at an inlet flow rate of 2.5 gallons per minute; and a plurality of drop outlet ports, wherein each of the plurality of drop outlet ports is configured to only produce discrete drops of water at the inlet flow rate of 2.5 gallons per minute;

wherein a total flow capacity of the plurality of drop outlet ports is greater than or equal to the inlet flow rate of 2.5 gallons per minute.

10. The shower assembly of claim 9, wherein:

at least one of the plurality of drop outlet ports includes an inlet, an outlet, and a bore extending between the inlet and the outlet; and the outlet defines a diameter that increases in a direction extending away from the inlet.

11. The shower assembly of claim 10, wherein the outlet comprises a hemispherical shape.

12. The shower assembly of claim 9, wherein:

at least one of the plurality of drop outlet ports includes an inlet, an outlet, and a bore extending between the inlet and the outlet; and the inlet defines a diameter that decreases in a direction extending towards the outlet.

13. The shower assembly of claim 9, wherein:

each of the plurality of drop outlet ports includes an inlet, an outlet, and a bore extending between the inlet and the outlet;

a first bore of a first drop outlet port of the plurality of drop outlet ports defines a first diameter; and a second bore of a second drop outlet port of the plurality of drop outlet ports defines a second diameter that is greater than the first diameter.

14. The shower assembly of claim 9, wherein:

each of the plurality of drop outlet ports includes an inlet, an outlet, and a bore extending between the inlet and the outlet;

a first bore of a first drop outlet port of the plurality of drop outlet ports defines a first diameter; and a second bore of a second drop outlet port of the plurality of drop outlet ports defines a second diameter that is equal to the first diameter.

15. The shower assembly of claim 9, wherein:

each of the plurality of drop outlet ports includes an inlet, an outlet, and a bore extending between the inlet and the outlet;

a first outlet of a first drop outlet port of the plurality of drop outlet ports defines a first geometry; and a second outlet of a second drop outlet port of the plurality of drop outlet ports defines a second geometry that is different from the first geometry.

16. A shower assembly comprising:

an inlet port for receiving fluid from a fluid source at an inlet flow rate;

a reservoir for receiving fluid from the inlet port, wherein the reservoir is not pressurized by a line pressure of the fluid source even when the inlet flow rate of the fluid received by the reservoir is at a maximum inlet flow rate of up to 2.5 gallons per minute; and a plurality of drop outlet ports, wherein each of the plurality of drop outlet ports is configured to produce only discrete drops of fluid;

wherein a total flow capacity of the plurality of drop outlet ports is greater than or equal to the maximum inlet flow rate when the fluid in the reservoir is at a height above each of the plurality of drop outlet ports and below a maximum height of the reservoir.

17. The shower assembly of claim 16, wherein:

at least one of the plurality of drop outlet ports includes an inlet, an outlet, and a bore extending between the inlet and the outlet; and the outlet defines a diameter that increases in a direction extending away from the inlet.

18. The shower assembly of claim 16, wherein:

at least one of the plurality of drop outlet ports includes an inlet, an outlet, and a bore extending between the inlet and the outlet; and the inlet defines a diameter that decreases in a direction extending towards the outlet.

19. The shower assembly of claim 16, wherein:

each of the plurality of drop outlet ports includes an inlet, an outlet, and a bore extending between the inlet and the outlet;

a first bore of a first drop outlet port of the plurality of drop outlet ports defines a first diameter; and a second bore of a second drop outlet port of the plurality of drop outlet ports defines a second diameter that is greater than the first diameter.

20. The shower assembly of claim 16, wherein:

each of the plurality of drop outlet ports includes an inlet, an outlet, and a bore extending between the inlet and the outlet;

a first bore of a first drop outlet port of the plurality of drop outlet ports defines a first diameter; and a second bore of a second drop outlet port of the plurality of drop outlet ports defines a second diameter that is equal to the first diameter.

* * * * *